United States Patent

[11] 3,599,161

| [72] | Inventors | Alan M. Stoughton<br>Cinnaminson;<br>William R. Blatchley, Delran, both of, N.J. |
|---|---|---|
| [21] | Appl. No. | 813,165 |
| [22] | Filed | Apr. 3, 1969 |
| [45] | Patented | Aug. 10, 1971 |
| [73] | Assignee | Computer Test Corporation |

[54] COMPUTER CONTROLLED TEST SYSTEM AND METHOD
9 Claims, 19 Drawing Figs.

[52] U.S. Cl. ............................................. 340/172.5
[51] Int. Cl. ........................................ G06f 11/00, G05b 23/00
[50] Field of Search ............................ 340/172.5; 324/73; 235/151.31

[56] References Cited
UNITED STATES PATENTS
3,343,141  9/1967  Hackl ........................... 340/172.5
3,405,258  10/1968  Godoy et al. ................. 340/172.5 X
3,497,685  2/1970  Stafford et al. ............... 235/153

*Primary Examiner*—Paul J. Henon
*Assistant Examiner*—Ronald F. Chapuran
*Attorneys*—Maleson, Kimmelman and Ratner and Allan Ratner

ABSTRACT: A test system and method directed in operation by a programmed digital computer for measuring and evaluating a device which produces a nonrepetative waveform upon application to the device of an input stimulating signal. There is applied to an input of the device a stimulating signal having a predetermined waveform at a selected signal sequence. The amplitude and time characteristics of the resultant nonrepetative waveform are explicitly measured and output reports are generated. In response to the explicit measurements a differing waveform and signal sequence may be selected for the stimulating signal.

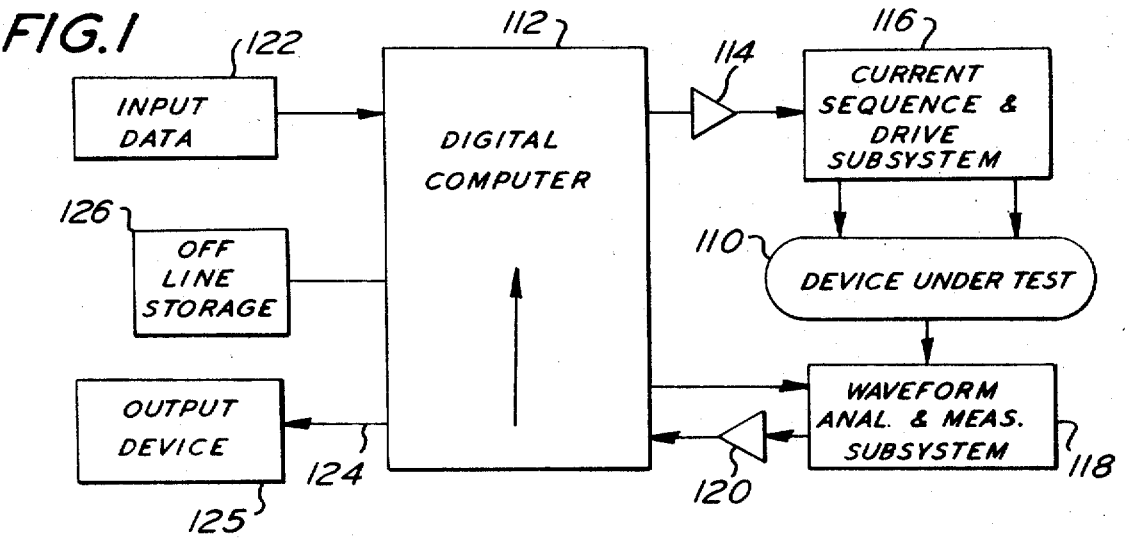
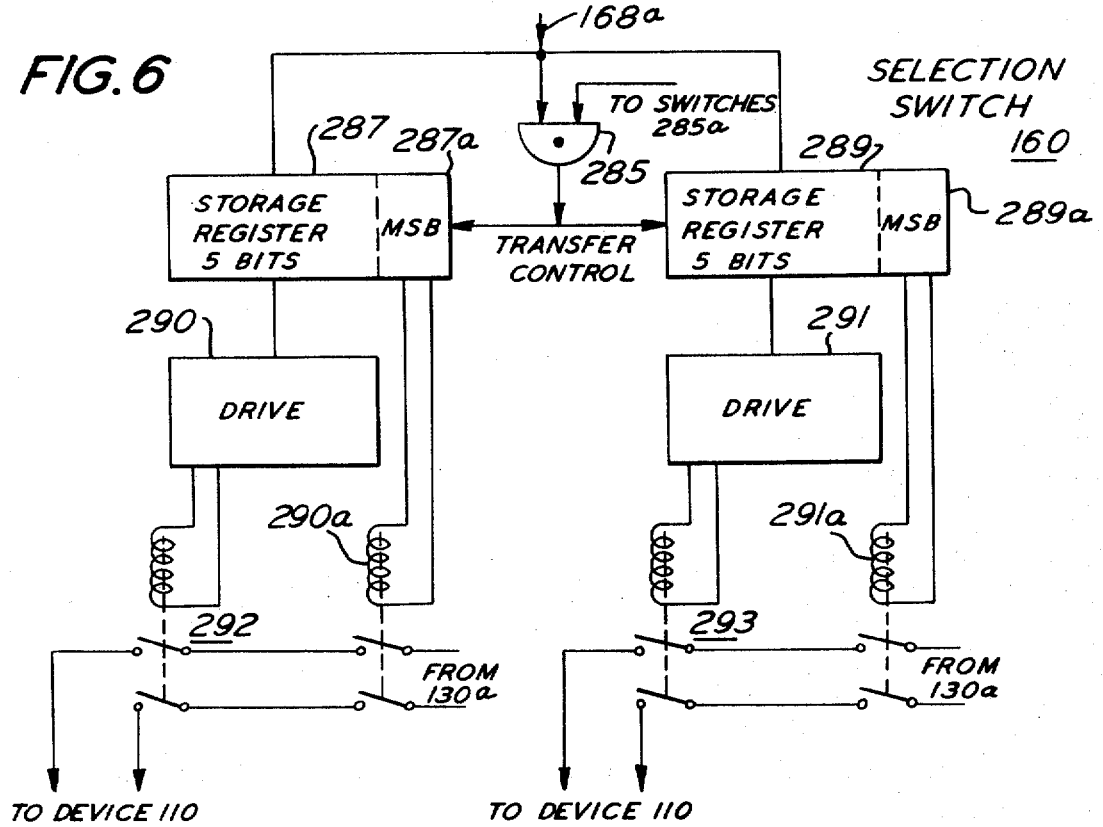
INVENTORS
ALAN M. STOUGHTON
WILLIAM R. BLATCHLEY
BY Malcom, Kimmelman and Ratner
ATTORNEYS.

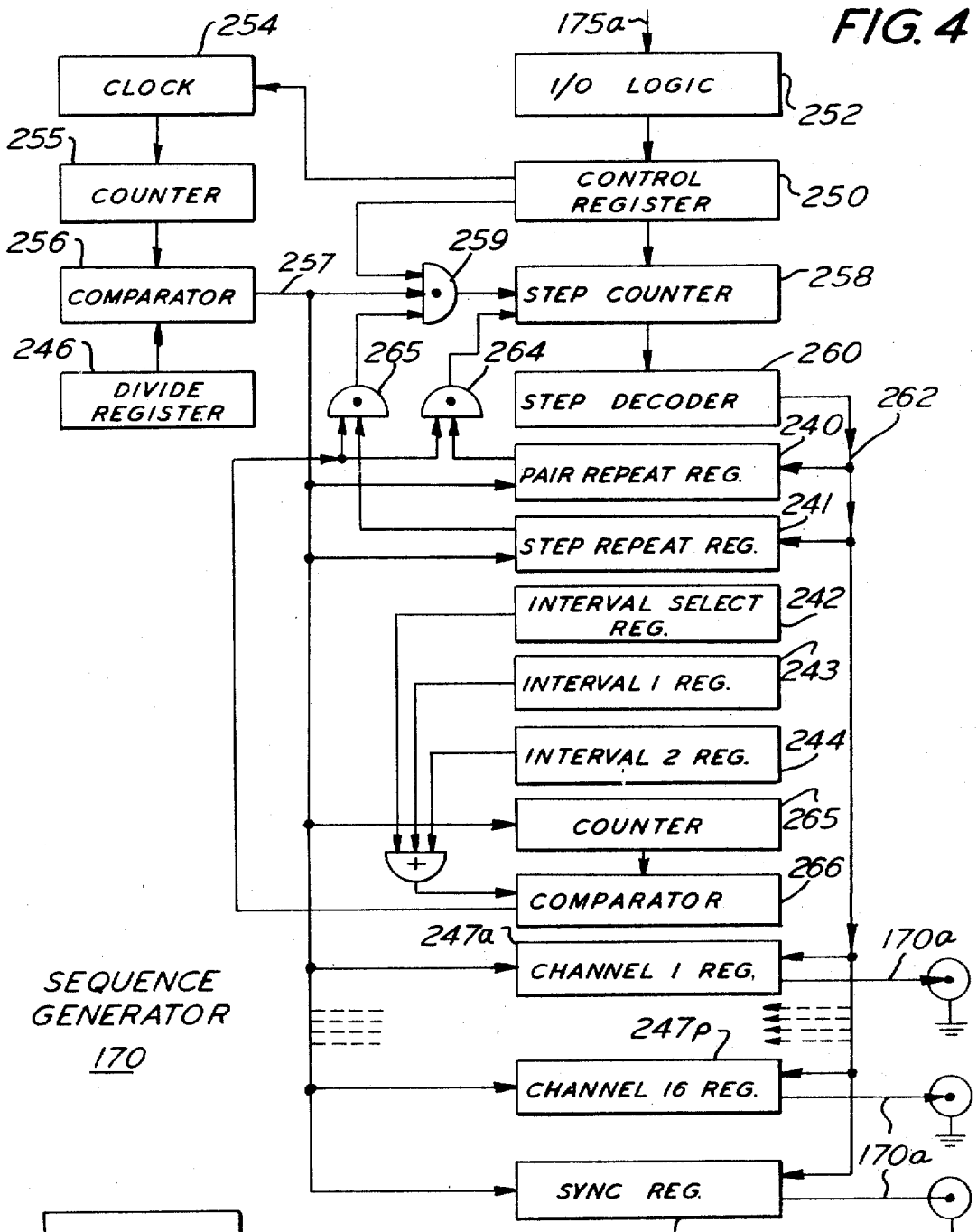

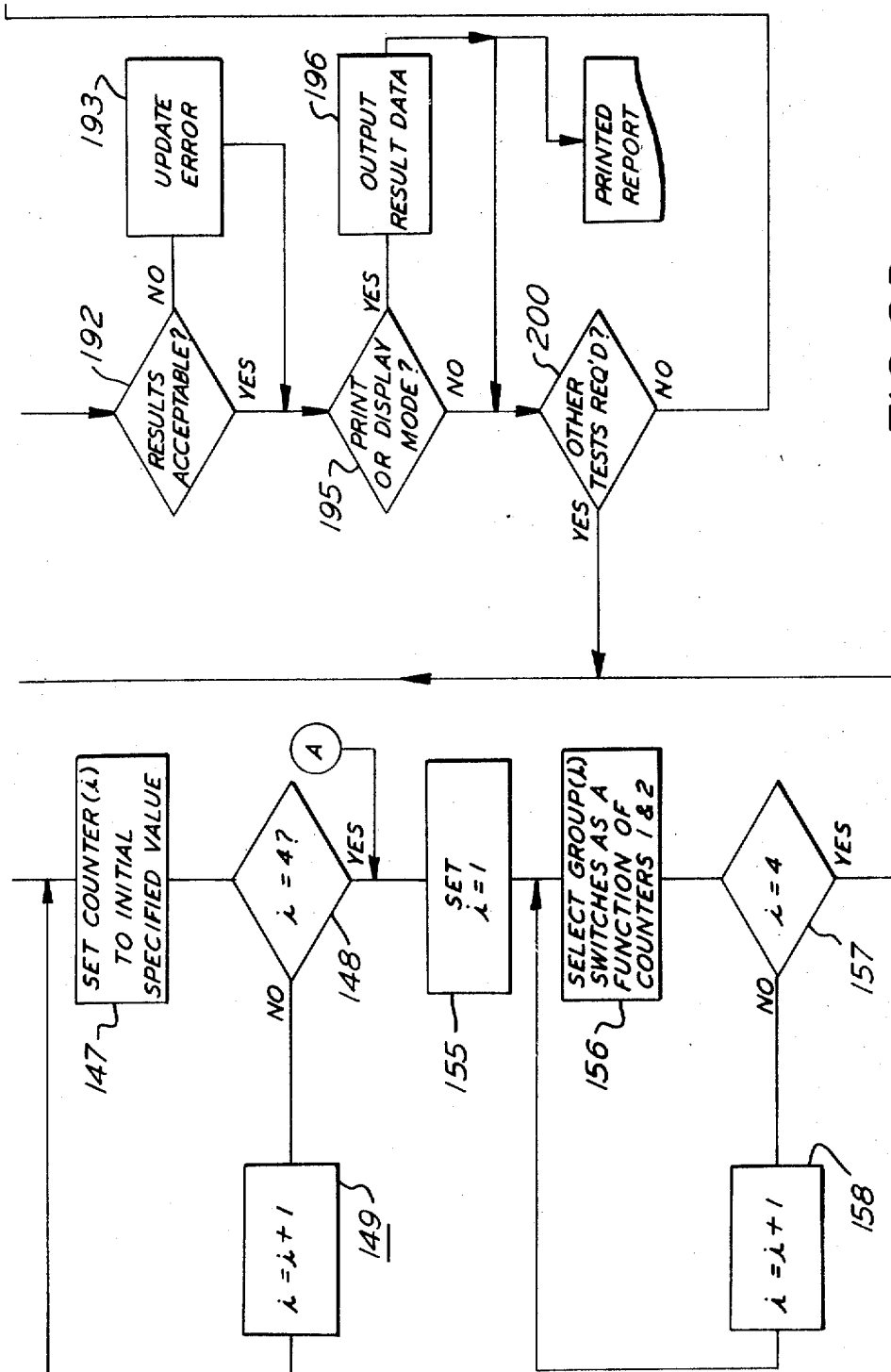

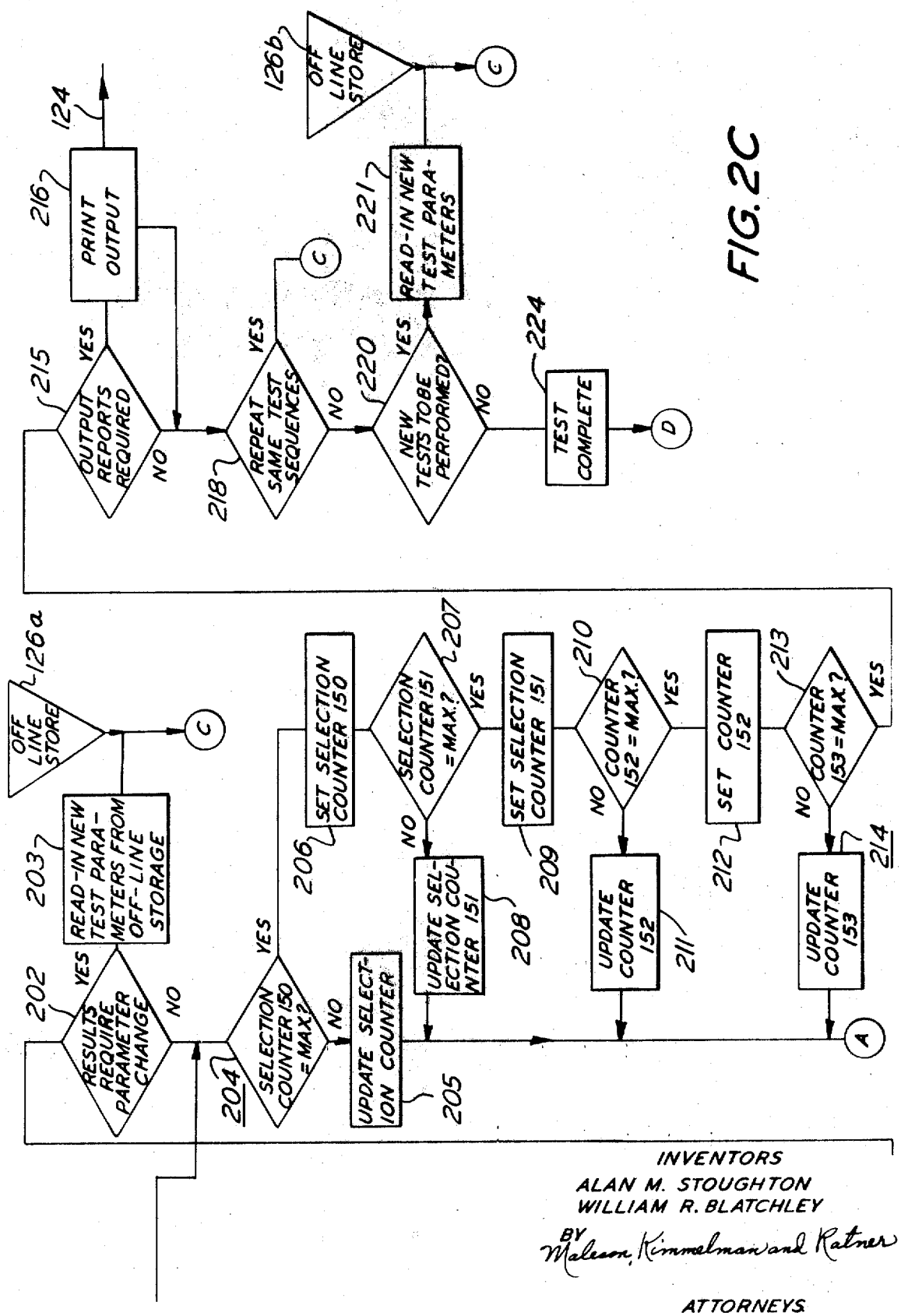

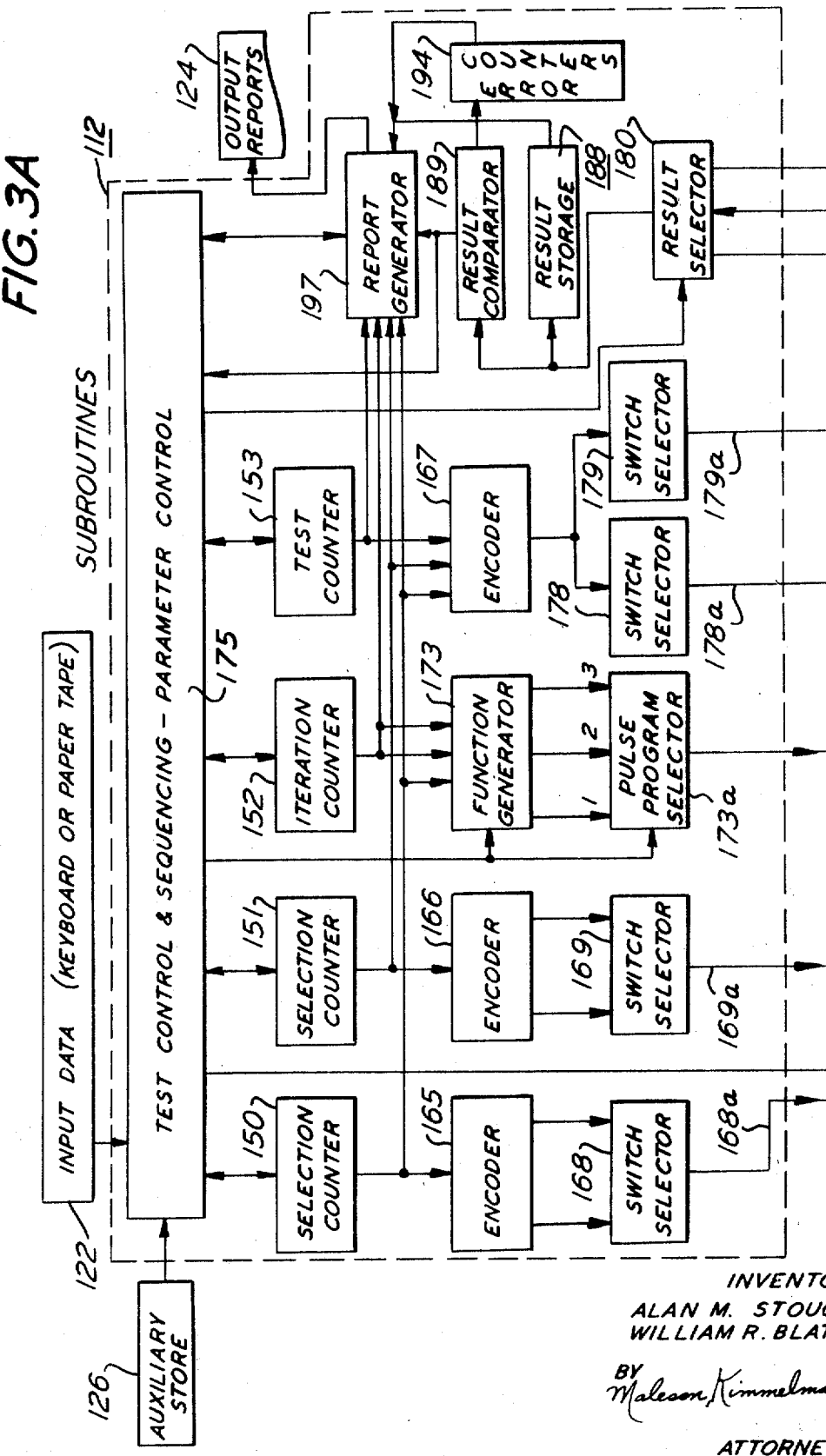

INVENTORS
ALAN M. STOUGHTON
WILLIAM R. BLATCHLEY

BY Maleson, Kimmelman and Ratner

ATTORNEYS.

INVENTORS
ALAN M. STOUGHTON
WILLIAM R. BLATCHLEY

BY
Maleson, Kimmelman & Ratner
ATTORNEY

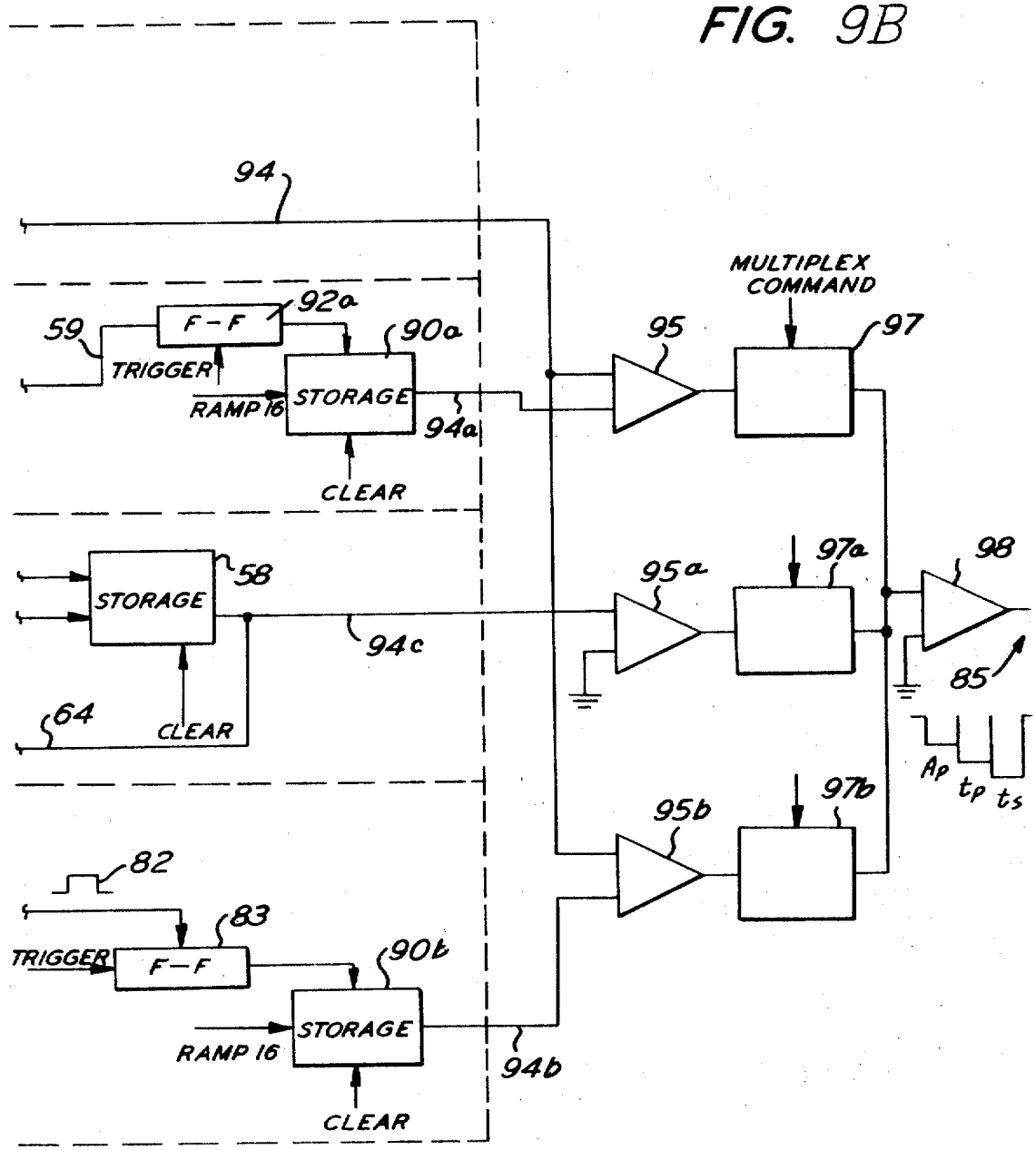

3,599,161

COMPUTER CONTROLLED TEST SYSTEM AND METHOD

BACKGROUND OF THE INVENTION

1. Field of the Invention

This invention relates to the field of art of digital computer controlled test measurement and evaluation.

2. Prior Art

Digital computers have been used to control the operation of different processes such as chemical processes, generation of electricity, etc. In these systems the process is controlled online in order to provide closed loop operation of the process and to remove manual control. In addition, it has been known to program digital computers to perform specific tests. For example, programs have been written to test the internal operation of a computer, as for example to test the magnetic memory system of the computer. Specifically a diagnostic program has been used to exercise the computer memory by storing information in the memory and reading it out. In this manner it is determined if everything written into the memory is read out correctly.

However the use of digital control of test measurement and evaluation of particular devices has left much to be desired for reasons such as high cost, inability to obtain explicit measurements from the device being tested, etc. In the test measurement and evaluation of memory devices such as cores, cores in planes and stacks of planes it has been known to use a semiautomatic fixed wired system. However, such semiautomatic system is limited in its flexibility to accommodate a large variety of differing types of cores, planes and stacks. In addition a substantial amount of time has been required to vary the test to accommodate different types of cores, planes and stacks.

SUMMARY OF THE INVENTION

A computer controlled test system and method which in response to stored input data signals measures and evaluates a device which produces a nonrepetative waveform. There is generated and applied to an input of the device a stimulating signal at a selected one of a predetermined plurality of signal sequences of predetermined shaped waveforms. The waveform and selected signal sequence are in accordance with the input data. There is explicitly measured (1) the amplitude of the nonrepetative waveform at predetermined times and (2) predetermined time characteristics of the nonrepetative waveform. Output reports of the explicitly measurements are generated.

Further, in response to the explicit measurements and the input data there may be selected a differing shaped waveform and a different one of the plurality of signal sequences and the explicit measurement of the resultant nonrepetative waveform is repeated. In this manner there is provided a system that provides explicit measurements and may accommodate differing types of devices.

BRIEF DESCRIPTION OF THE DRAWINGS

FIG. 1 illustrates in simplified block diagram form the basic test measurement and evaluation system of the present invention;

FIG. 1A illustrates how FIGS. 2A—C may be taken together;

FIG. 1B illustrates how FIGS. 3A—B may be taken together;

FIGS. 2A—C illustrate a flow chart in block diagram form for the test measurement and evaluation system of FIGS. 1 and 3A—B; FIGS. 3A—B illustrate in block diagram form the test measurement and evaluation system of FIG. 1;

FIG. 4 illustrates in more detailed block diagram form the sequence generator of FIGS. 3A—B;

FIG. 6 illustrates in more detailed block diagram form a selection switch of FIGS. 3A—B;

FIGS. 9A—B illustrate in more detailed block diagram form a waveform analysis and measurement system of FIGS. 3A—B.

BASIC SYSTEM

Figure 2A:
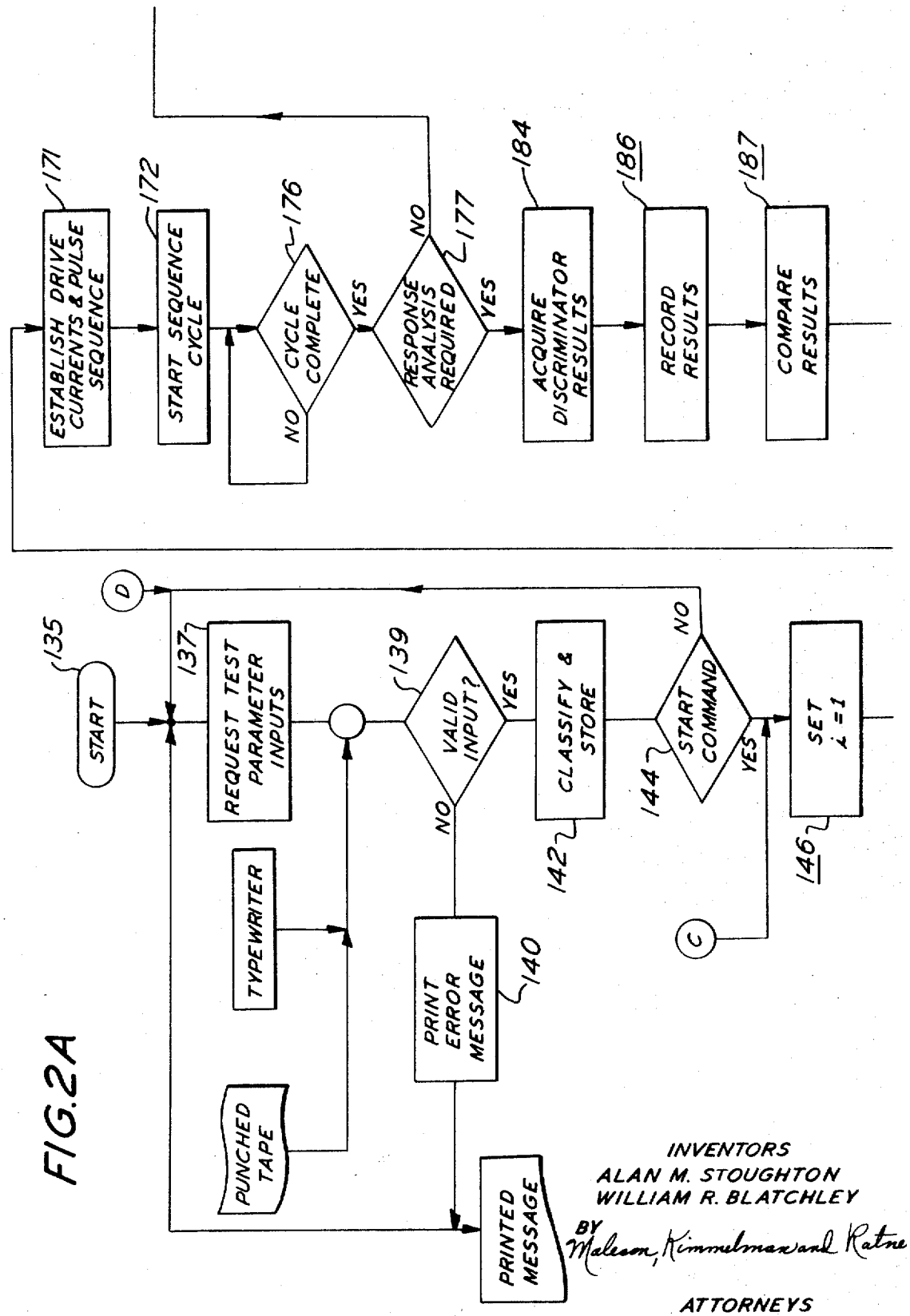

Referring now to FIG. 1 there is shown a computer controlled memory test system for providing test measurement and evaluation of a magnetic memory device 110. The magnetic memory device may be a single magnetic memory element to be tested or whose performance is to be evaluated. The memory element may be a square loop ferrite toroidal core 10 or any other magnetic memory element capable of two distinguishable states or electrical outputs. This test and evaluation may be performed on the basic memory element before the element is wired into a memory plane. In addition the test measurement and evaluation may take place when the element is in a plane and may also take place when the planes are grouped and electrically stacked. For the purpose of the description to follow magnetic memory device 110 may be considered any one of a magnetic memory core 10 in accordance with ASTM Tentative Methods of Test C526-63T. It will be understood that this ASTM method of test may be applied to planes or stacks since the fundamental testing method and evaluation of performance are similar whether a particular element is loose or is wired in a plane or stack. In the test or evaluation for a plane or stack there is provided checking not only of the characteristic of a particular address but also of the wiring pattern of a particular array to determine if it is wired correctly and has the ability to store various data patterns. Thus in the plane level the outputs are a function of the dimensions and of the wiring pattern.

The test system of FIG. 1 comprises a general purpose digital computer 112, a digital to analog converter 114, current sequencing and drive subsystem 116, waveform and analysis measurement subsystem 118, and an analog to digital converter 120. Digital computer 112 is programmed to control the operation of the current sequencing and drive subsystem 116 and to receive results from subsystem 118. Prior to starting a test the operator is required to provide input data 122 by way of a keyboard or punched paper tape. This input data provides the characteristics of device 110 under test, the values desired for the current sequence and drive and limits the acceptable values to be measured.

The test may then be started and proceeds in a manner described by the program stored by computer 112 using input data described by the program stored by computer 112 using input data 122 provided by the operator. Control signals are applied by way of converter 114 to subsystem 116 to apply drive current pulses 12 to device 110. As a result each core undergoes changes in magnetic state which induces voltages in a corresponding output winding state which induces voltages in a corresponding output winding or sense line thereby producing signals which are interpreted as a readout of stored information. Each of these readout signals may be defined as a memory response voltage characteristic 15, FIG. 10A. The time and amplitude parameters of response characteristic 15 require exacting analysis and these parameters are peak amplitude $A_p$, time of peak amplitude currents $t_p$, and the time $t_s$ at which the peak amplitude decays to 10 percent of its peak. These measurements are performed by waveform analysis and measurement system 100 of subsystem 118 which will later be described with respect to FIGS. 7—10B.

In this manner subsystem 118 provides explicit measurements of the foregoing three parameters which may then be converted to digital form by converter 120 which is then acquired by computer 112. Computer 112 then processes this data to generate output reports by way of output 124 to output device 125 relating to the specific element of device 110 being tested at that time. In addition the results may be stored to allow generation of reports after all the elements in device 110 have been tested. In this manner distribution of results may be generated or printed out as well as a listing of elements that have not met acceptance criteria. A further use of the results by computer 112 may be to close the loop to determine if it is worthwhile to continue the test sequence. Specifically, it may be that the results of the test of device 110 require a change in the test sequence or test method. Accordingly the test sequence may be changed by providing new values to subsystem 116 which may be calculated by the program in computer 112 or acquired from off-line storage 126 or internal memory of computer 112.

BLOCK DIAGRAM OF SYSTEM AND FLOW CHART

Figure 3B:
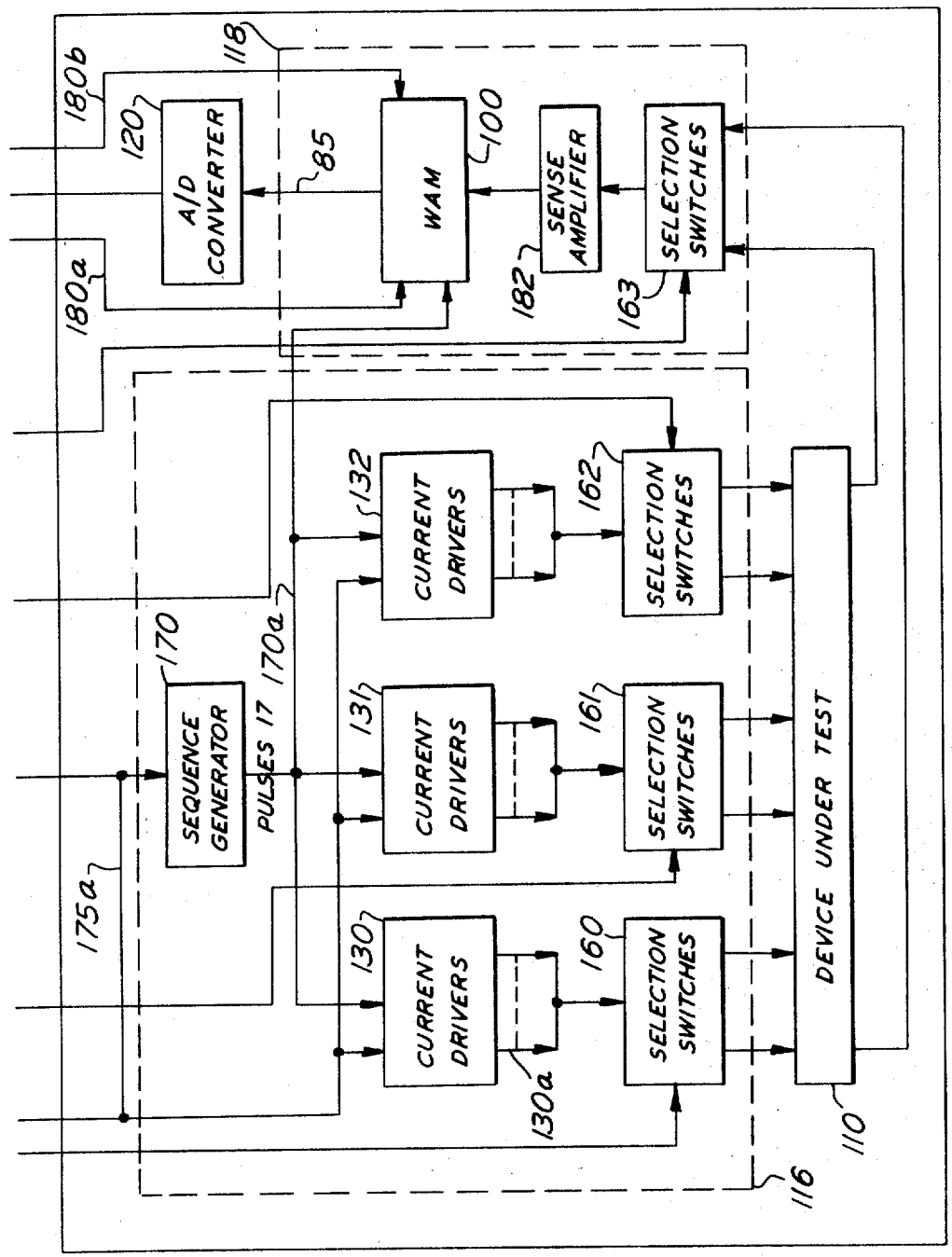

Referring now to FIGS. 3A—B there is shown a block diagram of the test measurement and evaluation system of FIG. 1 in which computer 112 is represented by the functions performed by its stored program. The other blocks of FIG. 1 are represented except for converter 114. As later explained in detail that digital to analog conversion is performed by current drivers 130—132 as part of their operation.

The following description analyzes system operation starting with the time when the operator inputs data by way of input 122 and ending with the completion of the test. The operation of the system of FIGS. 3A—B will be described with respect to the flow chart of FIGS. 2A—C.

In the logic flow chart of FIGS. 2A—C a rectangle indicates an operation, a diamond represents a two-way decision, a circle indicates a flow connector and a triangle indicates off-line storage 126.

Computer 112 is loaded with an operating program a listing for which will later be provided in detail.

Block 135—The starting point of the operation is the normal idle condition of the system.

Block 137—The system requests test parameter inputs which are supplied by input data 122.

Block 139—For each parameter input entered the program tests for validity. If the input is not valid then an error message output report provided by block 140 is printed by output device 124.

Block 142—If the input data is valid then the data is classified and stored.

Block 144—If the input data is a command to start the test, the operation proceeds to block 146. If it is not, operation returns to block 137 for more input data.

Block 146—149—These blocks cause counters 150—153 to be set to their initial specified values. These initial specified values are part of the input data provided during the operations described by blocks 137 and 139. In this manner first counter 150 is set and in sequence counters 151—153 are set to their initial specified values.

Blocks 155—158—These blocks cause selection switches 160—163 to be selected. Specifically counters 150—151 operate through encoders 165—167 and switch selectors 168, 169, 178 and 179 to make switch selections 160—163 in accordance with the values set in counters 150—151 by blocks 146—149.

The functions of encoders 165/6—7 and the functions of switch selectors 168, 169, 178 and 179 are provided by program subroutines as set forth in the computer listing later provided. These program subroutines logically and mathematically operate on the values in counters 150—151 in accordance with the input data supplied by the operator. These logical and mathematical operations perform operations on selection counters 150—151 and input data 122 to cause the proper switches of switches 160—163 to be selected and in this manner to properly test a core in device 110. The operation of these subroutines will allow them to inherently operate on input variable input data so that the specific device under test 110 can be properly tested.

Blocks 171—172—Having made the selection of a particular core in device 110 it is now necessary to establish the proper pulse sequence and drive current pulse parameters for the core. Once these are selected the actual sequence can be initiated by a sequence generator 170. It will be understood that the proper structure program or sequence to be used is a function of the characteristic of the cores under test and the type of test specified by input data 122. Specifically function generator subroutine 173 receives inputs from counters 150—152 and also from test control and sequencing subroutine 175. Function generator 173 operates on these inputs to select one of several pulse sequences and transfers this information to sequence generator 170. It will be understood that the foregoing system operation relating to selecting proper drive current pulses and pulse sequences is a major area of system operation that can be modified by closing the loop as will later be described in detail.

Sequence generator 170 produces a train of pulses which is applied to current drivers 130—132. Accordingly current drivers 130—132 apply precision current pulses through switches 160—162 which have been previously selected and then to the elements under test. It is these pulses which cause core 10 to generate response voltage characteristic 15 to be analyzed by subsystem 118. The characteristics of the pulses produced by drivers 130—2 have previously been determined by input data 122 and by block 171. The resultant pulses applied to the element may be considered disturbing pulses and are described for example at page 21 et seq, C.J. Quartly, Square-loop Ferrite Circuitry, Prentice-Hall Inc., 1962.

Block 176—Represents a pause in the program while the sequence generator 170 completes its operations.

Block 177—A determination is made whether response analysis is required. If response analysis is required then result selector subroutine 180 produces multiplex control signals by way of a line 180a which is applied to multiplex circuits 97—97b, FIG. 9B, thereby to produce multiplexed output 85.

It will now be understood that response voltage characteristic 15 produced by the element under test is applied from device 110 to selection switches 163. Characteristic 15 is amplified by sense amplifier 182 and applied to measurement system 100 and specifically detector 20 and buffer 51, FIG. 9A. The selection of switches 163 has previously been described with respect to blocks 155—158. In addition trigger signals are applied to measurement system 100 to provide a program step by way of a line 170a and a clear signal by way of a line 180b. The multiplexed output 85 is converted to digital form by way of a converter 120 with the resultant output being received by result selector subroutine 180. In the flow chart of FIGS. 2A—C all of the preceding operations relating to acquiring results of measurement system 100 is shown by block 184.

Block 186—The foregoing results are recorded in a result storage 188 which may be a distribution table.

Block 187—The results are compared with high and low acceptance levels by a result comparator 189. The acceptance level is determined by input data 122 and comparator 189 determines whether there is acceptance or nonacceptance.

Blocks 192—193—If the results are not acceptable then error counters 194 are updated to record the instance of error. Result storage 188 and error counters 194 are maintained for the duration of the test so that output reports 124 may be made after all of the elements of device 110 have been tested in accordance with the input data.

Blocks 195—196—If the results are acceptable or not acceptable the data for each element may be output by report generator 197 at this time. This determination whether to output data at the actual time of receipt is made by input data 122.

Block 200—Without changing the element to be tested the identical test may be repeated.

Block 202—If the identical test is not to be repeated then a determination must be made if the results require a parameter change. Such a parameter change based on the results received is determined by input data 122.

Block 203—If such a parameter change is considered necessary then new test parameters are read in from off-line storage 126 represented by flow chart block 126a. In accordance with the invention these new test parameters will provide for a different drive current pulse, a different pulse sequence, etc. After new test parameters are input from storage 126 the test operation automatically begins with the first element in device 110 as indicated by connector symbol "C" returning to block 146.

Blocks 204—214—If a parameter change is not required the test procedure may proceed to the next element. This is accomplished by setting counters 150—153 to their next appropriate value. If selection counter 150 is not a maximum then this counter is updated to its next value and the operation returns to block 155 by way of connector "A." If counter 150 is set to its maximum then it is set to its initial value and a determination is made whether selection counter 151 is at a maximum. If it is not at a maximum then counter 151 is updated to its next value and control then transfers to block 155. If counter 151 is at a maximum it is set to its initial value and iteration counter 152 is checked for maximum. If counter 152 is not at a maximum then it is updated and control returns to block 155. If counter 152 is at a maximum then it is set to its initial value and a determination is made whether counter 153 is equal to a maximum. If counter 153 is not at a maximum then it is updated and control returns to block 155. If counter 153 is at a maximum all elements have been tested. It will be understood that if counter 153 is at a maximum all the elements of device 110 have been tested the required number of times specified by input data 122.

Blocks 215—216—After all of the cores or elements have been tested a determination is made if output reports are required. If such reports are required then a printout is made of the information contained in result storage 188 and error counters 194 using report generator 197.

Block 218—If output reports are not required or when the required reports have been made a determination is made whether to repeat the same test sequences. If it is determined to repeat the sequences then connector "C" is used to return to block 146. In this manner the complete test is repeated in its entirety.

Block 220—If the same test sequence is not to be repeated a determination is made whether new tests are to be performed. If new tests are to be performed, new test parameters are read in from off-line storage 126 as indicated by block 126b. Thus connector "C" is used to return to block 146 where the entire test sequence is repeated using the new test parameters.

Block 224—If new tests are not to be performed, then the test is complete and there is a return by way of connector "D" to block 137 returning the system to its idle state awaiting new test inputs from input data 122.

SEQUENCE GENERATOR

As previously described sequence generator 170 turns on current drivers 130—132 in accordance with input data 122, and generator 170 also provides trigger pulses to system 100 by way of lines 170a. The test sequence is varied by generator 170 on command by pulse program selector 173a. Sequence generator 170 is shown in block diagram form in FIG. 4 and comprises registers, counters, transfer and control logic, input-output circuits and a clock.

In order to explain the operation of generator 170 it may be assumed that input data has been applied by way of data input lines 175a to load all of the static registers 240—247p with input data. Operation starts upon transfer of a command word from selector 173a and line 175a, through I/O logic circuit 252 and to a control register 250. Receipt of the command word by control register 250 is effective to produce an enable signal by way of a line 250a to start clock 254. Clock 254 has a pulse rate of 2 megahertz which is applied to a counter 255 the contents of which are compared with a divide register 246. If a binary one has been loaded into divide register 246 then comparator 256 is effective to divide the 2 megahertz clock rate by one to produce a 2 megahertz generator output on a generator output line 257. In another example, if a binary two had been stored in register 246 then a 1 megahertz generator output is produced on line 257. In this manner a programmable clock rate may be produced at output 257 having values equal to 2 megahertz divided by integers from $2^0$ through $2^{15}-1$.

The generator output on line 257 is applied to an AND gate 259 which is normally enabled thereby to step counter 258 through positions determined by the contents of the command word as stored in control register 250. As a result there is produced a timing sequence from one through 16 basic positions or steps the actual number being specified or varied by the command word in register 250. As the foregoing count occurs the binary states thereof are decoded by a step decoder 260 and distributed to static registers 240, 241, 247a—p and 245 by way of path 262. As the count progresses the decoded positions or steps sample the contents of registers 247a—p and 245. If there is a binary one in any one of these bit positions in these registers there is produced a pulse output on the particular line associated with that register. All of these lines are indicated as lines 170a which are connected to drivers 130—132 and system 100.

Similarly, as the count progresses, pair repeat register 240 and step repeat register 241 are sampled. If there is a binary one in either of these registers a flag is produced by register 240 if there is a pair repeat and the flag is produced by register 241 if there is a step repeat. A pair repeat has precedence over a step repeat. The flags from registers 240 and 241 are applied to and gates 264 and 265 respectively and are effective to control the count sequence by counter 258. A step repeat indicates the repetition of a desired number of disturbing pulses. A pair repeat indicates, in a typical situation, a pair of read and write signals being applied such as in a conditioning cycle for core testing. The pair repeat and step repeat cycles are defined in the above defined ASTM Standard C526-63T. The time between successive clock pulses may be defined as a step.

Accordingly, having made a decision to repeat a pair (register 240) or to repeat a step (register 241) and with interval 1 register 243 and interval 2 register 244 each loaded with a number, then interval select register 242 is effective to determine which of registers 243—244 will be used to determine the number of repeats. Having decided which of the number in registers 243—244 to use, counter 265 and comparator 2 are effective to stop counter 258 until such time as the required number of repeats have been accomplished. While counter 258 has been stopped the clock signals are still being applied by way of generator output line 257. In this manner the contents of registers 247a—p continue to be sampled on the particular step where counter 258 has been stopped.

The operation continues with counter 258 stepping until a stop step is reached. A stop step is defined in the command word stored in register 250. Accordingly operation terminates until another command word is received by register 250.

In prior function generators which have performed sequencing operations there have been provided manually operated switches. Accordingly in such prior generators in order to alternate the program sequence the test is stopped and the normal operation is interrupted. After the switches have been repositioned then the test continues. By the use of sequence generator 170 there is avoided the necessity of stopping the test and interrupting operation. Thus, there is achieved storage and remote programmability of the trigger sequence applied by way of lines 170a with the number of step and pair repeats and the frequency of sync sequence being under the control of input data 122.

To summarize the foregoing operation upon command, sequence generator 170 cycles through preprogrammed cycles in the order of steps indicated by the command word in register 250. Under the control of counter 258 the contents of registers 247a—p are sampled. There is a repeat in those steps or pairs determined by the contents of registers 240—241 for intervals determined by registers 243—244 as selected by register 242. The foregoing operations occurs at a rate determined by register 246. In this manner there is produced trigger sequences or pulses on lines 170a.

CURRENT DRIVERS

Figure 5:
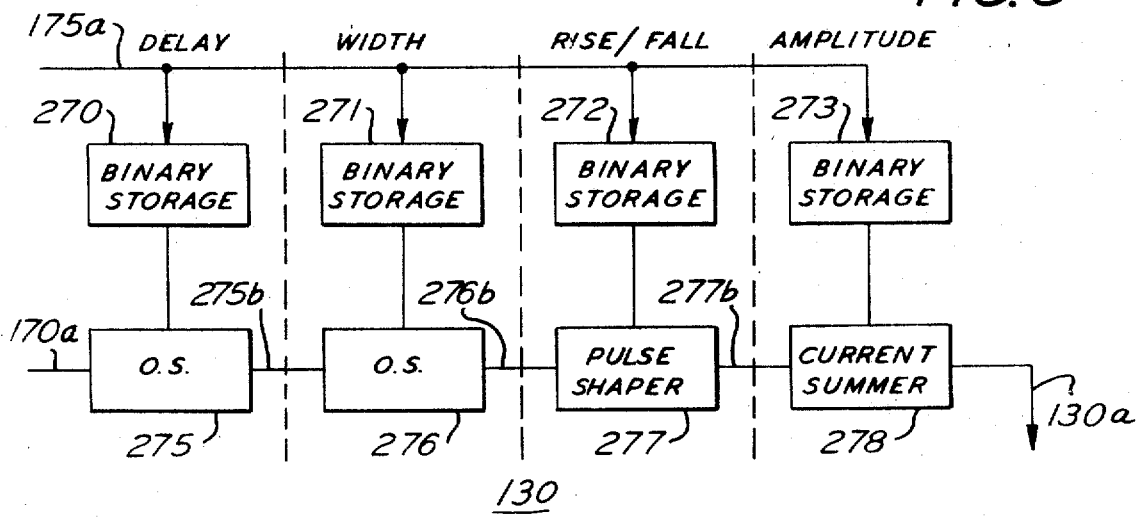
FIG. 5 illustrates in more detailed block diagram form a current driver of FIGS. 3A—B.

Current drivers 130 may comprise one or more individual current drivers, one of which is shown in detail in FIG. 5. It will be understood that current drivers 131 and 132 also comprise one or more individual current drivers with each individual driver being identical to that shown in FIG. 5 and thus only one of them need be explained in detail. Individual driver 130 includes a four binary storage elements 270—273 each of which comprises a 10-bit storage register with input and output transfer gates. It will be assumed that elements 270—273 have been loaded with input data 122 by way of line 175a.

Figure 5A:
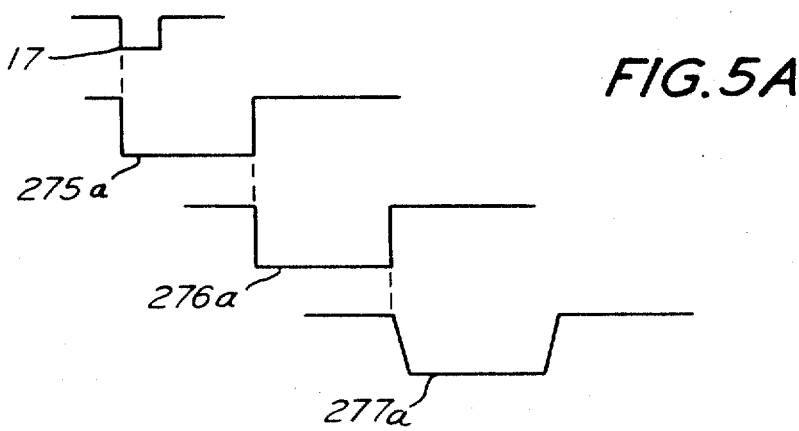
FIGS. 5A—B illustrate waveforms helpful in understanding FIG. 5.
Figure 5B:
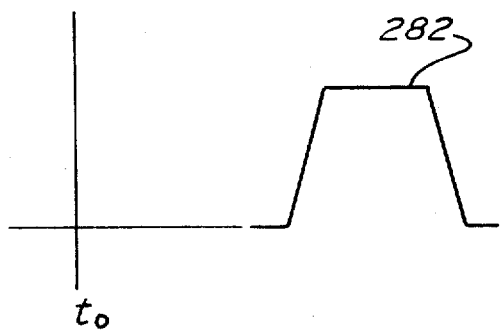

Upon application of a trigger pulse 17 on lines 170a, one shot or monostable multivibrator 275 is effective to switch to its quasi-stable state the duration of which is a function of the number loaded in storage element 270. Accordingly a pulse 275a, FIG. 5A, is produced at output 275b which is applied to one shot 276. In this manner one shot 276 is switched to its quasi-stable state the duration of which is determined by the number in element 271. As a result, a pulse 276a is produced at output 276b which is applied to a pulse shaper 277. Shaper 277 is effective to shape the leading and trailing edge of pulse 276a to form pulse 277a in accordance with the number stored in storage element 272. Pulse 277a, FIG. 5A is applied by way of output 277b to a voltage to current converter and summer 278 which comprises 10 individual summing stages in parallel. Each of the summing stages receives an input from an individual bit of storage unit 273 and is effective to control the amplitude of a drive current pulse 282, FIG. 5B, which is applied by way of output 130a to selection switches 160.

In the manner described above there is provided a conversion of binary information from elements 270—273 to the circuits 275—278 respectively to effect a digital to analog conversion of data. This digital to analog conversion is shown functionally as block 114 in FIG. 1.

In summary the advantages of current driver 130 are the provisions of internal storage and rapid programmability for not only amplitude of waveform 282 but also rise and fall time, delay time and width of the waveform. In addition there is provided constant rise and fall time even when the amplitude of the waveform is changed.

SELECTION SWITCHES

Referring now to FIG. 6 there is shown a single selection switch 160 though there may be more than one such switch within block 160. Selection switches 161 and 162 and 163 are identical with switch 160 and therefor need not be described in detail.

Data is applied to switch 160 by way of line 168a from switch selector 168 to an AND gate 285. In similar manner lines 169a, 178a and 179a apply data from selectors 169, 178 and 179 respectively to switches 161—163 respectively.

The other input to AND gate 285 may be connected to control switches 285a on the front panel of selection switch 160 so that high order bits are compared with that switch setting. If there is a match the low order five bits from the data on line 168a are transferred to registers 287 and/or 289 depending on the particular bit configuration. If there is no match then the high order bits of registers 287 and 289 may or may not assume the zero state depending on the high order bit configuration. If the high order bits do assume the zero state then the outputs of the most significant bits (MSB) 287a and 289a are effective to deenergize coils 290a and 291a respectively which in turn is effective to disconnect the switch 160 from line 130a.

In a match condition the four bits of information in register 287 is applied to a one of 16 decode and relay drive 290. The information is effective to control the 16 switches 292 only two of which have been illustrated. Similarly the four bits of information in register 289 controls a similar decode and relay drive 291 which is effective to energize particular ones of 16 switches 293 only two of which have been illustrated. Accordingly in a scanned sequence a string of data is applied to switch 160 and a particular scanning sequence is produced for the application of the stimuli or current pulses in a predetermined sequence.

In summary by the use of the control switches 285a connected to gate 285 it is possible to obtain different scanned sequences for multiple pole operation and matrix operation. The scan may be an increasing sequence, a decreasing sequence or a random sequence. Thus there is provided the ability to match the switch function by selection switch 160 as well as the ability to store the data input.

WAVEFORM ANALYSIS AND MEASUREMENT SYSTEM

Figure 7:
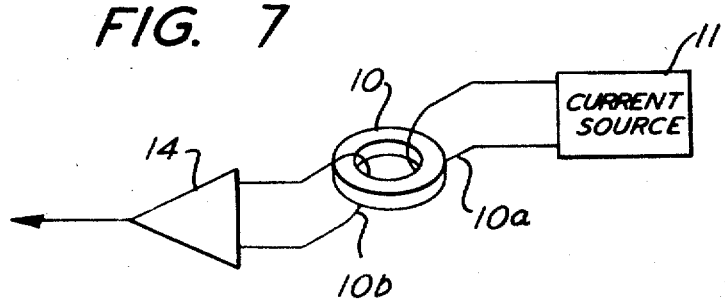
FIG. 7 illustrates in simplified form a stimulating signal being applied to and a response taken from a single memory element.
Figure 8:
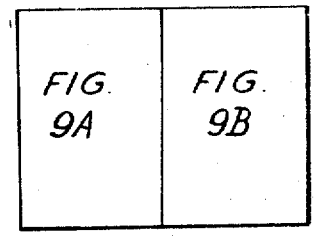
FIG. 8 illustrates how FIGS. 9A—B may be taken together.
Figure 10A:
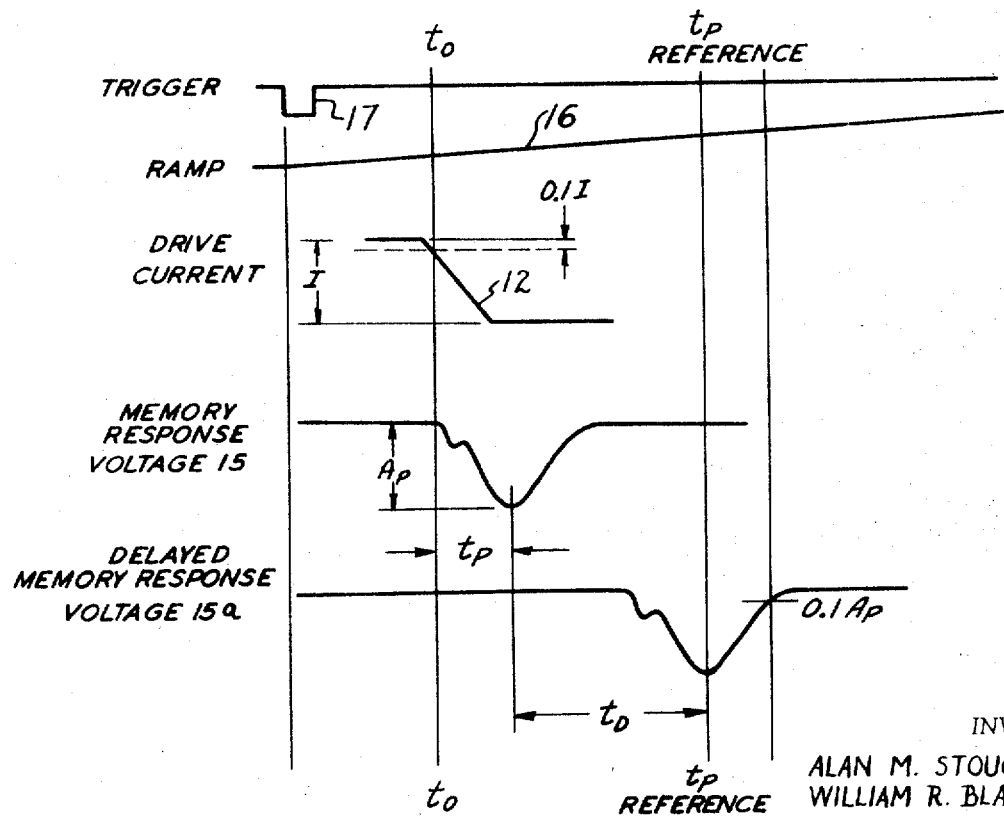
FIGS. 10A—B illustrate waveforms helpful in understanding FIGS. 9A—B.
Figure 10B:
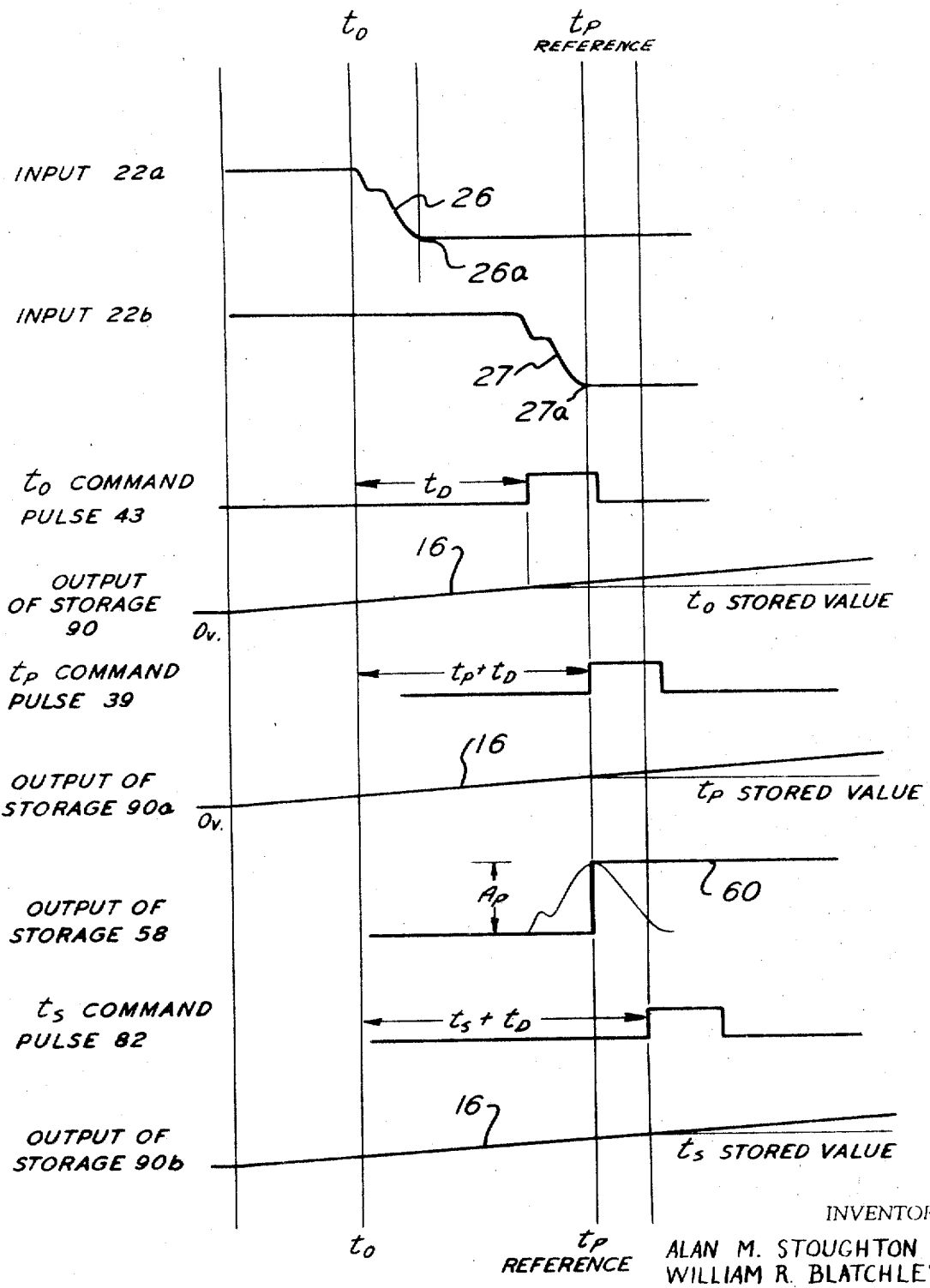

Referring to the waveforms of FIGS. 10A—B upon actuation by a trigger pulse 17 source 11 produces a current pulse 12 which is applied to winding 10a of core 10 as shown in simplified form in FIG. 7. An output voltage pulse which may be defined as a memory response voltage characteristic 15 is produced at winding 10b of core 10 is applied to a sense amplifier 14 which is shown as block 182, FIGS. 3A—B. Accordingly, a test method may involve driving core 10 to a known magnetic state and then measuring response voltage characteristic 15 as applied to sense amplifier 14 during a read operation for example.

The parameters of response characteristic 15 to be measured may be defined as follows with respect to $t_0$:

$A_p$=the value of the peak voltage of characteristic 15.

$t_p$=the time duration between (1) time $t_0$ which occurs at 10 percent of the maximum value I of drive current pulse 12 and (2) the time that the peak voltage of characteristic 15 occurs.

$t_s$=is the time duration between (1) time $t_o$ and (2) the time that characteristic 15 has decreased in an absolute direction to 10 percent of its peak value $A_p$.

Figure 9A:
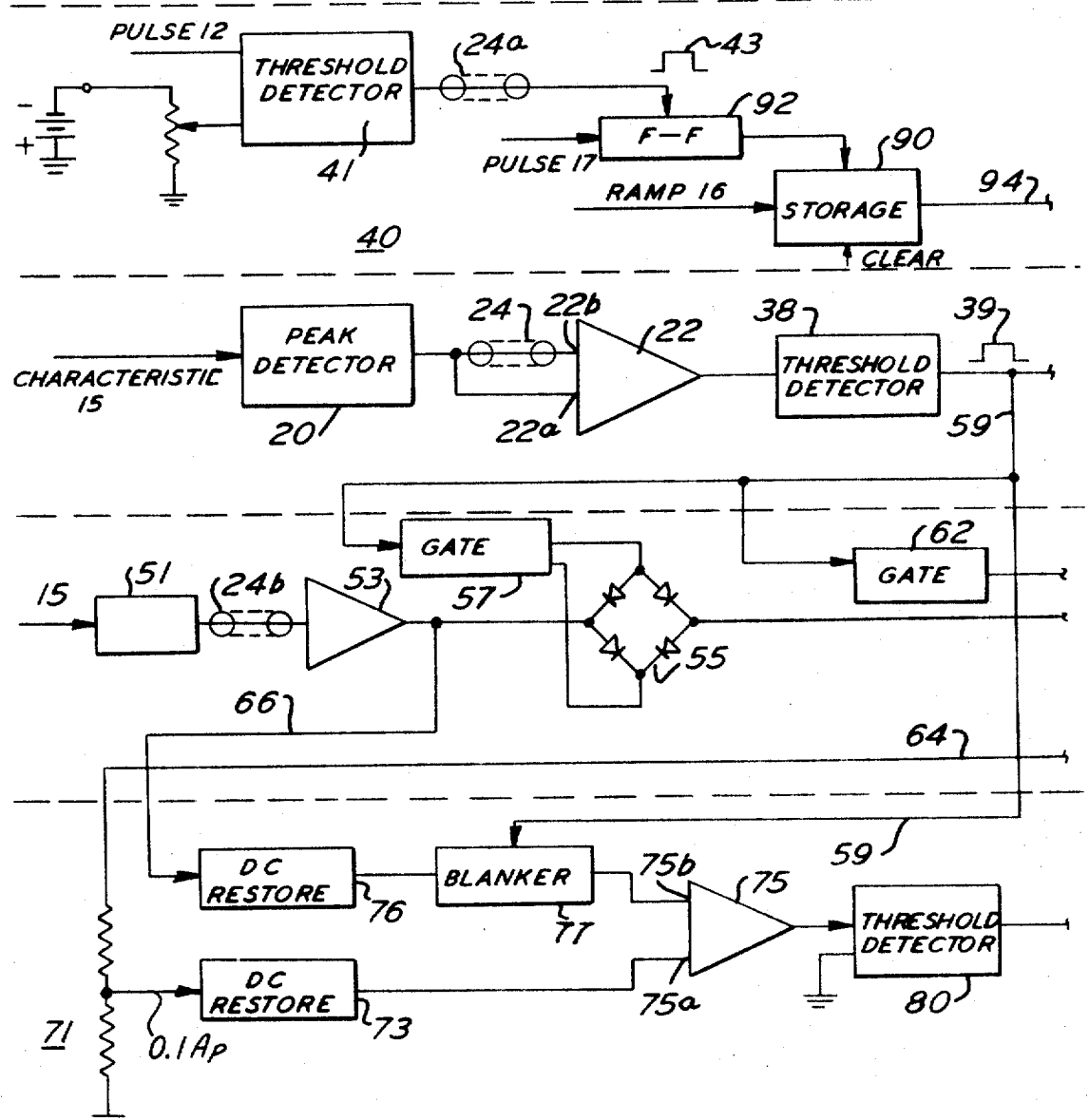

The foregoing three parameters $A_p$, $t_p$ and $t_s$ are measured on a one shot or nonrepetative basis by a waveform analysis and measurement system 100 as shown in FIGS. 9A—B and described in patent application Ser. No. 813,078 filed concurrently herewith and assigned to the same assignee as this invention. $t_p$ is measured by first applying voltage characteristic 15 to a peak amplitude detector 20 of a $t_p$ time channel 19. Peak detector 20 comprises a low value shunt capacitor and is effective to rectify voltage characteristic 15. The shunt capacitor is continually charged by characteristic 15, until the peak amplitude is achieved. The resultant output is directly applied to an input 22a of a differential amplifier 22. In addition the same output of detector 20 is also applied by way of a time delay network or cable 24 to input 22b of differential amplifier 22. In this manner the inputs to amplifier 22 are the identical detected signals though one is delayed with respect to the other.

The voltage characteristic applied to terminal 22a is shown in FIGS. 10A—B as waveform 26 having a peak value 26a which is reached at the same time characteristic 15 reaches a peak voltage. Similarly, the voltage characteristic applied to terminal 22b is shown by characteristic 27 having a peak value 15a reaches a peak voltage and is equal to voltage value 26a. Waveforms 26 and 27 taken as absolute values are algebraically subtracted by differential amplifier 22 to produce a resultant absolute waveform which is applied to a threshold detector 38. The resultant waveform from amplifier 22 crosses ground threshold at the time when waveform 27 reaches it peak value 27a which is equal to peak value 26a of waveform 26. Accordingly, the leading edge of a rectangular output pulse 39 ($t_D$ command signal) from a threshold detector 38 indicates the time of $t_p$ reference. It will now be understood that $t_p$ reference occurs at a time equal to $t_p+t_D$ where $t_D$ is a subtractable constant value.

The generation of a $t_O$ command pulse 43 will now be described. Current pulse 12 produced by source 11 is applied to a threshold detector 41 of $t_O$ time channel 40. The other input to detector 41 is a DC reference potential which is adjustable to a DC value equal to 10 percent of the maximum value I of drive current pulse 12. Accordingly, detector 41 produces a rectangular output pulse at time $t_O$ when current pulse 12 passes the 10 percent threshold. The $t_O$ pulse is delayed in time by a time delay network 24a having a delay time $t_D$ equal to that of delay network 24 of channel 19. The resultant pulse 43, FIGS. 10A—B will be used for all subsequent time measurements.

The time difference between the leading edges of command pulses 43 and 39 is exactly equal to the time values of $t_p$. This may be understood when it is considered that the leading edge of pulse 39 occurs at time $t_p+t_D$ while the leading edge of pulse 43 occurs at a time duration $t_D$ after time $t_O$. Thus, the leading edge of command pulse 43 effectively indicates time $t_O$ for the remaining command pulses 39 and 82 and $A_p$ analog signal 60.

In order to determine the value of $A_p$, voltage characteristic 15 is applied to an $A_p$ amplitude channel 50. Specifically, characteristic 15 is applied to a buffer 51 the output of which is delayed by delay line 24b. Line 24b provides a delay time $t_D$ exactly equal to the delay times of lines 24 and 24a. Delayed characteristic 15a is applied by way of an amplifier 53 to an input of a high speed sampling bridge 55 which is controlled by a strobe gate or generator 57. Gate 57 is actuated to sample delayed characteristic 15a by the leading edge of pulse 39 which is applied thereto by way of conductor 59. Accordingly, delayed characteristic 15a is strobed at the time of its peak voltage which occurs at time $t_p$ reference. Accordingly, the waveform at the output of bridge 55 is a direct proportion of $A_p$, the peak amplitude of characteristic 15. This $A_p$ analog signal is stored by an analog storage circuit 58 which is gated to store by a gate 62 also under the control of pulse 39. Thus, the leading edge of pulse 39 is effective to cause storage circuit 58 to store and hold the $A_p$ analog signal (waveform 60, FIGS. 10A—B) until later cleared.

$A_p$ analog signal 60 is applied by way of conductor 64 to a voltage divider network 71 of a $t_s$ time channel 70. Network 71 is effective to divide the $A_p$ analog signal by 10 to provide a 0.1 $A_p$ analog signal which is applied by way of a DC restorer 73 to one input 75a of a differential amplifier 75. The delayed voltage characteristic 15a is taken at the output of amplifier 53 and applied by way of a conductor 66, a DC restorer 76 and through a blanker 77 to amplifier input 75b. Pulse 39 is applied to blanker 77 to blank out undesired memory response characteristics and to only pass delayed characteristic 15a. When the signals applied to inputs 75a—b are exactly equal in value, the output of amplifier 75 crosses ground threshold which is detected by a threshold detector 80. This threshold crossing indicates that delayed characteristic 15a is equal to 0.1 $A_p$ and occurs at time $t_s+t_D$. Accordingly, the leading edge of $t_s$ command pulse 82 produced at the output of detector 80 occurs at time $t_s+t_D$.

The time difference between the leading edge of $t_D$ command pulse 43 and $t_s$ command pulse 82 is exactly equal to the time value of $t_s$. This may be understood on the basis that the leading edge of pulse 43 occurs at a time duration $T_D$ after time $t_O$ and the leading edge of pulse 82 occurs at time $t_s+t_D$ after time $t_O$.

It will now be understood how command pulses or signals 39, 43 and 82 have been generated as well as the $A_p$ analog signal. It will now be explained how these signals are used to generate a single multiplex output 85.

Prior to time $t_O$ and the beginning of drive current pulse 12 the leading edge of a trigger pulse 17 applied by way of lead 170a, FIGS. 3A—B, initiates a ramp voltage 16 having a known and constant dv/dt. The ramp voltage 16 is applied to each of analog storage circuits 90—90b each of which is similar to circuit 58 and may comprise a storage capacitor connected to a switching field effect transistor. Circuit 90 is used in channel 40 and $t_O$ command pulse 43 is applied by way of a bistable network 92 to circuit 90. Bistable circuit 92 has previously been enabled by the occurrence of trigger pulse 17 by way of lead 170a. Thus, pulse 43 is effective to switch circuit 92 to cause storage circuit 90 to store the value of ramp voltage 16 occurring at the time of the leading edge of pulse 43. The value of ramp voltage as stored by circuit 90 is indicated in FIGS. 10A—B as $t_O$ stored value of analog signal.

In similar manner $t_p$ command pulse 39 is applied to a bistable circuit 92a. Circuit 92a has been enabled by trigger signal 17 so that storage circuit 90a stores that value of ramp voltage occurring at the time of the leading edge of pulse 39. In this manner storage circuit 90a stores a value of ramp voltage indicated at $t_p$ stored value. Similarly $t_s$ command pulse 82 is applied by way of enabled bistable circuit 83 to analog storage circuit 90b. In this manner circuit 90b stores that value of ramp voltage occurring at the time of the leading edge of pulse 82 which is indicated at $t_s$ stored value. Clear signals are applied to storage circuits 90—90b and 58 by way of line 180b, FIGS. 3A—B when a new multiplex signal is to be generated.

The $t_O$ and $t_p$ values stored by circuits 90 and 90a respectively are applied by way of conductors 94 and 94a respectively to inputs of a differential amplifier 95. Accordingly, amplifier 95 produces an output signal equal to $k(t_p-t_o)$ which is proportional to the value of $t_p$. Similarly the $t_O$ and $t_s$ stored values from storage circuits 90 and 90b respectively are applied by way of conductors 94 and 94b to differential amplifier 95b. Accordingly, amplifier 95b produces an output signal equal to $k(t_s-t_o)$ which is proportional to the value of $t_s$. Further the output of analog storage circuit 58 is applied by way of a conductor 94c to one input of differential amplifier 95a the other input of which is grounded. In this manner $A_p$ analog signal 60 provides at the output of amplifier 95a a signal equal to $k(A_p)$ which is proportional to $A_p$. If amplifiers 95—95b are identical amplifiers the outputs of these amplifiers may be multiplexed to provide a single multiplex output 85 with the order of multiplexing being as follows: amplifier 95a, 95 and 95b.

In the multiplexing operation the outputs of amplifiers 95—95b are applied by way of multiplex circuits 97—97b to one input of a differential amplifier 98. The other input of amplifier 98 is grounded. Circuits 97—97b each include a field effect transistor switching circuit and multiplex command signals applied by way of path 180a are applied to actuate the switching circuits. Specifically, command signals are applied in sequence to circuits 97a, 97 and then 97b to produce multiplex output 85 which is applied to A/D converter 120, FIGS. 3A—B.

It will be understood that measurement system 100 effectively measures time with respect to $t_0$ where $t_0$ has been defined as the time of 0.1 I and I is the amplitude of the drive current pulse 12. Such measurement with respect to $t_0$ is to be compared with prior measurements which have been with respect to the leading edge of trigger pulse 17, for example. Due to considerations of circuit stability of current source 11, the delay between the leading edge of trigger pulse 17 and the leading edge of drive current pulse 12 is not constant but subject to minor variations. If trigger pulse 17 were used for the time measurement of response voltage characteristic 15 in the manner previously described to obtain $t_p$, $A_p$ and $t_s$, then such minor variations would be reflected in the measurement and production of multiplex signal 85. Accordingly this effective "jitter" is eliminated by using instead of pulse 17, current pulse 12 as the time reference and specifically 0.1 I.

General purpose digital computer 112 is an SDS SIGMA 2 Computer made by Scientific Data Systems, Inc., El Segundo, California 90245. The program described by the flow chart of FIGS. 2A—C to perform the subroutines of FIGS. 3A—B is written in SYMBOL assembly language for the SDS SIGMA 2 Computer. SYMBOL assembly language is described in SYMBOL Reference Data Systems, SDS SIGMA 2 Computers, copyright 1967, Scientific Data Systems, Inc. The following is a listing of the program in SYMBOL language as generated by the SIGMA 2 assembly program.

```
*******************************************************************************
*
*              PROTOTYPE OF BASEPLATE 404/1C
*
*        MEMORY PLANE  AND STACK TEST PROGRAM
*
*>>>>>>>>>>> CONTROLLED COPY: LISTING NO. OC-4001C-51  <<<<<<<<<<<<<<<........
*
*        MARCH 7, 1969                                      H.R.S.
*
*******************************************************************************
*
*>>>>>>>>>>>>>>>>>>>>>>>>>>> NOTE  <<<<<<<<<<<<<<<<<<<<<<<<<<<<<<<<<<<<<<<<<<<
* 1) THE FUNCTIONS OF THE DATA SWITCHES ON THE CPU ARE:
*           #0 - NO TEST
*           #1 - ENABLE SCOPE DISPLAY
*           #2 - WAM INHIBIT
*           #3 - STROBE DISCRIM. INHIBIT.
* 2) THIS PROGRAM IS INTENDED TO BE USED IN CONJUNCTION WITH THE KEYBOARD
*    CONTROL PANEL.
*
          END
```

```
*BASEPLATE EXECUTIVE CONTROLLER AND RESULT ANALYSIS/REPORT.
*
*
*      PROTOTYPE ASSEMBLY REVISION LEVEL C
*
*      H.R.S.                              MARCH 7, 1969
*REVISION--A-- AMS 7/12/68
*REVISION--B-- HRS 11/20/68
*  B    MODIFIED ROUTINES COMMENCING WITH ZIDISTRI, ZNPARAM7, ZIBIX,
*       ZNPARAM6, ZISETNLZ, ZIRDDIS, AND ZIINC.
*       REMOVED THREE RES CARDS (Z APDIST, ZTTPDIST, ZTTSDIST).
*       CHANGED REF CARD FROM ZIXU  TO ZIADUP.
*
        PAGE
        DEF     SLOEXEC
        DEF     SHIEXEC
        DEF     SIZEXEC
        DEF     ZWASAVE
        DEF     ZWTSAVE
        DEF     ZWESAVE
        DEF     ZWBSAVE
        DEF     ZWXSAVE
        DEF     ZWLSAVE
        DEF     ZFCONCMD
        DEF     ZITSTCY
        DEF     ZIEXECC1
        DEF     ZFMTTRDY
        DEF     ZIBIDEC
        DEF     ZIMOVE
        DEF     ZIMASTER
        DEF     ZTVALUES
        DEF     ZNSVDVAL
        DEF     ZISYSER
        DEF     ZISCOPIN
        DEF     ZISCPRET
        DEF     ZFRSLTER
        DEF     ZNX1PSD1        INTEGRAL 1 INTERRUPT PSD WORD.
        DEF     ZNX1PSD2        INTEGRAL 1 INTERRUPT PSD WORD.
        DEF     ZWASAVE         A REG. SAVE LOC.
        DEF     ZWESAVE         E REG. SAVE LOC.
        DEF     ZWTSAVE         T REG. SAVE LOC.
        DEF     ZWLSAVE         L REG. SAVE LOC.
        DEF     ZWXSAVE         X REG. SAVE LOC.
        DEF     ZWBSAVE         B REG. SAVE LOC.
        DEF     ZNCMODE
        DEF     ZIERRCTL
*
        REF     KIISCS
        REF     ZITCNTRL
        REF     ZFLCNO
        REF     ZNPATVAL
        REF     ZFTC
        REF     ZCACTN
```

```
         REF     ZNCURSGS
         REF     ZTZACTN
         REF     ZTYACTN
         REF     ZFTIP
         REF     ZNXAD                CURRENT X ADDRESS.
         REF     ZNYAD                CURRENT Y ADDRESS.
         REF     ZNZAD                CURRENT Z ADDRESS.
         REF     ZIADUP
         REF     ZBTOOLIN
         REF     ZISCSTRT
         REF     ZNTMODE
         REF     ZIGOCHK
         REF     ZNBIRES1
         REF     ZNBIRES2
         REF     ZWCRIWRD
         REF     ZNDEVICE
         REF     ZNDVCNO
         REF     ZIODROP
         REF     ZIERR2OC
         REF     ZFPUNCH              PUNCH FLAG.
         PAGE
******** BEGIN ABSOLUTE SECTION OF PROGRAM.
         ASECT
         ORG     X'7A'
ZMRESULT TEXT    'RESULT: '
ZMERMARK TEXT    'ER---> '
ZM&SPACE TEXT    '       '
ZMERRORS TEXT    'ERRORS: '
ZMTSTCMP TEXT    'TEST COMPLETE '
ZMXYP    TEXT    'XYP='
ZMAP     TEXT    '  AP='
ZMTP     TEXT    '  TP='
ZMTS     TEXT    '  TS='
ZMST     TEXT    '  ST='
ZMAPH    TEXT    ' APH='
ZMTPH    TEXT    ' TPH='
ZMTSH    TEXT    ' TSH='
ZMAPL    TEXT    ' APL='
ZMTPL    TEXT    ' TPL='
ZMTSL    TEXT    ' TSL='
ZMST1    TEXT    ' ST1='
ZMST2    TEXT    ' ST2='
ZMST3    TEXT    ' ST3='
ZMST4    TEXT    ' ST4='
ZMST5    TEXT    ' ST5='
ZMST6    TEXT    ' ST6='
ZM1S     TEXT    '1''S;'
ZMOS     TEXT    '0''S '
ZMMV     TEXT    ' MV.'
ZMNS     TEXT    ' NS.'
ZMNOTEST TEXT    'NO TEST '
ZMDISTRI TEXT    'DISTRIB.'
ZMCYCLE  TEXT    'RECYCLING.'
```

```
        ZMCONTIN TEXT     'CONTINUING.'
        ZMMTTNR  TEXT     'SYSTEM ERROR    RESTART.'
        ZMERRCTL TEXT     'SWITCH ERROR RESTART'
                 ORG      X'107'
                 DATA     ZNCPPSD1         STANDARD LOCATION-CONTROL PANEL.
                 ORG      X'10C'
                 DATA     ZNX1PSD1         LOC., INTEGRAL 1 INTERRUPT ROUTINE.
                 DATA     ZNX2PSD1         LOC. INTEGRAL 2 INTERRUPT ROUTINE.
******* END OF ABSOLUTE PROGRAM SECTION.
                 PAGE
                 CSECT
*
                 ORG      X'110'           ******* TEMP. CARD *****
        SLOEXEC  EQU      $                EXECUTIVE LOW MEMORY LIMIT
        P        EQU      1                PROGRAM REGISTER
        L        EQU      2                LINK REGISTER
        T        EQU      3                TEMPORARY REGISTER
        X        EQU      4                INDEX REGISTER
        B        EQU      5                BASE REGISTER
        E        EQU      6                EXTENDED ACCUMULATOR
        A        EQU      7                ACCUMULATOR
        ZKBIT15  EQU      X'60'
        ZKBIT14  EQU      X'61'
        ZKBIT13  EQU      X'62'
        ZKBIT12  EQU      X'63'
        ZKBIT11  EQU      X'64'
        ZKBIT10  EQU      X'65'
        ZKBIT09  EQU      X'66'
        ZKBIT08  EQU      X'67'
        ZKBIT07  EQU      X'68'
        ZKBIT06  EQU      X'69'
        ZKBIT05  EQU      X'6A'
        ZKBIT04  EQU      X'6B'
        ZKBIT03  EQU      X'6C'
        ZKBIT02  EQU      X'6D'
        ZKBIT01  EQU      X'6E'
        ZKBIT00  EQU      X'6F'
        ZKDIGIT3 EQU      X'74'
        ZKDIGIT2 EQU      X'75'
        ZKDIGIT1 EQU      X'76'
        ZKDIGIT0 EQU      X'77'
        ZKBYTE0  EQU      X'71'
        ZKBYTE1  EQU      X'70'
        DATASW   EQU      X'8C'
        CONTROL  EQU      X'FCEC'
        WAM      EQU      X'F28C'
        SEGGEN   EQU      X'F38C'
        HALT     EQU      X'D0'
        WAIT     EQU      HALT
        INHIBIT  EQU      X'FC'
        ALLOW    EQU      X'EC'
        DISARM   EQU      X'110C'
        SCOPE    EQU      X'F2EC'
```

```
ADCONV    EQU     X'F283'
CONSOLE1  EQU     X'F3E3'         CONSOLE READ/WRITE REG.#1.
CONSOLE2  EQU     X'F3EC'         CONSOLE READ REG.#2.
ZAHIEXEC  DATA    SHIEXEC         HIGH ADDRESS LIMIT OF EXEC.
ZTDISTRI  EQU     ZAHIEXEC+1      START OF DISTRIBUTION TABLE.
DISTEND   EQU     ZTDISTRI+128    END OF DISTRIBUTION TABLE.
          PAGE
ZTCLEAR1  DATA    ZNTMODE         TABLE OF LOCATIONS TO BE CLEAR-
          DATA    ZFCONCMD        ED DURING PROGRAM RESTART.
          DATA    ZFPUNCH
          DATA    C,C
ZTCLEAR2  DATA    ZFTC            TABLE OF LOCATIONS TO BE CLEAR-
          DATA    ZFCYCLE
          DATA    ZFCONTIN
          DATA    ZFTIP
          DATA    ZNTMODE
          DATA    ZFPUNCH
          DATA    C,C
ZNDISTNO  RES     1
ZNDATACT  RES     1
ZIEXECRE  WD      INHIBIT         PROGRAM RESTART POINT
ZIIOOK    LDX     X'5C'-5
          LDA     =ZTCLEAR1
          RADD    *C,A            ACCUMULATOR-1
          RCPY    A,B
          RCPY    C,A
          RADDI   C,B             BASE REG.+1.
          STA     *C,,1
          BIX     $-2
          RD      ADCONV          RESET WAM AND A/D CONVERTER.
          B       ZIICNTRL        END RESTART. EXIT TO TOOL.
          LPOOL
ZIMASTER  WD      ALLOW           ENTER ON -START COMMAND.
          LDA     =X'10C'
          WD      X'1200'         ARM/ENABLE MTT AND CONSOLE INTRPT.
          RD      DATASW
          AND     ZKBIT00         NO TEST SELECTED
          BAZ     $+2             NO
          B       ZINOTEST        YES
          LDX     X'5C'-8
          LDA     =ZTCLEAR2
          RADD    *C,A            ACCUMULATOR-1.
          RCPY    A,B
          RCPY    C,A
          RADDI   C,B             BASE REG.+1.
          STA     *C,,1
          BIX     $-2
          LDX     =-24            CLEAR RESULT LOCATIONS.
          STA     ZNSVOVAL,1
          BIX     $-1
          LDX     =-128           CLEAR DISTRIBUTION TABLE.
          STA     DISTEND,1
          BIX     $-1
```

```
              RD      DATASW              READ CPU DATA SWITCHES.
              AND     =X'FC00'            MASK SWITCHES 0 TO 3.
              STA     ZNDATACT
              AND     ZKBIT01             RASTER SCOPE SELECTED
              BAZ     $+4                 NO, BRANCH.
              LDA     X'52'
              WD      SCOPE               ERASE RASTER.
              WD      WAIT                WAIT FOR ERASE COMPLETION.
              LDX     =-3
              RD      CONSOLE2            READ CONTROL PANEL REG.#2.
              AND     =X'7000'            MASK BITS 1, 2, & 3.
              BAZ     $+6                 BRANCH IF NO DIST. SELECTED.
              SARS    1                   RIGHT JUSTIFY.
              CP      ZKBIT04             COMPARE WITH BIT #4.
              BXNC    $-2                 BRANCH IF NO COMP. & X NOT=0.
              RCPY    X,A
              BAZ     ZIERRCTL            MORE THAN ONE DISTRIBUTION SEL.
              STA     ZNDISTNO            DISTRIBUTION NUMBER.
              B       ZJSCSTRT            EXIT TO START TESTING.
ZINOTEST      RCPYI   P,L
              B       KIIOCS              I/O SUBROUTINE.
              TEXT    'DO'                OUTPUT TO DEBUG OUT DEVICE.
              DATA    X'C005'             WRITE EBCIDEC ORDER.
              ADRL    ZMNOTEST            ADDRESS OF NO TEST MSG.
              DATA    8                   BYTE COUNT.
              B       ZISUM9              EXIT TO SUMMARY REPORTEER.
ZISYSER       LDA     =ZMMTTNR            ADDRESS OF SYSTEM ERROR MESSAGE.
              STA     ZAMESAG
              LDA     =24                 BYTE COUNT FOR SYS.ERROR MSG.
              STA     ZNBYCT
              B       $+5
ZIERRCTL      LDA     =ZMERRCTL           ADDRESS OF CONTROL ERROR MESSAGE.
              STA     ZAMESAG
              LDA     =2C                 BYTE COUNT OF ERROR MESSAGE.
              STA     ZNBYCT
              LDA     ZNCMODE             CONTROL LAMP STATUS.
              AND     =X'FFFE'            SET STOP BIT =0.
              LDX     ZKBIT14             BIT #14 = FAULT LAMP BIT.
              ROR     X,A
              STA     ZNCMODE             UPDATE LAMP STATUS.
              WD      CONSOLE1            TURN STOP LAMP ON.
              RCPYI   P,L                 LEAVE CALLING ADDRESS.
              B       KIIOCS              OUTPUT MESSAGE.
              TEXT    'DO'                OUTPUT ON DEBUG DEVICE.
              DATA    X'C005'             WRITE EBCIDEC MODE.
ZAMESAG       RES     1                   ADDRESS OF MESSAGE.
ZNBYCT        RES     1                   BYTE COUNT OF MESSAGE.
              B       ZIEXECRE            EXIT TO RESTART.
              LEOOL
              PAGE
******* BEGIN MOVE SUBROUTINE.
******* CALLING SEQUENCE=                 RCPYI P,B
*                                         B     ZIMOVE
```

```
*
*
********  ALL DATA IS MOVED TO THE TOOL DATA BUFFER(ZBTOOLIN) BEGINNING    ADRL  (FROM ADDRESS STARTING.)
********  WITH THE LOCATION=ZBTOOLIN+DISPLACEMENT AND ENDING WITH THE       DATA  (1ST BYTE=COUNT;2ND=DISPLACE
********  LOCATION=ZBTOOLIN+DISPLACEMENT+WORD COUNT.
*
ZADEST    ADRL    ZBTOOLIN            DESTINATION ADDRESS.
ZATO      RES     1                   CURRENT TO ADDRESS IN TOOL BUFFE
ZAFROM    RES     1                   CURRENT FROM ADDRESS.
ZWMOVE    RES     1                   WORK LOCATON
ZIMOVE    RCPY    X,A
          STA     ZWMOVE              SAVE INDEX REGISTER.
          LDA     1,,1                WORD CT. & DISPLACEMENT.
          SARS    8
          AND     ZKBYTE1             EXTRACT WORD COUNT.
          RCPY    A,T
*
          LDA     1,,1
          AND     ZKBYTE1             EXTRACT DISPLACEMENT.
          RCPY    A,E
          LDA     0,,1                FROM ADDRESS.
          RADD    T,A                 FROM + WORD CT. = END.
          STA     ZAFROM
          LDA     ZADEST
          RADD    T,A                 DEST. + WORD CT.
          RADD    E,A                 DEST. +WORD CT.+DISPLACEMENT.
          STA     ZATO
          RCPYI   *T,X                -(WORD CT.) TO INDEX REGISTER.
          LDA     *ZAFROM,1
          STA     *ZATO,1             MOVE 1 WORD.
          BIX     $-2
          LDX     ZWMOVE
          RCPY    B,A
          ADD     X'5C'+2
          RCPY    A,P                 RETURN TO CALLING ROUTINE.
          PAGE
********  BEGIN SPECIAL PURPOSE BINARY TO EBCDIC CONVERSION ROUTINE.
********  THIS ROUTINE CONVERTS A BINARY NO. SPECIFIED BY THE CALLING
********  ROUTINE TO A PACKED EBCDIC FORMAT.  OPTIONS ARE PRO-
********  VIDED FOR HANDLING THE TENTHS DIGIT IN ONE OF THREEE WAYS
********  (1)SUPPRESS TENTHS DIGIT AND DECIMAL POINT; (2) SET TENTHS DIG
********  TO ZERO; (3) SET TENTHS DIGIT EQUAL TO LEAST SIGNIFICSNT DIGIT
********  TO ZERO; SET TENTHS DIGIT EQUAL LEAST SIGNIFICANT DIGIT OF
********  CONVERSION..  OPTION IS ALSO PROVIDED TO PRINT OUT THE CONVER
********  RESULT.  THE CALLING SEQUENCE FOR THIS ROUTINE IS AS FOLLOWS
********  RCPYI   P,B
********  B       ZIBIDEC
********  ADRL    (ADDRESS OF NO. TO BE CONVERTED.)
********  DATA    CONVERSION CODE=POSITIVE,NEGATIVE OR ZERO. WHERE
********          POSITIVE INDICATES SUPPRESSION OF TENTHS DIGIT.
********          NEGATIVE INDICATES SET TENTHS DIGIT=C.
********          ZERO INDICATES SET TENTHS DIGIT=LEAST SIGNIF DIIGT.
********  DATA    (1ST BYTE=PRINTFLAG; 2ND.=DISPLACEMENT) WHERE
```

```
********        PRINT FLAG NEGATIVE=NO PRINT
********   PRINT FLAG POSITIVE=BYTE COUNT TO BE USED FOR PRINTING.
********        DISPLACEMENT IS ADDED TO ZBTOOLIN AND INDICATES THE
********        LOCATION IN WHICH STORAGE OF RESULTS IS TO BEGIN.
*
ZWSAVEX   RES       1                      WORK LOCATION.
ZFSIGNIF  RES       1
ZKDECMAL  DATA      10000                   TABLE OF DECIMAL VALUES
          DATA      1000
          DATA      100
          DATA      10
ZTDIGITS  RES       5.                      TABLE FOR TEMPORARY STORAGE OF RES
*
ZIBIDEC   RCPY      X,A                     START CONVERSION ROUTINE.
          STA       ZWSAVEX                 SAVE INDEX REGISTER.
          RCPY      0,A
          STA       ZFSIGNIF                LEFT ZEROES FLAG.
          LDA       *0,,1                   ADDRESS OF NO. FOR CONVERSION.
          LDX       X'50'-4
          BAZ       ZIZERRES                RESULT=ZERO.
ZIDIVIDE  RCPY      0,E
          DIV       ZKDECMAL+4,1            SETS AC = INTEGER QUOTIENT.
          BAZ       ZIMSCHK                 CHECK LLEFT ZEROES.
          IM        ZFSIGNIF
          ADD       ZKDIGIT2                COFO+RESULT=EBCDIC CODE.
ZISTORDI  STA       ZTDIGITS+4,1
          BIX       $+2
          B         ZIREMAIN
          RCPY      E,A                     E=INTEGER REMAINDER.
          BAZ       $+2
          B         ZIDIVIDE
          ADD       ZKDIGIT2                FORM EBCDIC CODE.
          STA       ZTDIGITS+4,1
          BIX       $-1
          B         $+3
ZIREMAIN  RCPY      E,A                     E=INTEGER REMAINDER.
          ADD       ZKDIGIT2
          STA       ZTDIGITS+4
          RCPY      B,L
          LDA       1,,1                    CONVERSION CODE.
          RCPY      A,E
          LDA       2,,1                    PRINT FLAG+DISPLACEMENT.
          AND       ZKBYTE1                 EXTRACT DISPLACEMMENT.
          ADD       ZADEST                  ZADEST=ZBTOOLIN (TOOL BUFFER)
          RCPY      A,B
          RCPY      E,A                     CONVERSION CODE.
          BAZ       ZITENTH                 TENTHS=LEAST SIG. DIGIT
          BAN       ZIZERO                  TENTHS=ZERO
          LDA       =X'4040'                TENTHS=N/A.
ZISDEC    STA       3,,1                    PACK BYTES IF TENTHS=N/A.
          LDA       ZTDIGITS+3
          SALS      8
          RCPY      A,T
```

```
          LDA     ZTDIGITS+4
          ROR     T,A
          STA     2,,1
          LDA     ZTDIGITS+1
          SALS    8
          RCPY    A,T
          LDA     ZTDIGITS+2
          ROR     T,A
          STA     1,,1
          LDA     ZTDIGITS
          ADD     ZKBITC1
          STA     0,,1
ZIIOUT    RCPY    L,B                     FINAL ACTIONS BEFORE EXIT.
          LDA     2,,1
          BAN     ZIDONE                  NO PRINT REQUIRED.
          SARS    8                       LEAVES BYTE COUNT.
          STA     ZNCOUNT
          RCPYI   P,L
          B       KIIOCS                  I/O
          TEXT    'DO'                    SPECIFIES OUTPUT DEVICE
          DATA    X'CC05'                 WRITE EBCDIC ORDER.
          ADRL    ZBTOOLIN                ADDRESS OD DATA TO BE PRINTED.
ZNCOUNT   RES     1                       BYTE COUNT.
ZIDONE    LDX     ZWSAVEX                 RESTORE INDEX REGISTER.
          RCPY    B,A
          ADD     X'50'+3
          RCPY    A,P                     RETURN TO CALLING ROUTINE.
ZIMSCHK   LDA     ZFSIGNIF                LEFT ZEROES CHECK
          BAZ     $+3
          RCPY    0,A
          B       ZIDIVIDE+4
          LDA     ZKBITC9
          B       ZISTORDI
ZIZERO    LDA     =X'4BFC'                SET TENTHS=ZERO.
          B       ZISDEC
ZITENTH   LDA     =X'4040'                PACK BYTES IF TENTHS=LST. SIGNIF.
          STA     C,,1
          LDA     ZTDIGITS+2
          SALS    8
          RCPY    A,T
          LDA     ZTDIGITS+3
          ROR     T,A
          STA     2,,1
          LDA     ZTDIGITS
          SALS    8
          RCPY    A,T
          LDA     ZTDIGITS+1
          ROR     T,A
          STA     1,,1
          LDA     ZTDIGITS+4
          ADD     =X'4B00'
          STA     3,,1
          B       ZIIOUT
```

```
ZIZERRES  LDA     ZKBIT09             RESULT=0.
          STA     ZTDIGITS+4,1
          BIX     $-1
          LDA     ZKDIGITS
          B       ZIREMAIN+2
          LPOOL
          PAGE
ZFCYCLE   RES     1
ZFCONTIN  RES     1
ZFMTTRDY  RES     1
*
*TABLE OF PROGRAM SWITCH SETTINGS
*
ZTSWSET   DATA    X'4802'             ZXLOAD ON.
          DATA    X'4C01'             ZXLOAD OFF.
          DATA    X'4C01'             ZXPRINT OFF.
          DATA    X'4802'             ZXPRINT ON.
          DATA    X'4801'             ZXERLOOP OFF.
          DATA    X'4804'             ZXERLOOP ON.
*
ZIEXEC01  LDA     *ZTSWSET            EXEC. ENTRANCE PER ADDRESS.
          RCPY    A,B                 SET BASE = ZTSWSET.
          LDX     ZFLCN0              ZFLCN0=0 FOR LOAD, =1 FOR CHECK.
          LDA     0,1,1
          STA     ZXLOAD              SET ZXLOAD SWITCH.
          RD      DATASW
          AND     ZKBIT01             MASK SCOPE BIT.
          RCPY    A,T
          RD      CONSOLE1            READ CONSOLE REG. #1.
          AND     ZKBIT04             MASK PRINT BIT.
          ROR     T,A
          BAZ     $+2                 NO  NO PRINT OR DISPLAY.
          RCPYI   C,A
          RCPY    A,X
          LDA     2,1,1
          STA     ZXPRINT             SET ZXPRINT SWITCH.
          RD      CONSOLE1            READ CONTROL PANEL REG. #1.
          AND     ZKBIT01             MASK RECYCLE BIT.
          SARS    14                  RIGHT JUSTIFY.
          RCPY    A,X
          LDA     4,1,1
          STA     ZXERLOOP            SET ZXERLOOP SWITCH.
          LDA     ZFTC                TEST COMPLETE
          BAZ     $+2                 NO
          B       ZISUMARY            YES
          LDA     ZCACTN              IS SKIP OR SYNC ACTION CHK. REQD.
          BAZ     $+2                 NO.
          B       ZISRVCHK            YES.
ZIRETC01  LDA     ZFMTTRDY            MTT IS READY IF ZERO.
          BAZ     $+2                 READY
          WD      WAIT                WAIT FOR SWITCHES.(CLASS-2 INTRPT)
          RCPY    *C,A
          STA     ZFMTTRDY            PREPARE TO START SEQUENCE GEN.
```

```
                LDA     =X'10C'
                WD      X'1200'           ARM/ENABLE ALL INTERRUPTS.
                LDA     ZNCURSGS
                WD      SEGGEN
                WD      WAIT              WAIT FOR COMPLETEION.(CLASS 2 INTRF
ZXLOAD          RES     1                 PROGRAM SWITCH
                ADRL    ZIRODISC
                RD      ADCONV            PRECAUTIONARY WAM RESET DURING LD.
                B       ZIUPDATE
ZITSTCY         LDA     ZFCYCLE           RECYCLING
                BAN     $+2               YES
                B       $+11              NO
                LDA     ZFCONTIN          CONTINUE RECYCLING
                BAN     ZIEXEC01          YES
                STA     ZFCYCLE           NO
                STA     ZFCONTIN
                RCPYI   P,L
                B       KIIOCS            I/O SUBROUTINE.
                TEXT    'D0'              OUTPUT DEVICE
                DATA    X'C005'           WRITE EBCDIC ORDER
                ADRL    ZMCONTIN          ADDRESS OF CONTINUING MSG.
                DATA    12                BYTE COUNT.
ZIUPDATE        LDA     =X'5C'
                WD      X'1200'           ARM/ENABLE CLASS 1 & 2 INTRPTS.
                B       ZIADUP            EXIT TO UPDATE SCAN ADDRESS.
                LP00L
ZISRVCHK        LDX     X'5C'-6           CHECK FOR SKIP/SYNC ENTRY.
                LDA     =ZTZACTN
                RCPY    A,2
                LDA     6,1,1
                AND     =X'FFF'
                CP      =X'AF8'           ENTIRE Z AXIS.
                BNC     ZIZADCHK          NO CHECK ADDRESS.
ZITSTY          LDA     ZTZACTN,1
                AND     =X'FFF'
                CP      =X'AF8'           ENTIRE Y AXIS
                BNC     ZIYADCHK          NO CHECK ADDRESS.
ZITSTX          LDA     ZTYACTN,1
                AND     =X'FFF'
                CP      =X'AF8'           ENTIRE X AXIS
                BNC     ZIXADCHK          NO CHECK ADDRESS.
                LDA     ZTYACTN,1         CHECK SKIP/SYNC BIT.
                AND     ZKBITC1           BIT01=0 INDICATES SKIP.
                BAZ     ZISKPACT          SKIP THIS ADDRESS.
                LDA     ZNCURSGS          SET UP FOR SYNC GENERATION.
                AND     =X'FEFF'          SETS BIT 7 OF CONTROL WORD=0.
                STA     ZNCURSGS
ZILOOP          BIX     ZISRVCHK+1        LOOP IF INDEX NOT =0.
                B       ZIRET001          INDEX=0. ALL ENTRIES CHECKED.
ZIZADCHK        CP      ZNZAD             ENTRY =CURRENT Z ADDRESS
                BNC     ZILOOP            NO
                B       ZITSTY            YES
ZIYADCHK        CP      ZNYAD             ENTRY =CURRENT Y ADDRESS.
```

```
              BNC      ZILOOP                 NO
              B        ZITSTX                 YES
    ZIXADCHK  CP       ZNXAD                  ENTRY =CURRENT X ADDRESS
              BNC      ZILOOP                 NO
              B        ZITSTX+4               YES
    ZISKPACT  LDA      ZTSWSET                ZXLOAD ON SWITCH SETTING.
              STA      ZXLOAD                 OVERRIDE ZXLOAD SETTING.
              B        ZILOOP
              LPOOL
    ZIERSTAT  LDA      ZFRSLTER
              BAN      $+6                    IF NEG., ERROR ON LAST ADDRESS.
              LDA      ZNCMODE                CURRENT LAMP STATUS.
              AND      =X'FFDF'               CLEAR REJECT BIT #10.
              LDX      ZKBIT11
              ROR      X,A                    SET ACCEPT BIT #11.
              B        $+5
              LDA      ZNCMODE                CURRENT LAMP STATUS.
              AND      =X'FFEF'               CLEAR ACCEPT BIT #11.
              LDX      ZKBIT10
              ROR      X,A                    SET REJECT BIT #10.
              STA      ZNCMODE                UPDATE LAMP STATUS.
              WD       CONSOLE1               UPDATE LAMPS.
    ZXPRINT   RES      1                      =B $+2,IF DS 1 SET,OR CON.BIT 4.
              ADRL     ZIEXER
              RD       DATASW
              AND      ZKBIT01                SCOPE SELECTED
              BAZ      $+2                    NO.
              B        ZIDDRDP                BRANCH TO DISPLAY ROUTINE.
    ZISCPRET  RD       CONSOLE1               READ CONTROL PANEL REG.#1
              AND      =X'E00'                MASK ACCEPT,REJECT,& PRINT BITS.
              CP       =X'E00'                PRINT-ALL SELECTED
              BNC      $+2                    NO.
              B        ZISCOPIN               YES
              RCPY     A,T
              LDA      ZFRSLTER               ERROR ON LAST ADDRESS
              BAN      $+5                    YES, BRANCH.
              RCPY     T,A                    NO, CHECK FOR PRINT ON ACCEPT.
              CP       =X'A00'                PRINT ON ACCEPT SELECTED
              BNC      ZIEXER                 NOT SELECTED, BRANCH.
              B        ZISCOPIN               YES, GO TO PRINT ROUTINE.
              RCPY     T,A
              CP       =X'C00'                PRINT ON REJECT SELECTED
              BNC      ZIEXER                 NOT SELECTED, BRANCH.
    ZISCOPIN  RCPYI    P,B                    SET-UP RESULT... LINE.
              B        ZIMOVE                 MOVE SUBROUTINE
              ADRL     ZMRESULT
              DATA     X'4C0'
              RCPYI    P,B
              B        ZIMOVE                 MOVE SUBROUTINE.
              ADRL     ZMXYP
              DATA     X'2C4'
              LDA      ZNXAD                  CURRENT X ADDRESS
              STA      ZWOC1
```

```
            RCPYI    P,B
            B        ZIBIDEC         BINARY TO EBCDIC CONVERSION SUBR.
            ADRL     ZWCC1
            DATA     1
            DATA     X'8006'         NO PRINT.
            LDA      ZNYAD           CURRENT Y ADDRESS
            STA      ZWCC1
            RCPYI    P,B
            B        ZIBIDEC         BINARY TO EBCDIC CONVERSION SUBR.
            ADRL     ZWCC1
            DATA     1
            DATA     X'800A'         NO PRINT.
            LDA      ZNZAD           CURRENT Z ADDRESS
            STA      ZWCC1
            RCPYI    P,B
            B        ZIBIDEC         BINARY TO EBCDIC CONVERSION SUBR.
            ADRL     ZWCC1
            DATA     1
            DATA     X'220E'         PRINT LINE AFTER CONVERSION.
            B        ZIRESPRT
            LFOOL
ZIRESPRT    LDX      X'50'-3         SET PRINT OF AP,TP,TS,ST RESULTS.
            LDA      =ZMAP           ADDRESS OF AP= MSG.
            STA      ZNPARAMA
            LDA      =ZNAPRSLT       ADDRESS OF AP RESULT VALUE.
            STA      ZNPARAMB
            RCPY     C,A
            STA      ZNPARAMC
            LDA      ZNDATACT        DS SETTINGS AT START OF TEST.
            AND      ZKBIT02         WAM INHIBIT
            BAZ      $+2             NO
            B        ZICHKSTR        YES
ZILOOPA     LDA      ZNAPRSLT+3,1    SET AC=AP,TP OR TS RESULT.
            BAN      ZICONVER
            RCPYI    P,B
            B        ZIMOVE          MOVE SUBROUTINE.
            ADRL     ZMBSPACE
            DATA     X'400'
ZISET       RCPYI    P,B
            B        ZIMOVE          MOVE SUBROUTINE.
ZNPARAMA    RES      1
            DATA     X'2C4'
            RCPYI    P,B
            B        ZIBIDEC         BINARY TO EBCDIC CONVERSION SUBR.
ZNPARAMB    RES      1
ZNPARAMC    RES      1
            DATA     X'1406'         PRINT LINE AFTER CONVERSION.
ZICHK       BIX      $+2
            B        ZICHKSTR        BRANCH TO CHECK STROBE RESULTS.
            IM       ZNPARAMA
            IM       ZNPARAMA
            IM       ZNPARAMB
            RCPY     *0,A
```

```
          STA     ZNPARAMC
          B       ZILOOPA
ZJCONVER  RCPY    *A,A
          STA     ZNAPRSLT+3,1
          RCPYI   P,B
          B       ZIMOVE
          ADRL    ZMERMARK
          DATA    X'400'
          B       ZISET
          LPOOL
ZICHKSTR  RC      DATASW
          AND     ZKBIT03         INHIBIT STROBE CHECK
          BAZ     $+2             NO
          B       ZIEXER          YES
          LDA     ZFSTRBER
          BAN     $+2             NEGATIVE INDICATES ERROR.
          B       ZIEXER          NO ERROR, EXIT.
          RCPYI   P,B
          B       ZIMOVE          MOVE SUBROUTINE
          ADRL    ZMERMARK
          DATA    X'400'
          RCPYI   P,B
          B       ZIMOVE
          ADRL    ZMST
          DATA    X'204'
          LDA     X'50'-6
          STA     ZWCO8
          RCPY    A,X
          LDA     =X'4040'
          STA     ZWCO2+6,1
          BIX     $-1
          LDA     =ZWCO2
          STA     ZWCO9
          RCPY    O,X
          LDA     ZNSTRBRS
          SCRS    1
          RADDI   O,X
          BAN     ZINUMBER
ZILOOP1   IM      ZWCO8
          BNC     $-4
          B       ZISTRPRT
ZINUMBER  RCPY    A,E
          RCPY    X,A
          SALS    8
          RCPY    A,T
          LDA     =X'F040'
          ROR     T,A
          STA     *ZWCO9
          IM      ZWCO9
          RCPY    E,A
          B       ZILOOP1
ZISTRPRT  RCPYI   P,B
          B       ZIMOVE          MOVE SUBROUTINE.
```

```
            ADRL    ZWCC2
            DATA    X'6C6'
            RCPYI   P,L
            B       KII9CS              I/O SUBROUTINE
            TEXT    'O8'
            DATA    X'CC05'
            ADRL    Z8T00LIN
            DATA    X'18'
ZIEXER      RD      CONSOLE1            READ CONTROL PANEL REG.#1.
            AND     =X'16C0'            MASK READ TAPE,ACCEPT,&REJECT BITS
            CP      =X'16C0'            READ TAPE @ EACH ADDRESS
            BNC     $+2                 NO.
            B       ZIRETPE             YES.
            RCPY    A,T
            LDA     ZFRSLTER            ERROR ON LAST ADDRESS
            BAN     $+5                 YES, BRANCH.
            RCPY    T,A                 NO ERROR.
            CP      =X'1200'            READ ON ACCEPT
            BNC     $+10                READ ON ACCEPT NOT SELECTED, BRANCH
            B       ZIRETPE             YES, IS SELECTED.
            RCPY    T,A
            CP      =X'1400'            READ TAPE @ REJECT
            BNC     $+7                 NO.
ZIRETPE     LDA     X'50'+3             BEGIN READ TAPE ROUTINE.
            STA     ZNTMODE             SET TOOL MODE =READ TAPE.
            STA     ZFTAPE              SET TAPE FLAG NOT=0.
            LDA     ZNCMODE             CURRENT CONTROL LAMP STATUS.
            AND     =X'FFFE'            SET BIT #15=0.
            STA     ZNCMODE             UPDATE LAMP STATUS.
            WD      CONSOLE1            TURN STOP LAMP ON.
            LDA     ZKBII12
            WD      X'1200'             ARM/ENABLE INTEGRAL 1 INTERRUPT.
            WD      X'1700'             TRIGGER INTEGRAL 1 INTERRUPT.
ZXERLOOP    RES     1                   PROGRAM SWITCH
            RCPY    C,A                 RECYCLE NOT SELECTED.
            STA     ZFCONTIN
            B       ZITSTCY
            LDA     ZFCYCLE
            BAN     $+2                 ALREADY RECYCLING
            B       $+2                 YES.
ZIRETRN     B       ZITSTCY             NO, ENTERING FIRST CYCLE.
            RD      CONSOLE1            READ CONTROL PANEL REG.#1.
            AND     =X'4600'
            CP      =X'46C0'            RECYCLE ON ALL
            BNC     $+2                 NO.
            B       ZICYCLE             YES.
            RCPY    A,T
            LDA     ZFRSLTER            ERROR ON LAST ADDRESS
            BAN     $+5                 YES, BRANCH.
            RCPY    T,A                 NO ERROR.
            CP      =X'4200'            ACCEPT SELECTED
            BNC     ZIRETRN             NO.
            B       ZICYCLE             YES.
```

```
                RCPY     I,A
                CP       =X'4400'           REJECT SELECTED
                BNC      ZIRETRN            NO.
ZICYCLE         RCPY     =C,A               YES.
                STA      ZFCYCLE            SETS FLAG NEGATIVE.
                STA      ZFCONTIN           SETS FLAG NEGATIVE.
                RCPYI    P,L                PREPARE TO PRINT RECYCLING.
                B        KIIOCS             I/O SUBROUTINE
                TEXT     'D0'
                DATA     X'CC05'            WRITE EBCDIC ORDER.
                ADRL     ZMCYCLE            ADDR. OF RECYCLING MSG.
                DATA     10                 BYTE COUNT.
                LDA      ZKBIT07
                WD       X'1200'            ARM/ENABLE CONSOLE INTRPT.
                B        ZIEXEC01           RETURN AND RECYCLE SEG. GEN.
                LPOOL
******** BEGIN TEST COMPLETE REPORT SECTION.
*
*
ZWCC1           RES      1
ZWCC2           RES      1
ZWCC3           RES      1
ZWCC4           RES      1
ZWCC5           RES      1
ZWCC6           RES      1
ZWCC7           RES      1
ZWCC8           RES      1
ZWCC9           RES      1
ZNCLASS         RES      1
*
ZISUMARY        RCPYI    P,L                SET UP TEST COMPLETE MSG.
                B        KIIOCS             I/O SUBROUTINE
                TEXT     'D0'               OUTPUT DEVICE
                DATA     X'CC05'            WRITE EBCDIC ORDER.
                ADRL     ZMTSTCMP           ADDR. OF TEST COMPLETE MSG.
                DATA     14                 BYTE COUNT.
ZISUM9          RD       CONSOLE2           READ CONSOLE REG. #2.
                AND      ZKBIT04            REPORT SELECTED
                BAZ      ZIDISTRI           NO
                RCPYI    P,L                YES
                B        KIIOCS             I/O SUBROUTINE.
                TEXT     'D0'               OUTPUT DEVICE.
                DATA     X'CC05'            WRITE EBCDIC ORDER.
                ADRL     ZMERRORS           ADDR. OF ERRORS MSG.
                DATA     8                  BYTE COUNT.
                RCPYI    P,B
                B        ZIMOVE             MOVE SUBROUTINE.
                ADRL     ZM8SPACE
                DATA     X'4C0'
                RCPYI    P,B
                B        ZIMOVE             MOVE SUBROUTINE.
                ADRL     ZM1S
                DATA     X'2CA'
```

```
           RCPYI    P,B
           B        ZIMOVE        MOVE SUBROUTINE.
           ACRL     ZMCS
           CATA     X'210'
           LDX      X'5C'-6
           LDA      =ZMAPH
           STA      ZNPARAM1
           LDA      =ZCHIAP1
           STA      ZNPARAM2
           LDA      =ZCHIAPC
           STA      ZNPARAM3
ZISTART1   RCPYI    P,B
           B        ZIMOVE        MOVE SUBROUTINE
ZNPARAM1   RES      1
           CATA     X'2C4'
           RCPYI    P,B
           B        ZIBIDEC       BINARY TO EBCDIC CONVERSION SUBR.
ZNPARAM2   RES      1
           CATA     1
           CATA     X'8006'
           RCPYI    P,B
           B        ZIBIDEC       BINARY TO EBCDIC CONVERSION SUBR.
ZNPARAM3   RES      1
           CATA     1
           CATA     X'24CC'
           BIX      $+2
           B        ZISTART2-5
           RCPYI    *X,A
           CP       X'5C'+3
           BNC      $+7
           LDA      ZNPARAM2
           ADD      X'5C'+3
           STA      ZNPARAM2
           LDA      ZNPARAM3
           ADD      X'5C'+3
           STA      ZNPARAM3
           IM       ZNPARAM1
           IM       ZNPARAM1
           IM       ZNPARAM2
           IM       ZNPARAM3
           B        ZISTART1
           LDX      X'5C'-6
           LDA      =ZMST1
           STA      ZNPARAM4
           LDA      =ZCSTR1ER     STROBE 1 ERROR COUNT ADDRESS.
           STA      ZNPARAM5
ZISTART2   RCPYI    P,B
           B        ZIMOVE        MOVE SUBROUTINE
ZNPARAM4   RES      1
           CATA     X'2C4'
           RCPYI    P,B
           B        ZIBIDEC
ZNPARAM5   RES      1
```

```
           DATA     1
           DATA     X'14C6'
           BIX      $+2
           B        ZIDISTRI
           IM       ZNPARAM4
           IM       ZNPARAM4
           IM       ZNPARAM5
           B        ZISTART2
           LFOOL
*
*
ZTMSGAD    DATA     ZMMV              TABLE OF MSG. ADDRESSES.
           DATA     ZMNS
           DATA     ZMNS
           DATA     ZMAP
           DATA     ZMTP
           DATA     ZMTS
           DATA     0
           DATA     -1
           DATA     -1
ZIDISTRI   LDA      ZNDATACT
           AND      ZKBIT02           WAM INHIBIT
           BAZ      $+2
           B        ZICOMPLT
           LDA      ZNDISTNS
           BAZ      $-2
           BAZ      ZICOMPLT          IF ZERO, NO DISTRIBUTION REQD.
           RCPY     A,X
           LDA      ZTMSGAD+3,1       SELECT MV OR NS MESSAGE.
           STA      ZNPARAM6
           LDA      ZTMSGAD+6,1       SELECT AP,TP OR TS MESSAGE.
           STA      ZNPARAM7
           LDA      ZTMSGAD+9,1       SELECT CLASS INTERVAL MULTIPLIER.
           STA      ZNPARAM8
*
*PRINT DISTRIBUTION TABLE TITLE.
*
           RCPYI    P,B
           B        ZIMOVE            MOVE DISTRIBUTION MSG TO BUFFER.
           ADRL     ZMDISTRI
           DATA     X'14CC'
           RCPYI    P,B
           B        ZIMOVE            MOVE AP, TP OR TS MESSAGE.
ZNPARAM7   RES      1
           DATA     X'2C4'
           RCPYI    P,L
           B        KIIOCS            I/O ROUTINE TO PRINT TITLE.
           TEXT     'D0'
           DATA     X'CC05'
           ADRL     ZOTOOLIN
           DATA     12
*
*EXAMINE APPLICABLE DISTRIBUTION TABLE TO DETERMINE FIRST AND LAST
```

```
*NON-ZERO VALUES AND ALSO SCALE-FACTOR FOR GRAPHIC LINE.
*
          LDX     =-128
          RCPY    0,A
          STA     ZWCC1
          STA     ZWCC2
          STA     ZWCC3
          STA     ZWCC4
ZISTART4  LDA     DISTEND,1
          BAZ     ZIBIX              BRANCH IF TABLE ENTRY=0.
          LDA     ZWCC1
          BAZ     ZISETNLZ           BRANCH IF 0...INDICATES 1ST NON-ZE
          RCPY    X,A
          STA     ZWCC3
          STA     ZWCC3              STORE POINTER TO LAST NON-ZERO ENT
ZISCALE   LDA     DISTEND,1
          RCPY    0,E
          DIV     =5C
          RADDI   0,A                CALCULATE SCALE FACTOR FOR ENTRY.
          CP      ZWCC4
          BNO     $+2                RESULT NOT GREATER THAN LAST ONE.
          STA     ZWCC4              RESULT IS GREATER...STOR.
ZIBIX     BIX     ZISTART4
*
*DETERMINE NO. OF ENTRIES; BEGIN AND END POINTS; AND CLASS INTERVAL VAL
*
          LDA     ZWCC3              ZWCC3 POINTS TO LAST NON-ZERO ENTR
          SUB     ZWCC2              FIND DIFFERENCE BETWEEN 1ST AND LA
          RADDI   0,A
          STA     ZWCC1              STORE NO. OF NON-ZERO ENTRIES.
          LDA     =DISTEND+1         END ADRL OF DIST. TABLE +1.
          ADD     ZWCC3              ZWCC3 IS NEG.
          STA     ZWCC3              STORE ADDR. OF LAST ENTRY+1.
          LDA     =129
          ADD     ZWCC2              GIVES +VALUE OF FIRST CLASS NO.
          SALS    3                  MULTIPLY CLASS INCREMENT BY 8
          SUB     X'5C'              -12 YIELDS MIDPT OF PREVIOUS CLASS
          STA     ZNCLASS
*
*SET UP OUTPUT BUFFER FOR FORMAT
*
          RCPYI   P,B
          B       ZIMOVE             MOVE MV OR NS MSG TO POSITION.
ZNPARAM6  RES     1
          DATA    X'204'
          LDX     =-30
          LDA     =X'404F'           EBCDIC CODE FOR SPACE & BASELINE.
          STA     ZNTMODE,1
          RADDI   0,X
          LDA     =X'6060'           EBCDIC CODE FOR DASHES.
          STA     ZNTMODE,1          FILL BUFFER(58 BYTES) WITH DASHES.
          BIX     $-1
*
```

```
*BEGIN PROCESSING AND PRINTING TABLE ENTRIES AND GRAPH
*
          LDA     ZWCC1
          RCPYI   *A,X
ZISTART3  LDA     ZNCLASS
          ADD     ZKBIT12          +8=CLASS INCREMENT VALUE.
          STA     ZNCLASS
          RCPYI   P,B
          B       ZIBIDEC          CONVERT CLASS VALUE TO EBCDIC.
          ADRL    ZNCLASS
ZNPARAM8  RES     1
          DATA    X'8000'
          LDA     *ZWCO3,1
          STA     ZWC02            STORE CURRENT ENTRY.
          RCPY    C,E
          DIV     ZWC04            ZWC04 CONTAINS SCALE FACTOR.
          RCPY    A,T
          AND     X'S1'            ODD/EVEN CHECK
          BAZ     $+2
          RADDI   C,T
          RCPY    T,A
          ADD     =22              COMPUTE BYTE COUNT.
          SALS    8                LEFT JUSTIFY.
          ADD     X'S6'            +6 TO RT. BYTE POSITION.
          STA     $+5
          RCPYI   P,B
          B       ZIBIDEC          CONVERT AND PRINT LINE.
          ADRL    ZWCC2
          DATA    1
          RES     1                RESERVED FOR BYTE COUNT.
          BIX     ZISTART3
*
*DISTRIBUTION PRINT AND ALL REPORTING COMPLETE.
*
ZICOMPLT  RD      CONSOLE2         READ CONTROL PANEL REG.#2.
          RCPY    A,T
          AND     ZKBIT06          TEST FOR READ TAPE & TEST COMPL.
          BAZ     $+9              BRANCH IF NOT SELECTED.
          LDA     X'53'            SET TOOL MODE =READ.
          STA     ZNTMODE
          WD      INHIBIT          INHIBIT INTERRUPTS.
          LDA     ZNCMODE          CURRENT CONTROL PANEL LAMPS.
          AND     =X'FFFE'         SET STOP BIT =0.
          STA     ZNCMODE
          WD      CONSOLE1         TURN STOP LAMP ON.
          B       ZITCNTRL         RETURN TO TOOL CONTROL.
          RCPY    T,A
          AND     ZKBIT05          TEST FOR CONTINUOUS MODE.
          BAZ     $-9              BRANCH IF NOT SELECTED.
          B       ZIMASTER         CONTIUOUS MODE, RESTART SCAN.
*
*
*
```

```
ZISETNLZ RCPY    *A,A
         STA     ZWCC1              1ST NON-ZERO ENTRY FOUND.
         RCPY    X,A
         STA     ZWCC2              STORE POINTER TO 1ST NON-ZERO ENTR
         STA     ZWCC3
         B       ZISCALE
         LPOOL
*
*
******** BEGIN 'READ DISCRIMINATOR' PORTION
HIACLIM  EQU     3                  HIGH ACTUAL LIMIT
LOACLIM  EQU     9                  LOW ACTUAL LIMIT
DISTBL   EQU     12                 DISTRIBUTION TABLES.
HICOUNT  EQU     24                 HIGH ERROR COUNT
LOCOUNT  EQU     30                 LOW ERROR COUNT.
*
*
ZTVALUES RES     12                 TABLE CONTAINS HIGH AND LOW ACCEP-
*                                   TANCE LIMITS FOR AP,TP,TS 1'S & 0'
         ADRL            ZNSVDVAL   ADDR. OF STROBE ACCEPTANCE VALUES.
ZTVALP16 DATA    0                  RESERVED LOCATION
         DATA    0                  RESERVED LOCATION.
ZNSTRBRS RES     1                  STROBE DISC. RESULTS.
ZNAPRSLT RES     1                  AP RESULT FROM WAM.
ZNTPRSLT RES     1                  TP RESULT FROM WAM.
ZNTSRSLT RES     1                  TS RESULT FROM WAM.
ZFSTRBER RES     1                  FLAG INDICATES STROBE ERROR.
ZFRSLTER RES     1                  FLAG INDICATES DISC. ERROR.
ZCHIAPC  RES     1                  COUNT OF HI AP'S--ZEROS.
ZCHITPC  RES     1                  COUNT OF HI TP'S--ZEROS.
ZCHITSC  RES     1                  COUNT OF HI TS'S--ZEROS.
ZCHIAP1  RES     1                  COUNT OF HI AP'S--ONES.
ZCHITP1  RES     1                  COUNT OF HI TP'S--ONES.
ZCHITS1  RES     1                  COUNT OF HI TS'S--ONES.
ZCLOAPC  RES     1                  COUNT OF LO AP'S--ZEROS.
ZCLOTPC  RES     1                  COUNT OF LO TP'S--ZEROS.
ZCLOTSC  RES     1                  COUNT OF LO TS'S--ZEROS.
ZCLOAP1  RES     1                  COUNT OF LO AP'S--ONES.
ZCLOTP1  RES     1                  COUNT OF LO TP'S--ONES.
ZCLOTS1  RES     1                  COUNT OF LO TS'S--ONES.
ZCSTR1ER RES     1                  COUNT OF STROBE 1 ERRORS.
ZCSTR2ER RES     1                  COUNT OF STROBE 2 ERRORS.
ZCSTR3ER RES     1                  COUNT OF STROBE 3 ERRORS.
ZCSTR4ER RES     1                  COUNT OF STROBE 4 ERRORS.
ZCSTR5ER RES     1                  COUNT OF STROBE 5 ERRORS.
ZCSTR6ER RES     1                  COUNT OF STROBE 6 ERRORS.
ZNSVDVAL DATA    0,0
ZWEK     RES     1                  WORK LOCATION.
ZTERCTS  EQU     ZCHIAP1
ZKDISCB  DATA    X'F284'
*
*
ZIRDDISC LDA     =X'1C4'
```

```
              WD        X'1200'           ARM ENABLE CL1 AND CP INTRPT.
              LDA       X'54'
              WD        X'1100'           DISARM CL2 INTRPT.
              RD        WAM               BEGIN CONVERSION OF AP.
              LDX       X'5C'-6           CLEAR RESULT LOCATIONS
              RCPY      C,A
              STA       ZCHIAPC,1
              BIX       $-1
              LDA       ZNDATACT          DS SETTINGS AT START OF TEST.
              AND       ZKBIT02           WAM INHIBIT
              BAZ       $+2               NO INHIBIT.
              B         ZISVDCHK
              LDA       =ZTVALUES
              RCPY      A,B
              LDA       ZNPATVAL          ZNPATVAL =1, IF PATTERN =1.
              BAZ       $+2
              LDA       =3
              RADD      A,B
              LDX       X'5C'-3
ZIREREAD      RC        *ZKDISCB,1        READ & CONNECT AP, TP, TS.
              BAN       ZINOCUR           WAM DETECTED NO TPO.
              CP        LOACLIM,1,1       COMPARE TO LOW GO/NOGO VALUE.
              BNO       ZINOGOLO          IF OVF, THEN RESULT IS LOW.
              CP        HIACLIM,1,1       COMAPRE TO HIGH GO/NOGO VALUE.
              BNO       ZIGO              IF OVF, THEN RESULT < LIMIT.
ZINOGOHI      IM        HICOUNT,1,1       HI ERROR COUNT+1.
              RCPY      *A,A              SIES FLAG NEG.=ERROR.
              STA       ZFRSLTER          SETS FLAG NEG.=ERROR.
              STA       ZNAPRSLT+3,1      STORE IN AP RESULT LOCATION.
              RCPY      *A,A              RE-COMPLEMENT TO ACTUAL VALUE.
ZIDISTUP      RCPY      A,T
              RCPY      X,A
              CP        ZNCISTNO          INDEX VAL=AP,TP OR TS.
              BNC       ZILOOPUP          IS DISTRIB. REQUESTED.
              RD        CONSOLE2          NO.
              AND       ZKBIT00           READ CONTROL PANEL REG.#2
              BAZ       ZICHKPAT          ZEROES TO BE INCLUDED
ZIINC         RCPY      T,A               NO...GO TO CHK. PATTERN VALUE.
              SARS      3                 DIVIDE RESULT BY 8.
              CP        ZKBIT08           TEST QUOTIENT>128.
              BNO       $+2               NO
              B         ZIEREX1           YES--ERROR
              ADD       =ZTDISTRI
              STA       ZWER              STORE AND USE AS INDIRECT ADDR.
              IM        *ZWER             INCREMENTS DIST. TABLE ENTRY.
ZILOOPUP      BIX       ZIREREAD
ZISVDCHK      LDA       ZNDATACT          DS SETTINGS AT START OF TEST.
              AND       ZKBIT03           INHIBIT STROBE CHECK
              BAZ       $+2               NO
              B         ZIEXIT            YES--FINISHED
              LDA       ZNPATVAL          CHECK PATTERN VALUE.
              SARS      1                 AC=PATTERN VALUE;C OR 1.
              RCPY      A,X
```

```
            RD      *ZKDISCB           READ STROBES-MTT ADDR=F284 ONLY
            RCPY    *A,A               COMPLEMENT RESULT.
            AND     ZNSVDVAL,1         APPLY GO/NOGO MASK.
            STA     ZNSTRBRS           STORE RESULT.
            BAZ     ZIEXIT             AC=0 INDICATES ALL GO VALUES.
            RCPY    *A,A               COMPLEMENT TO INDICATE ERROR.
            STA     ZFRSLTER           SET FLAG NEGATIVE-INDICATES ERROR.
            STA     ZFSTRBER           SET FLAG NEGATIVE-INDICATES ERROR,
            RCPY    A,T                DETERMINE ERROR STROBE NOS.
            LDA     X'50'-7
            STA     ZWER
            RCPY    C,X                CLEAR
            RCPY    T,A
            IM      ZWER
            BXNC    $+2
            B       ZIEXIT
            SCRS    1
            BAN     $-4                IF NEG, INDEX REG=STROBE NO. IN ER
            IM      ZCSTR1ER-1,1       UPDATE STROBE ERROR COUNT.
            B       $-6
ZIEXIT      B       ZIERSTAT           BRANCH TO UPDATE LAMP STATUS.
ZIEREX1     B       ZISYSER            SYSTEM ERROR REQUIRES RESTART.-EXI
ZIGO        STA     ZNAPRSLT+3,1       STORE RESULT.
            B       ZIDISTUP
ZINOGOLO    IM      LOCOUNT,1,1        INCREMENT LO ERROR COUNT.
            B       ZINOGOHI+1
ZINOCUR     RCPY    C,A                IF NO CURRENT, RESULT SET=C.
            B       ZIREREAD+2
ZICHKPAT    LDA     ZNPATVAL           TEST PATTERN=1.
            BAZ     ZILOOPUP           NO...SKIP DISTRIBUTION UPDATE.
            B       ZIINC              YES...UPDATE DISTRIBUTIONS.
            LPOOL
*
*
******** BEGIN INTERRUPT SERVICING ROUTINES.
ZNCPPSD1    RES     1                  CONTROL PANEL INTERRUPT ROUTINE.
ZNCPPSD2    RES     1
            LDA     =ZIEXECRE          MODIFY INTERRUPT ADDRESS.
            STA     ZNCPPSD2
            LDA     ZNCMODE            CURRENT CONTROL LAMP STATUS.
            AND     =X'FFFE'
            STA     ZNCMODE            UPDATE LAMP STATUS.
            WD      CONSOLE1           TURN STOP LAMP ON.
            WD      X'D8'              BEGIN INTERRUPT EXIT SEQUENCE.
            LDX     ZNCPPSD1
*
******** BEGIN INTEGRAL #1 INTERRUPT SERVICE ROUTINE. THIS ROUTINE
******** SERVICES INTERRUPTS GENERATED BY THE CONTROL PANEL RUN AND
******** STOP SWITCHES, THE PROGRAM ITSELF (FOR READING TAPE), AND
******** THE MTT INSTRUMENT CONTROLLER FOR SYSTEM ERRORS.
*
ZKX3C       EQU     X'3C'
ZKX1FF      EQU     X'1FF'
```

```
ZKXFF82   EQU    X'FF82'
ZKXFF88   EQU    X'FF88'
*
ZWASAVE   RES    1
ZWTSAVE   RES    1
ZWESAVE   RES    1
ZWBSAVE   RES    1
ZWXSAVE   RES    1
ZWLSAVE   RES    1
ZFCONCMD  RES    1
ZNCMODE   DATA   C              CONSOLE LAMP MODE.
ZFTAPE    DATA   C              TAPE FLAG
ZWPRINT   RES    1
ZFADJUST  DATA   0              ADJUST MODE NOT EQUAL TO C.
ZTDVCMSG  ADRL   ZMSERIES       BEGIN TABLE OF MESSAGE ADDRESSES.
          ADRL   ZMSHUNT
          ADRL   ZMCAP
          ADRL   ZMERMARK
          ADRL   ZMAMPL
          ADRL   ZMRISE
          ADRL   ZMWIDTH
          ADRL   ZMDELAY
*
ZMSERIES  TEXT   'SER.  R='
ZMSHUNT   TEXT   'SHUNT R='
ZMCAP     TEXT   'CAPAC.C='
ZMAMPL    TEXT   'AMPL.  ='
ZMRISE    TEXT   'RISE   ='
ZMDELAY   TEXT   'DELAY  ='
ZMWIDTH   TEXT   'WIDTH  ='
*
*
ZNX1PSD1  RES    1              INTEGRAL 1 PSD WORD.
ZNX1PSD2  RES    1              INTEGRAL 1 PSD WORD.
          WD     X'FC'          INHIBIT INT.& EXT. INTERRUPTS.
          STA    ZWASAVE        BEGIN SAVING REGISTERS.
          RCPY   E,A
          STA    ZWESAVE
          RCPY   B,A
          STA    ZWBSAVE
          RCPY   X,A
          STA    ZWXSAVE
          RCPY   L,A
          STA    ZWLSAVE
          LDA    ZKBIT09
          HIO
          LDA    ZFTAPE         HALT ANY I/O FROM OR TO KEYBOARD.
          BAZ    $+6            INTERRUPT GEN. BY READ TAPE
ZITOOLEX  RCPY   0,A
          STA    ZFTAPE         CLEAR TAPE FLAG.
          RCPY   *0,A
          STA    ZFCONCMD       SET INTERRUPT FLAG.
```

```
           B        ZIGBCHK        RETURN TO TOOL CONTROL.
           RD       CONSOLE1       READ CONSOLE REG. #1.
           RCPY     A,T
           AND      X'5C'+3        MASK BITS 14 & 15.
           BAZ      ZINOCON        INTERRUPT TRIG. BY CONSOLE
           RCPY     T,A            YES.
           AND      ZKBIT14        MASK BIT 14.
           BAZ      ZINOSTP        CONSOLE CMD. STOP   IF NOT BRANCH.
           LDA      ZNCMODE        YES, STOP COMMAND.
           AND      =X'FFFE'       SET STOP BIT =C.
           STA      ZNCMODE        UPDATE LAMP STATUS.
           WD       CONSOLE1       TURN STOP LAMP ON.
           RCPY     C,A
           STA      ZNTMODE        CLEAR TOOL MODE.
           LDA      ZFADJUST       IN ADJUST MODE
           BAZ      ZITOOLEX       NO, BRANCH.
           LDA      ZNDVCNO        CC MTT BASE ADDRESS.
           SARS     5
           SUB      =ZKXFF88
           STA      ZWPRINT        MTT DEVCE PREDATA.
           RCPYI    P,B
           B        ZIBIDEC        BRANCH TO EBCDIC CONV. SUBR.
           ADRL     ZWPRINT
           DATA     1
           DATA     X'8CCC'        NO PRINTING.
           LDA      ZNDEVICE
           CF       ZKBIT08        MTT REG.# GREATER THAN 7
           BNO      $+2            NO, BRANCH.
           B        ZITOOLEX       YES.
           RCPY     A,X
           LDA      ZTDVCMSG,1     ADDRESS OF DEVICE MESSAGE.
           STA      $+3
           RCPYI    P,B
           B        ZIMOVE         MOVE SUBROUTINE.
           RES      1
           DATA     X'4C4'
           LDA      =ZNBIRES2      ADDRESS OF DATA VALUE.
           STA      $+3
           RCPYI    P,B
           B        ZIBIDEC        BINARY TO EBCDIC SUBR.
           RES      1
           DATA     1
           DATA     X'1808'        PRINT 24 CHARACTERS.
           RCPY     C,A            YES, CLEAR ADJUST FLAG.
           STA      ZFADJUST
           B        ZITOOLEX
ZINOSTP    LDA      ZNCMODE        NO,CONSOLE CMD. IS START.
           AND      ZKBIT15        ALREADY IN START MODE
           BAZ      $+3            IF ZERO, NOT IN START.
           RCPYI    P,L            YES, CURRENTLY IN START.
           B        ZIADJUST       BRANCH TO ADJUST COMP.OR DRVERS.
           LDA      =X'FF81'
           STA      ZNTMODE        SET TOOL MODE =START.
```

```
ZINOCON      B       ZITOOLEX
             LDA     *ZISYSER
             STA     ZNX1PSD2         MODIFY INTERRUPT EXIT ADDRESS.
             WD      X'D8'            BEGIN INTERRUPT EXIT SEQUENCE.
             LDX     ZNX1PSD1         EXIT COMPLETE.
ZIADJUST     RD      CONSOLE1         READ CONTROL PANEL REG.#1.
             AND     =ZKX3C           MASK + & - BITS (10 & 11).
             BAZ     ZIRETOO2         BRANCH IF + OR - NOT SELECTED.
             RCPY    A,T
             LDA     ZWCRIWRD         CURRENT TOOL CRITERIA WORD.
             AND     =ZKX1FF          MASK ADDRESS DISPLACEMENT.
             BAZ     $+2              BRANCH IF LAST CMD. IS ADJUSTABLE.
             RCPY    L,P              RETURN TO CALLER.

RCPY    T,A
             CP      =ZKX30           + & - BOTH SELECTED
             BNC     $+3              NO.
             LDA     =ZIERRCTL        YES,EXIT INTERRUPT TO ERROR SUBR.
             B       ZIEREX2
             CP      ZKBIT11          INCREMENT OR DECREMENT.
             BNC     $+3              BRANCH AND DECREMENT.
             IN      ZNBIRES2         INCREMENT DATA VALUE.
             B       $+4
             RCPY    *0,A             (A)=-1.
             ADD     ZNBIRES2         DECREMENT DATA VALUE.
             STA     ZNBIRES2         UPDATE DATA VALUE.
             RCPY    *0,A
             STA     ZFADJUST         SET ADJUST FLAG.
             LDA     ZNDVCNO          CC MTT DEVICE REG. ADDRESS.
             RCPY    A,B
             LDX     ZNDEVICE         DRIVER OR NETWORK NO.
             LDA     ZNBIRES1         *PREDATA VALUE.
             SCLS    7                CONTROL BIT FOR COMP. NETWORKS.
             ADD     ZNBIRES2         + FIRST DATA VALUE.
             WD      0,1,1            WRITE DATA TO MTT DEVICE REG.
             BNC     $+2              ERROR, MTT DID NOT RESPOND.
             RCPY    L,P              RETURN TO CALLER.
             LDA     =ZIERR2CC        ADDRESS OF 200 ERROR ROUTINE.
ZIEREX2      STA     ZNX1PSD2         MODIFY INTERRUPT EXIT ADDRESS.
             WD      X'D8'            BEGIN INTERRUPT EXIT SEQUENCE.
             LDX     ZNX1PSD1
*
******** BEGIN INTEGRAL #2 INTERRUPT SERVICE ROUTINE. THIS ROUTINE SERV
******** CES INTERRUPTS GENERATED BY THE MTT INSTRUMENT CONTROLLER.
ZNX2PSD1     RES     1                CLASS 2 PSD WORD.
ZNX2PSD2     RES     1                CLASS 2 PSD WORD.
             WD      INHIBIT          INHIBIT ALL INTERRUPTS.
             STA     ZWASAVE          SAVE (A) REGISTER.
             RD      X'FC20'          READ INSTRUMENT CONTROLLER.
             BNO     $+6              BRANCH IF MTT IS OPERABLE.
             LDA     =ZISYSER         ADDRESS OF SYSTEM ERROR ROUTINE.
             STA     ZNX2PSD2         MODIFY INTERRUPT EXIT ADDRESS.
             LDA     ZWASAVE          RESTORE ACCUMULATOR.
```

```
         WC      X'C8'                    BEGIN INTERRUPT EXIT.
         LDX     ZNX2PSD1
         RCPY    C,A
         STA     ZFMTTRDY                 INDICATES MTT IS READY.
         B       $-5
         LPOOL
*
*
SHIEXEC  EQU     $-1                      HIGH ADDRESS LIMIY, EXEC. PROG.
SIZEXEC  EQU     SHIEXEC-SLOEXEC          MEMORY SIZE OF EXEC PROGRAM.
SHIDIST  EQU     DISTEND                  HIGH LIMIT OF DISTRIBUTION TABLE.
         END                              END CARD.
```

```
*BASEPLATE TOOL TRANSLATOR AND CONTROLLER
*
*         PROTOTYPE ASSEMBLY REVISION LEVEL D    RD-169
*
*         H.R.S.                                 MARCH 7, 1969
*
*REVISION--B--AMS 7/16/68
*   B      DELINEATION ONLY.
*
*
*THIS PROGRAM INTERPRETS OPERATOR INPUT COMMANDS AND STATEMENTS EXPRESSI
*DELTA 400 TEST ORIENTED OPERATOR'S LANGUAGE (TOOL) FORMAT.  EACH INPUT
*ONLY PARTIALLY PROCESSED BY THIS PROGRAM, FINAL PROCESSING BEING PERFO
*THE COMPANION TOOL SERVICE ROUTINES (PN 00-C1C2).  THIS PROGRAM IS RES
*FOR COMMAND/STATEMENT RECOGNITION AND FOR CONVERSION OF NUMERIC DATA (
*TO BINARY FORM.  BINARY RESULTS ARE LEFT IN A TABLE, ZNBIRES, FOR FINAL
*SING BY TOOL SERVICE.  ILLEGAL OR IMPROPER ENTRIES RESULT IN THE INITI
*ERROR MESSAGES TO THE OPERATOR.  THESE MESSAGES HAVE THE FOLLOWING MEA
*
*ERROR CO1 - ENTRY APPEARS AS CLASS 3 STATEMENT AND NO VALID CLASS 2 ST
*            HAS BEEN PREVIOUSLY ENTERED OR RECOGNIZED.
*ERROR CO2 - ENTRY APPEARS AS A CLASS 3 STATEMENT AND IS INVALID FOR TH
*            STATEMENT CURRENTLY IN EFFECT.
*ERROR CO3 - PRE-DATA INFORMATION CONTAINED BEFORE THE DASH IN THE STATE
*            FAILS TO MEET THE REQUIREMENT OF TWO CONTIGUOUS NUMERICS.
*ERROR CO4 - STATEMENT CONTAINS AN ILLEGAL CHARACTER IN THE DATA FIELD.
*ERROR CO5 - STATEMENT FORMAT REQUIRES PRE-DATA NUMERIC INFORMATION WHI
*            NOT ENTERED OR RECOGNIZED.
*ERROR CO6 - THE DATA PORTION OF THE STATEMENT CONTAINS MORE THAN THE P
*            FIVE (5) CONTIGUOUS NUMERICS.
*ERROR CO7 - COMMAS APPEAR IN THE DATA PORTION OF THE ENTRY AND ARE NOT
*            MISSABLE IN THIS STATEMENT.
*ERROR CO8 - STATEMENT FORMAT REQUIRES NUMERIC DATA WHICH WAS NOT ENTER
*            COGNIZED.
*
*
*REVISION--C--HRS 11/20/68
*   C
*ADDED REF CARD (KIIOCS). MODIFIED ZTIDT3+38 FROM 'ZA' TO 'AN'.
         PAGE
         DEF      ZITOOL1
         DEF      ZBTOOLIN
         DEF      ZNKEY1
         DEF      ZNKEY2
         DEF      ZNTMODE
         DEF      ZANXTWD
         DEF      ZNDEVICE
         DEF      ZNBIRES1
         DEF      ZNBIRES2
         DEF      ZNBIRES3
         DEF      ZNBIRES4
         DEF      ZNBIRES5
         DEF      ZWCRIWRD
```

```
         DEF      SLOTOOL1
         DEF      SHITOOL1
         DEF      SIZTOOL1
         DEF      ZITCNTRL
         DEF      ZFNUM
         DEF      ZNERCODE
         DEF      ZIEREXIT
         DEF      ZIG9CHK
         DEF      ZFPUNCH
*
         REF      ZIMASTER
         REF      ZKCL1CRI
         REF      ZKDRICRI
         REF      ZISRVCA
         REF      ZTIDT3A
         REF      ZCACTN
         REF      ZIBITCNV
         REF      ZFCONCMD
         REF      KIIOCS
         REF      ZNX1PSD1       INTEGRAL 1 PSD WORD.
         REF      ZNX1PSD2       INTEGRAL 1 INTERRUPT PSD WORD.
         REF      ZWASAVE
         REF      ZWESAVE
         REF      ZWTSAVE
         REF      ZWLSAVE
         REF      ZWXSAVE
         REF      ZWBSAVE
         REF      ZNCMODE
         REF      ZFPARSTR
         REF      ZIRESTR
         REF      ZIERRCTL
         PAGE
         ASECT
         ORG      X'FC'          ABSOLUTE MEMORY.
*
P        EQU      1              PROGRAM REGISTER.
L        EQU      2              LINK REGISTER.
T        EQU      3              TEMPORARY REGISTER.
X        EQU      4              INDEX REGISTER.
B        EQU      5              BASE REGISTER.
E        EQU      6              EXTENDED ACCUMULATOR.
A        EQU      7              ACCUMULATOR
START    EQU      X'FF81'        START COMMAND.
ERASE    EQU      1              ERASE COMMAND.
READ     EQU      3              READ COMMAND.
PUNCH    EQU      4              PUNCH COMMAND
ERROR    EQU      5
ZKBYTE1  EQU      X'70'          BYTE MASK.
ZKBYTE2  EQU      X'71'          BYTE MASK.
CONSOLE1 EQU      X'F3E3'        CONSOLE READ/WRITE REG.#1.
CONSOLE2 EQU      X'F3EC'        CONSOLE READ REG. #2.
ZKBIT15  EQU      X'6C'
*
```

```
ZMER1      TEXT    ' 0C1'              ERROR MESSAGE .
ZMER2      TEXT    ' C02'              ERROR MESSAGE .
ZMER3      TEXT    ' C03'              ERROR MESSAGE .
ZMER4      TEXT    ' 0C4'              ERROR MESSAGE .
ZMER5      TEXT    ' 0C5'              ERROR MESSAGE .
ZMER6      TEXT    ' 0C6'              ERROR MESSAGE .
ZMER7      TEXT    ' 0C7'              ERROR MESSAGE.
ZMER8      TEXT    ' C08'              ERROR MESSAGE.
           PAGE
           CSECT
           ORG     X'5E8'              ****** TEMP CARD ******
SLOTOOL1   EQU     $                   LOW LIMIT.
*
ZTIOT1     TEXT    '*S*E*C*R*P*9'     CLASS 1 COMMAND KEYS.
ZTIOT2     TEXT    '/SEGIZ*I/D/A/L/P'  CLASS 2 COMMAND KEYS.
           TEXT    '/W/BPE//'          CLASS 2 COMMAND KEYS.
ZTIOT1A    DATA    X'8100'             *START CODE.
           DATA    X'100'              *ERASE CODE.
           DATA    X'8200'             *CONTINUE CODE.
           DATA    X'300'              *READ CODE.
           DATA    X'4CC'              *PUNCH CODE.
           DATA    X'500'              *OPERATOR CODE.
ZTIOT2A    DATA    0                   CODE FOR /SWITCH;/SIZE; & /SEG.
           DATA    X'F60A'             /SEQUENCE CODE.
           DATA    X'F8CF'             /SIZE CODE.
           DATA    X'FB14'             /SWITCH CODE.
           DATA    X'F81C'             /DRIVER CODE.
           DATA    X'FC20'             /ACCEPT CODE.
           DATA    X'FC24'             /LIMIT CODE.
           DATA    X'FE26'             /PATTERN CODE.
           DATA    X'FD29'             /WIRING CODE.
           DATA    X'FD2C'             /BLOCK CODE.
           DATA    X'FE2E'             /SPECIAL CODE.
           DATA    X'FF05'             // COMMENT CODE.
ZTIOT3     TEXT    'DIDRSY  INPA  ST'  CLASS 3 COMMAND KEYS.
           TEXT    'FRPUDISEPLYAXADI'  CLASS 3 COMMAND KEYS.
           TEXT    'SE  YAXADE*IRIA*'  CLASS 3 COMMAND KEYS.
           TEXT    '_ CASHSETSTPAPST'  CLASS 3 COMMAND KEYS.
           TEXT    'SCPLYAXA*OCYANYA'  CLASS 3 COMMAND KEYS.
           TEXT    'XADISEXYSYSK'      CLASS 3 COMMAND KEYS.
           DATA    0                   RSRVD. FOR ADDITIONAL CL 3. KEYS.
           DATA    0                   RSRVD. FOR ADDITIONAL CL 3. KEYS.
           DATA    0                   RSRVD FOR ADDITIONAL CL 3. KEYS.
           DATA    0                   RSRVD FOR ADDITIONAL CL 3. KEYS.
*
ZMERROR    TEXT    'ERROR '            TOOL ERROR MESSAGE.
ZSTOOLIN   RES     40                  I/O DATA BUFFER.
ZNTMODE    DATA    1                   TOOL MODE=CLASS 1 CODE (CURRENT).
ZFCL2      DATA    1                   CLASS 2 RCVD. FLAG.
ZNCL3LEN   RES     1                   CL 3 TBL. LENGTH FOR CURRENT CL 2.
ZWCRIWRD   RES     1                   DATA FORMAT CRITERIA.
ZNKEY1     RES     1                   KEY1=1ST 2 CHARS. OF COMMAND.
```

```
ZNKEY2      RES     1               KEY2=2ND 2 CHARS. OF COMMAND.
ZFSCHK      DATA    0               FLAG SET IF /S TYPE COMMAND RCVD.
ZNERCODE    RES     1               ADDRESS OF APPROPRIATE ER MSG.
ZFTOOLER    DATA    0               FLAG SET NEGATIVE IF ERROR.
ZFKEY       DATA    0               KEY FLAG INDICATES 1 OR 2.
ZFCHAR      DATA    0               CHAR FLAG INDICATES 1 OR 2.
ZFPUNCH     DATA    0               (-) DENOTES PUNCHING REQD.
ZFPRINT     DATA    0               (-) DENOTES PRINTING REQD.
ZNDEVICE    RES     1               INDICATES IDENTIFIED CL3 CMDN.
*
*
ZITCNTRL    LDA     ZFTOOLER         ERROR RECORDED
            BAN     ZIERROR          YES
            LDA     ZFPUNCH          PUNCHING REQD.
            BAN     ZIPUNCH          YES
            LDA     ZFPRINT          PRINTING REQD.
            BAN     ZIPRINT          YES.
            LDX     *-40
            RCPY    0,A              CLEAR ACCUMULATOR.
            STA     ZBTOOLIN+40,1    CLEAR TOOL DATA I/O BUFFER.
            BIX     $-1
ZIGOCHK     LDA     ZFPARSTR         BLOCK SCAN PARAMETERS IN TEMP.STORE
            BAN     $+2              YES, BRANCH.
            B       $+3              NO.
            RCPYI   P,L              YES, BRANCH TO RESTORE SUBR.
            B       ZIRESTR
            LDA     ZNTMODE          TOOL MODE=START OR CONTINUE
            BAN     ZIGOCON          YES
            CP      *ERROR           TOOL MODE =ERROR
            BNC     $+2              NO.
            B       ZIERRCTL         YES.
            CP      *ERASE           TOOL MODE=ERASE
            BNC     $+2              NO
            B       ZICLRACT         YES
            CP      *READ            TOOL MODE=READ
            BNC     $+2              NO
            B       ZIREAD           YES
            CP      *PUNCH           TOOL MODE=PUNCH
            BNC     ZIENTER          NO
            RCPY    *0,A             YES    SET AC NEGATIVE.
            STA     ZFPUNCH          SETS PUNCH FLAG.
            B       ZIENTER
ZICLRACT    RCPY    0,A              =ERASE ACTION.
            STA     ZCACTN           CLEAR
            STA     ZNTMODE          RESET TOOL MODE.
            LDX     *-18
            RCPY    *0,A             SET AC NEGATIVE.
            STA     ZIBITCNV,1       CLEAR ACTION TABLES.
            BIX     $-1
            B       ZIENTER          END ERASE ACTION.
            LPOOL
ZIGOCON     LDA     ZFCONCMD
            BAN     $+5              BRANCH IF IN INTERRUPT STATE.
```

```
          LDA     ZKBIT15              BIT 15 = START BIT.
          STA     ZNCMODE              UPDATE CONTROL LAMP STATUS.
          WD      CONSOLE1             UPDATE LAMPS.
          B       ZIMASTER             EXIT TO START TESTING.
          LDA     ZNCMODE              CURRENT CONTROL LAMP STATUS.
          LDX     ZKBIT15              BIT 15 =START LAMP BIT.
          ROR     X,A
          STA     ZNCMODE              UPDATE LAMP STATUS.
          WD      CONSOLE1             UPDATE LAMPS.
          LDA     ZNTMODE
          CP      =START               CURRENT TOOL MODE =START
          BNC     $+5                  NO, BRANCH.
          LDA     =ZIGOCON+2
          STA     ZNX1PSD2             MODIFY INTERRUPT EXIT ADDRESS.
ZIX1EXIT  WD      X'D8'                BEGIN INTERRUPT EXIT SEQUENCE.
          LDX     ZNX1PSD1
          LDA     ZWBSAVE              BEGIN RESTORING REGISTERS.
          RCPY    A,B
          LDA     ZWXSAVE
          RCPY    A,X
          LDA     ZWLSAVE
          RCPY    A,L
          LDA     ZWTSAVE
          RCPY    A,T
          LDA     ZWESAVE
          RCPY    A,E
          LDA     ZWASAVE
          B       ZIX1EXIT
*
ZIERROR   RCPYI   P,L
          B       KIIOCS               I/O SUBROUTINE.
          TEXT    'D8'                 OUTPUT DEVICE.
          DATA    X'C005'              WRITE EBCDIC ORDER.
          ADRL    ZMERROR              ADDRESS OF ERROR MESSAGE.
          DATA    6                    BYTE COUNT.
          BAN     ZHIOSTOP             IF NEG., I/O ERROR.
          LDA     ZNERCODE             OBTAIN ERROR NO.
          STA     $+5
          RCPYI   P,L
          B       KIIOCS               I/O SUBROUTINE.
          TEXT    'D8'                 OUTPUT DEVICE.
          DATA    X'C005'              WRITE EBCDIC ORDER.
          RES     1                    ADDRESS OF ERROR NO. MSG.
          DATA    4                    BYTE COUNT.
          BAN     ZHIOSTOP             IF NEG, I/O ERROR.
          STA     ZFTOLER              RESET TOOL ERROR FLAG.
          LDA     ZNTMODE
          CP      =READ                TOOL MODE = READ
          BNC     ZIGOCHK-4            NO
          B       ZIPRINT              YES  PRINT BAD STATEMENT.
ZIPUNCH   LDA     ZANXTWD              COMPUTE PUNCH BYTE COUNT.
          SUB     =ZBTOOLIN
          RADDI   0,A                  DIFFERENCE+1.
```

```
            SALS      1                    WORD COUNT X 2 = BYTE COUNT.
            STA       $+6
            RCPYI     P,L
            B         KIIOCS               I/O SUBROUTINE.
            TEXT      'BO'                 OUTPUT DEVICE=PUNCH.
            DATA      X'C001'              PUNCH EBCDIC ORDER.
            ADRL      ZBTOOLIN             ADDRESS OF DATA TO BE PUNCHED.
            RES       1
            BAN       ZHIOSTOP             IF NEG, I/O ERROR.
            STA       ZFPUNCH              CLEAR PUNCH FLAG.
            B         ZIGOCHK-4
ZIPRINT     LDA       ZANXTWD              COMPUTE PRINT BYTE COUNT.
            SUB       =ZBTOOLIN            DIFFERENCE=WORD COUNT.
            RADDI     O,A                  DIFFERENCE+1.
            SALS      1                    WORD COUNT X 2 = BYTE COUNT.
            STA       $+6
            RCPYI     P,L
            B         KIIOCS               I/O SUBROUTINE.
            TEXT      'DO'                 OUTPUT DEVICE=PRINTER.
            DATA      X'CC05'              WRITE EBCDIC ORDER.
            ADRL      ZBTOOLIN             ADDRESS OF DATA TO BE PRINTED.
            RES       1
            BAN       ZHIOSTOP             IF NEG, I/O ERROR.
            STA       ZFPRINT              CLEAR PRINT FLAG.
            B         ZIGOCHK-4
ZIENTER     RCPYI     P,L                  ENABLE KEYBOARD FOR TOOL ENTRY.
            B         KIIOCS               I/O SUBROUTINE.
            TEXT      'DI'                 INPUT DEVICE=KEYBOARD.
            DATA      X'CC06'              READ EBCDIC ORDER.
            ADRL      ZBTOOLIN             DATA INPUT TO TOOL BUFFER.
            DATA      80                   BYTE COUNT = 80 MAXIMUM.
            BAN       ZHIOSTOP             IF NEG, I/O ERROR.
            B         ZITOOL1              EXIT TO CHK INPUT COMMAND.
ZIREAD      RCPYI     P,L                  ENABLE READER FOR TOOL INPUT.
            B         KIIOCS               I/O SUBROUTINE.
            TEXT      'BI'                 INPUT DEVICE=READER.
            DATA      X'CC06'              READ EBCDIC ORDER.
            ADRL      ZBTOOLIN             DATA INPUT TO TOOL BUFFER.
            DATA      80                   BYTE COUNT=80 MAXIMUM.
            BAN       ZHIOSTOP             IF NEG, I/O ERROR.
            RD        CONSOLE1             READ CONTROL PANEL REG.#1.
            AND       =X'100'              MASK NO-PRINT BIT #1.
            BAZ       $+3                  BRANCH IF PRINTING IS REQUIRED.
            STA       ZFPRINT              SET PRINT FLAG ACCORDINGLY.
            B         ZITOOL1              EXIT TO CHECK INPUT COMMAND.
            RCPY      *O,A                 YES, PRINTING IS REQUIRED.
            B         $-3
ZHIOSTOP    LDA       =X'40'               I/O ERROR HALT ROUTINE.
            HIO
            RCPY      C,A
            STA       ZNTMODE              CLEAR TOOL MODE.
            LDA       ZNCMODE              CURRENT LAMP STATUS.
            AND       =X'FFFE'             SET STOP BIT #15 =0.
```

```
              STA      ZNCMODE                UPDATE LAMP STATUS.
              WD       CONSOLE1               TURN STOP LAMP ON.
              WD       X'DO'                  MACHINE HALT. OPERATOR ACTION REQD.
              B        ZITCNTRL
              LPOOL
              PAGE
******* BEGIN EXAMINATION OF INPUT COMMANDS.
*
ZITOOL1       LDA      X'5C'-1
              STA      ZCBYTE                 SET BYTE COUNT=-1.
              LDA      X'5C'-2
              STA      ZFKEY                  SET KEY FLAG=-2.
              STA      ZFCHAR                 SET CHAR. FLAG=-2.
              LDA      =ZBTOOLIN
              RADD     *0,A                   ZBTOOLIN-1.
              STA      ZANXTWD                ADDRESS OF WORD TO BE EXAMINED.
ZISRCH        IM       ZCBYTE                 BEGIN SEARCH FOR 1ST VALID BYTE.
              BNC      ZIB1                   BRANCH IF BYTE CT.=0.
              IM       ZANXTWD                UPDATE FOR EXAMINATION OF NXT. WD.
              LDA      X'5C'-2
              STA      ZCBYTE                 SET BYTE COUNT=-2.
              LDA      *ZANXTWD               FETCH NEXT 2 BYTES.
              SARS     8                      RI. JUSTIFY BYTE 0.
              B        $+2
ZIB1          LDA      *ZANXTWD               FETCH CURRENT WORD.
              AND      ZKBYTE1                EXTRACT BYTE IN POSITION 1.
              CP       =X'CO'                 BYTE<EBCDIC A
              BNO      ZINOTA                 YES
              CP       =X'EA'                 NO   IS BYTE < EBCDIC Z
              BNO      ZIALPHA                YES  BYTE IS AN ALPHA CHAR.
              B        ZISRCH                 NO   BYTE INVALID. CONTINUE SRCH.
ZINOTA        CP       =X'60'                 BYTE=DASH
              BNC      $+2                    NO
              B        ZIALPHA                YES
              CP       =X'61'                 BYTE=SLASH (/)
              BNC      ZINLTEST               NO   CHECK FOR NEW LINE.
ZIALPHA       IM       ZFCHAR                 VALID CHARF UPDATE CHAR CT.
              BNC      ZIFIRST                IF NO CARRY, THEN FIRST CHAR.
              ROR      A,T                    T=FIRST CHAR OF CURRENT KEY.
              IM       ZFKEY                  UPDATE KEY FLAG.
              BNC      ZIKEY1                 IF NO CARRY, FIRST KEY LETTER FOUND
              RCPY     T,A
              STA      ZNKEY2                 STORE KEY2
              LDA      ZANXTWD
              STA      ZNSTRTWD
              LDA      ZCBYTE
              B        ZITEST                 EXIT TO KEY RECOGNITION.
ZINLTEST      CP       =X'15'                 BYTE=NEW LINE
              BNC      ZISRCH                 NO   INVALID, CONTINUE SRCH.
              B        ZITCNTRL+6
ZIFIRST       SALS     8                      LEFT JUSTIFY 1ST BYTE OF KEY.
              RCPY     A,T                    STORE IN T REG.
              B        ZISRCH                 CONTINUE SRCH.
```

```
ZIKEY1    RCPY    T,A
          STA     ZNKEY1           STORE KEY1.
          LDA     X'5C'-2
          STA     ZFCHAR           SET CHAR FLAG=-2
          B       ZISRCH           CONTINUE SRCH FOR 2ND KEY.
ZNSTRTWD  RES     1                ZBTOOLIN ADDR. OF WORD CONTAINING
ZNSTRBY   RES     1                WORD AND BYTE POSITION,RESPECTIVELY
          LPOOL
          PAGE
******** BEGIN KEY RECOGNITION AND COMMAND  DATA PROCESSING.
*
ZITEST    LDA     ZNKEY1           KEY1=1ST TWO VALID CHARS. OF CMND.
          LDX     X'5C'-6
          CP      ZTIDT1+6,1       COMPARE TO CLASS 1 KEYS.
          BXNC    $-1
          LDA     ZTIDT1A+6,1      EXTRACT CORRESPONDING CODE.
          BAZ     ZICL2CHK         IF ZERO, NOT A CLASS 1 COMMAND.
          SARS    8                RIGHT JUSTIFY-EXTENDED SIGN.
          STA     ZNTMODE          SETS TOOL MODE PER INPUT COMMAND.
          STA     ZFCL2            SETS FLAG NOT=ZERO.
          LDA     ZKCL1CRI         CLASS 1 CONVERSION CRITERIA.
ZITOOLEX  STA     ZWCRIWRD
          B       ZICONVRT         EXIT TO DATA CONVERSION.
ZICL2CHK  RCPY    C,A              START CLASS 2 CHECK.
          STA     ZFSCHK           CLEAR /S FLAG.
          LDA     ZNKEY1
ZICL2RET  LDX     X'5C'-X'C'
          CP      ZTIDT2+12,1      COMPARE TO CLASS 2 KEYS.
          BXNC    $-1
          LDA     ZTIDT2A+12,1     EXTRACT CORRESPONDING CODE.
          BAZ     ZISLASHS         IF C, COMMAND=/S TYPE.
          RCPY    X,A              X=NO. OF COMMAND FOUND.
          BAZ     ZICL3CHK         IF NO.=C,NO CLASS 2 CMND. FOUND.
          RCPY    O,A
          STA     ZFCL2            SET FLAG=CLASS 2 FOUND.
          RCPYI   *X,A
          CP      X'5C'+9          COMMAND=/S TYPE
          BNG     $+3              NO
          LDA     ZFSCHK           YES
          BAZ     ZICL3CHK
          LDA     ZTIDT2A+12,1     EXTRACT CORRRESPONDING CODE.
          AND     ZKBYTE1          MASK.
          RCPY    A,T
          ADD     =ZTIDT3          FORM TABLE 3 ADDRESS.
          STA     ZNCL3DT          =LOC. OF APPLICABLE CL3 CMNDS.
          RCPY    T,A
          ADD     =ZTIDT3A
          STA     ZNCL3DTA         =LOC. OF APPLIC. CRITERIA WDS.
          LDA     ZTIDT2A+12,1
          SARS    8                RIGHT JUSTIFY-SIGN EXTENDED.
          STA     ZNCL3LEN         =-(NO. OF APPLIC. CL3 CMNDS.)
          RCPYI   *X,A
          SUB     X'5C'+8
```

```
                BAZ       $+3                  O INDICATES /DRIVER OR /DAMP.
                LDA       ZKCL1CRI
                B         ZITOOLEX
                LDA       ZKDR1CRI
                B         ZITOOLEX
ZISLASHS        RCPY      *O,A
                STA       ZFSCHK               SET FLAG NEGATIVE=/S FOUND.
                LDA       ZNKEY2               FETCH NEXT KEY.
                B         ZICL2RET             RETURN TO EXAMINE KEY2.
ZICL3CHK        LDA       ZFCL2                START CLASS 3 CHECK.
                BAZ       $+2
                B         ZIER001              ERROR  NO CLASS 2 IN EFFECT.
                LDA       ZNKEY1
                LDX       ZNCL3LEN             DETERMINED BY CLASS 2 CMND.
                CP        *ZNCL3DT,1           COMPARE TO APPLIC. CLASS 3 KEYS.
                BXNC      $-1
                RCPY      *X,A
                BAN       ZIERR002             ERROR  INVALID CL3 FOR CURRENT CL2.
                STA       ZNDEVICE             USED BY TOOL SERVICE ROUTINES
                LDA       *ZNCL3DTA,1
                B         ZITOOLEX
ZIERR001        LDA       =ZMER1               ADDRESS OF  001
                B         ZIEREXIT
ZIERR002        LDA       =ZMER2               ADDR. OF  002
ZIEREXIT        STA       ZNERCODE             FOR USE BU ERROR PRINT ROUTINE.
                RCPY      *O,A
                STA       ZFTOOLER             SET FLAG NEG.=ERROR DETECTED.
                B         ZITCNTRL             ERROR EXIT TO TOOL CONTROL.
                LPOOL
                PAGE
ZNCL3DT         RES       1                    CL3 DATA TABLE POINTER.
ZNCL3DTA        RES       1                    CL3 CONV. CRITERIA POINTER.
********        BEGIN DATA CONVERSION.
*
ZTLOOKUP        DATA      X'40'                SPACE.
                DATA      X'60'                DASH.
                DATA      X'15'                NEW LINE.
                DATA      X'6B'                COMMA.
                DATA      X'C3'                C
                DATA      X'E6'                W
                DATA      X'F9'                9.
                DATA      X'F8'                8.
                DATA      X'F7'                7.
                DATA      X'F6'                6.
                DATA      X'F5'                5.
                DATA      X'F4'                4.
                DATA      X'F3'                3.
                DATA      X'F2'                
                DATA      X'F1'                1.
                DATA      X'F0'                0.
ZANXTAD         RES       1                    ADDR. OF NEXT WORD IN TOOL BUFFER
*                                              TO BE SERVICED.
ZCBYTE          RES       1
                                               BYTE NO. IN WORD TO BE SERVICED.
```

```
ZNBIRES1   RES       1              BIRES=BINARY RESULT OF BCD TO BI-
ZNBIRES2   RES       1              NARY CONVERSION.  THERE MAY BE AS
ZNBIRES3   RES       1              MANY AS 17 SUCH CONVERSIONS REQ'D.
ZNBIRES4   RES       1              FOR 1 TOOL INPUT COMMAND.  FOR EX-
ZNBIRES5   RES       1              AMPLE SEG. GEN. SYNC STEPS.
ZNBIRES6   RES       12             REMAINDER OF BIRES FIELD.
ZFNUM      DATA      C              NUMERIC RCVD. FLAG.
ZFDATA     DATA      C              DATA RCVD. FLAG.
ZFPRE      DATA      C              PREDATA FLAG.
ZCPRE      RES       1              PREDATA COUNTER.
ZCLOOP     RES       1              COUNTS N. OF DIGITS IN A GROUP.<6
ZFCOMMA    DATA      0              COMMA ALLOW FLAG.
ZCBIRES    RES       1              TALLIES CURRENT BIRES POSITION.
ZAEXIT     RES       1              COMPUTED EXIT ADDRESS.
ZCLIST     RES       1              TALLIES NO. OF DIGITS IN BCD. NO.
ZFPREDAT   DATA      C              PREDATA FLAG.
ZTLIST     RES       5              BCD DIGIT STORAGE.
EXITBASE   DATA      ZISRVCA        REFERENCE ADDRESS TO SRVC ROUTINES.
*
ZICONVRT   RCPY      0,A
           LDX       =-32
           STA       ZNBIRES1+32,1   CLEARS BIRES AND TALLIES.
           BIX       $-1
           LDA       X'5C'-2
           STA       ZCPRE           SET PREDATA COUNT=-2.
           LDA       ZWCRIWRD        BEGIN CRITERIA ANALYSIS.
           RCPY      A,E
           AND       =X'1FF'         MASK 9 BITS OF ADDR. DISPLACEMENT.
           ADD       EXITBASE        DISPLACE.+BASE=EXIT ADDRESS.
           STA       ZAEXIT
           BEN       ZISRVC          IF NEG., NO CONVERSION REQD.
           RCPY      E,A
           SALD      1
           STA       ZFPREDAT
           LDA       =ZNBIRES1
           BEN       $+2             IF NEG., PREDATA REQD.
           RADDI     C,A
           STA       ZCBIRES
           RCPY      E,A
           SALS      1
           STA       ZFCOMMA         IF NEG., COMMAS ALLOWED.
           LDA       =ZTLIST
           RCPY      A,B
*
ZIPRLOOK   RCPYI     P,L
           B         ZILOOKUP        SEARCH FOR PREDATA NUMERIC OR -.
           BAN       $-2             IF NEG., NOTHING FOUND.
           CP        X'5C'+1C        NUMERIC FOUND
           ENB       ZIPRNUM1        YES  FIRST NUMERIC.
           CP        X'5C'+14        NO   DASH FOUND
           BNC       $+2             NO .
           B         ZIDTLOOK        YES
           CP        X'5C'+13        NEW LINE FOUND
```

```
             BNC      ZIPRLOOK          NO
             B        ZINL              YES
   ZIPRNUM1  LDA      ZFNUM             NUMERIC ALREADY FOUND.
             BAN      ZIPRLOOK          YES    IGNORE THIS NUMERIC.
             LDA      ZFPREDAT          PREDATA REQD. BY COMMAND
             BAN      $+2               YES
             B        ZIPRLOOK          NO   IGNORE NUMERIC; NOT PREDATA.
             RCPY     *C,A
             STA      ZFNUM             SET NUMERIC FOUND FLAG.
   ZISTRPRE  RCPY     *X,A              *X=0-9.
             STA      0,,1              STORE NUMERIC IN ZTLIST.
             IM       ZCLIST            UPDATE COUNT OF ZTLIST ENTRIES.
             RADDI    C,B               BASE REG.+1.
             IM       ZCPRE             INCREMENT PREDATA COUNT.
             BNC      ZIPRSRCH          BRANCH IF COUNT NOT=0.
             RCPY     *0,A
             STA      ZFPRE             SET FLAG = PREDATA FOUND.
             LDA      *ZIPRLOOK
             RCPY     A,L               SET LINK REG=RETURN TO ZIPRLOOK.
             B        ZIDECBI           BRANCH TO BCD/BINARY CONVERSION.
   ZIPRSRCH  RCPYI    P,L
             B        ZILOOKUP          LOOK FOR 2ND PREDATA NUMERIC.
             BAN      $+3
             CP       X'5C'+10          NUMERIC
             BNO      ZISTRPRE          YES
             B        ZIERROO3          ERROR   INVALID PREDATA CHAR.
   ZIDTLOOK  LDA      X'5C'-6
             STA      ZCLOOP            SET LOOP COUNT=-6.
             RCPYI    P,L
             B        ZILOOKUP          LOOK FOR 1ST NUMERIC OF A GROUP.
             BAN      ZIERROO4          ERROR   ILLEGAL DATA CHARACTER.
             CP       X'5C'+15          SPACE FOUND
             BNC      $+2               NO
             B        ZIDTLOOK          YES
             CP       X'5C'+12          W,C OR NUMERIC FOUND.
             BNO      ZIDATA            YES
             B        ZIERROO4          ERROR   ILLEGAL DATA CHARACTER.
   ZIDATA    RCPY     *0,A
             STA      ZFDATA            SET DATA FOUND FLAG.
             IM       ZCLOOP            INCREMENT LOOP COUNT.
             BNC      ZISTRDAT          COUNT<6.
             B        ZIERROO6          ERROR   DIGIT COUNT > 5.
   ZISTRDAT  RCPY     *X,A              *X=0-9.
             STA      C,,1              STORE DIGIT IN ZTLIST.
             IM       ZCLIST            INCREMENT LIST COUNT.
             RADDI    C,B               BASE REG.+1.
             RCPYI    P,L
             B        ZILOOKUP          CONTINUE SEARCH FOR MORE DATA.
             BAN      ZIERROO4          ERROR   ILLEGAL DATA CHARACTER.
             CP       X'5C'+10          NUMERIC FOUND
             BNO      ZIDATA            YES
             CP       X'5C'+12          NO    COMMA FOUND
             BNC      ZIEND             NO
```

```
              LDA     ZFCOMMA           YES    COMMAS ALLOWED
              BAN     $+2               YES
              B       ZIERRO07          ERROR  COMMAS NOT PERMITTED.
              LDA     *ZIDTLOOK
              RCPY    A,L               SET LINK=RETURN TO ZIDTLOOK.
              B       ZIDECBI           BRANCH TO BCD/BINARY CONVERSION.
              LPOOL
ZIEND         CP      X'5C'+13          IS IT A NEW LINE CHAR
              BNC     ZISPACE           NO
ZINL          LDA     ZWCRIWRD
              SALS    3
              BAN     ZISRVC-2          IF NEG., NO DATA REQUIRED.
              LDA     ZFDATA            DATA ENTERED AND FOUND
              BAN     $+2               YES
              B       ZIERROO8          ERROR  DATA REQ'D BUT NOT FOUND.
              RCPYI   P,L
              B       ZIDECBI           BRANCH TO BCD/BINARY CONVERSION.
              LDA     ZFPREDAT          PREDATA REQD.
              BAN     $+2               YES
ZISRVC        B       *ZAEXIT           FINAL EXIT POINT TO SERVICE ROUTINE
              LDA     ZFPRE             PREDATA FOUND
              BAN     $-2               YES
              B       ZIERRO05          ERROR  PREDATA REQD BUT NOT FOUND.
ZISPACE       CP      X'5C'+15          SPACE FOUND
              BNC     ZIERRO04          ERROR  ILLEGAL DATA CHARACTER.
              B       ZIPRLOOK          YES
              PAGE
******* BEGIN LOOKUP SUBROUTINE . USES ZTLOOKUP TABLE.
*
ZILOOKUP      IM      ZCBYTE            INCREMENT BYTE COUNT.
              BNC     ZILOOP1           COUNT NOT ZERO.
              IM      ZANXTWD           INCREMENT WORD POINTER.
              LDA     X'5C'-2
              STA     ZCBYTE            SET BYTE CT.=-2.
              LDA     *ZANXTWD          FETCH 2 BYTES.
              SARS    8                 RIGHT JUSTIFY.
              B       $+2
ZILOOP1       LDA     *ZANXTWD          FETCH 2 BYTES.
              AND     ZKBYTE1           MASK
              LDX     =-16
              CP      ZTLOOKUP+16,1     PERFORM LOOKUP.
              BXNC    $-1               CONTINUE IF NO MATCH & MORE ENTRIES
              RCPY    *X,A              *X=NO. OF ENTRY FOUND, IF ANY.
              RCPY    L,P               RETURN TO CALLING ROUTINE.
              PAGE
******* BEGIN BCD TO BINARY CONVERSION ROUTINE.  HARTMANN METHOD.
ZIDECBI       RADD    *0,B              DOES BASE REG.-1.
              LDA     ZCLIST            NO. OF DIGITS TO BE CONVERTED.
              RADD    *0,A              NO.-1.
              RCPYI   *A,X              -(NO.-1) TO INDEX REG.
              BAZ     ZI1ITEM           IF C, BCD NO. CONTAINS ONLY 1 DIGIT
              RCPY    O,A
              ADD     C,1,1             ADD DIGITS.
```

```
              RCPY     A,T                STORE SUM TEMPORARILY.
              SALS     2                  SUM X 4.
              RADD     T,A                5(SUM)
              SALS     1                  2X5X(SUM)=10 X SUM.
              BIX      $-5                REPEAT FOR ALL DIGITS EXCEPT LEAST.
    ZI1ITEM   ADD      0,1,1              ADD LEAST SIGNIF DIGIT=RESULT.
              STA      *ZCBIRES           STORE IN CURRENT BIRES LOCATION.
              IM       ZCBIRES            UPDATE FOR NEXT ENTRY.
              LDA      *ZTLIST
              RCPY     A,B                INITIALIZE BASE REG.
              RCPY     O,A
              STA      ZCLIST             INITIALIZE LIST COUNT.
              RCPY     L,P                RETURN TO CALLER.
              LPOOL
    *
    *
    ZIERRCO3  LDA      *ZMER3             ADDRESS OF  003  MESSAGE.
              B        ZIEREXIT
    ZIERRCO4  LDA      *ZMER4             ADDRESS OF  004  MESSAGE.
              B        ZIEREXIT
    ZIERRCO5  LDA      *ZMER5             ADDRESS OF  005  MESSAGE.
              B        ZIEREXIT
    ZIERRCO6  LDA      *ZMER6             ADDRESS OF  006  MESSAGE.
              B        ZIEREXIT
    ZIERRQC7  LDA      *ZMER7             ADDRESS OF  007  MESSAGE.
              B        ZIEREXIT
    ZIERRCC8  LDA      *ZMER8             ADDRESS OF  008  MESSAGE.
              B        ZIEREXIT
              LPOOL
    *
    *
    SHITOOL1  EQU      $-1                HIGH LIMIT ADDRESS.
    SIZTOOL1  EQU      SHITOOL1-SLOTOOL1  PROGRAM SIZE.
              END                         END CARD.
```

```
*BASEPLATE TOOL-SERVICE ROUTINES.
*
*
*         PROTOTYPE ASSEMBLY REVISION LEVEL C ** RD-169
*
*         H.R.S.                                    MARCH 7, 1969
*
*REVISION--B-- AMS 7/16/68
* B       CORRECT CARD ERRORS. ADDED SUPPRESSION OF <> MESSAGE IF IN
*         READ WITH NO PRINT MODE. DELETED ERRONEOUS CARD FROM ZTIDT3A
*         MODIFIED ZISRVCN AND ZISRVCP TO ACCOMMODATE 32 S/D LINES AND
*         128 WORD S/D MAP.
*
*
*
*REVISION--C-- HRS 11/19/68
* C       MODIFIED ZISRVCL TO ACCOMODATE ADDITIONAL PREDATA FOR THE
*         X & Y AXIS WIRING COMMANDS, AND TO ACCOMODATE A NEW COM-
*         MAND, NAMELY, ANTICOINCIDENT. LITERALS WHICH ARE USED IN THE
*         CALLING OF LOCATIONS IN THE BLOCK SCAN ROUTIN HAVE BEEN
*         MODIFIED IN MOST SERVICE ROUTINES.
* C       MODIFY ZISRVCJ. ADDED FACILITY FOR ACCOMODATING 4 CLASS 3
*         COMMANDS, NAMELY: STEP REPEAT CO, STEP REPEAT O1, PAIR
*         REPEAT OC, PAIR REPEAT O1.PREVIOUSLY ONLY ONE STEP AND ONE
*         PAIR COMMAND COULD BE HANDLED SIMULTANEOUSLY.
*
*THESE ROUTINES OPERATE IN CONJUNCTION WITH THE BASEPLATE TOOL TRANSLATO
*C1C1). THEY OPERATE ON BINARY DATA LEFT BY THE TRANSLATOR IN A TABLE R
*TO AS ZNBIRES. AS MANY AS 17 INDIVIDUAL BINARY VALUES MAY APPEAR IN TH
*TABLE AS THE RESULT OF ONE OPERATOR ENTRY. THIS DATA, WHICH IS FORMATTE
*ESSARY, IS CHECKED FOR VALIDITY AND THEN ROUTED TO THE RESPECTIVE INTER
*ORY LOCATIONS AND/OR APPROPRIATE MTT DEVICE AND REGISTER. NOTE THAT NO
*DATA ENTERED VIA TOOL COMMANDS AND STATEMENTS IS TRANSFERRED TO THE MTT
*THE FOLLOWING INDEX SHOWS WHICH SERVICE ROUTINE IS USED FOR EACH OF THE
*STATEMENT GROUPS.
*ZISRVCA - ALL DRIVER AND DAMPING NETWORK VALUES.
*
*ZISRVCB - ALL CLASS 1 AND CLASS 2 STATEMENTS.
*
*ZISRVCC - SEQUENCE GENERATOR FREQUENCY AND INTERVAL REPEAT VALUES.
*
*ZISRVCD - /SIZE COMMANDS FOR X,Y AND PLANES. SEE ZISRVCG FOR SENSE/DIG
*
*ZISRVCE - /LIMITS COMMANDS.
*
*ZISRVCF - /ACCEPT COMMANDS.
*
*ZISRVCG - /SIZE COMMANDS FOR SENSE AND DIGIT.
*
*ZISRVCH - SEQUENCE GENERATOR DISCRIMINATOR, DRIVER, SYNC AND STEP/PAIR
*
*ZISRVCI - SEQUENCE GENERATOR START/STOP COMMAND (PULSE PROGRAM NN).
*
```

```
*ZISRVCJ - ENTERED FROM ZISRVCH FOR STEP/PAIR REPEAT PROCESSING.
*ZISRVCK - /PATTERN COMMANDS.
*
*ZISRVCL - /WIRING COMMANDS.
*
*ZISRVCM - /SWITCH COMMANDS EXCEPT THOSE FOR SENSE DIGIT. SEE ZISRVCP.
*
*ZISRVCN - /BLOCK DATA COMMANDS.
*
*ZISRVCP - /SWITCH ENTRIES FOR SENSE AND DIGIT.
*
*ZISRVCQ - /SPECIAL ACTION ENTRIES FOR SKIP AND SYNC.
*
*
*CERTAIN INVALID ENTRIES RESULT IN THE INITIATION OF AN ERROR PRINTOUT T
*OPERATOR.  THESE MESSAGES HAVE THE FOLLOWING MEANINGS.
*
*ERROR 100 - ENTRY SPECIFIES A SEQUENCE GENERATOR FREQUENCY IN EXCESS OF
*
*ERROR 101 - ENTRY CONTAINS AN ILLEGAL PRE-DATA VALUE.
*
*ERROR 102 - ENTRY CONTAINS BLOCK NUMBERS WHICH DO NOT FALL WITHIN THE 1
*           17-32; 33-48; 49-64 RANGES; OR, TOTAL NUMBER OF SENSE AND DIGIT LINES E
*PERMISSABLE VALUE OF 16; OR, TOTAL NUMBER OF SENSE/DIGIT SWITCH ASSIGNM
*EEDS 128.
*
*ERROR 103 - NUMBER OF SKIP/SYNC ENTRIES EXCEEDS ALLOWABLE MAXIMUM OF 6.
*ERROR 200 - MTT DID NOT RESPOND OR ACCEPT DATA TRANSFER.
*
         PAGE
         DEF     ZISRVCA
         DEF     ZKCL1CRI
         DEF     ZKDR1CRI
         DEF     SLOSRVC1
         DEF     SHISRVC1
         DEF     SIZSRVC1
         DEF     ZISRVC1
         DEF     ZTXACTN
         DEF     ZTYACTN
         DEF     ZTZACTN
         DEF     ZCACTN
         DEF     ZTIDT3A
         DEF     ZIBITCNV
         DEF     ZNDVCN9
         DEF     ZIERR2OC
*
         REF     ZNTMODE
         REF     ZWCRIWRD
         REF     ZTXAXIS
         REF     ZTYAXIS
         REF     ZTLAXIS
```

```
        REF     ZTZAXIS
        REF     ZNDEVICE
        REF     ZNBIRES1
        REF     ZNBIRES2
        REF     ZNBIRES3
        REF     ZNBIRES4
        REF     ZNBIRES5
        REF     ZTSGSTBL
        REF     ZTVALUES
        REF     ZNOPPAT1
        REF     ZNXCBSHF
        REF     ZNYCBSHF
        REF     ZNSDTOTA
        REF     ZNSVDVAL
        REF     SOSNEND
        REF     ZTSDSW
        REF     SDMAPEND
        REF     ZITCNTRL
        REF     ZFNUM
        REF     ZIEREXIT
        REF     ZFPATMAP
        REF     ZFPATRN
        REF     ZTPATMAP
        REF     ZTSDMAP
        REF     ZNCBSHF
        REF     ZNCBSIZ
        REF     ZASCAD
        REF     ZFANTCB
        REF     KIIOCS
        REF     ZNCURSGS
        PAGE
        CSECT
        ORG     X'88C'
SLOSRVC1 EQU    $              LOW LIMIT.
*
P       EQU     1              PROGRAM REGISTER.
L       EQU     2              LINK REGISTER.
T       EQU     3              TEMPORARY REGISTER.
X       EQU     4              INDEX REGISTER.
B       EQU     5              BASE REGISTER.
E       EQU     6              EXTENDED ACCUMULATOR.
A       EQU     7              ACCUMULATOR.
READ    EQU     3
X1      EQU     X'1000'
X2      EQU     X'2000'
X4      EQU     X'4000'
X5      EQU     X'5000'
X6      EQU     X'6000'
X8      EQU     X'8000'
ZKBYTEC EQU     X'71'
ZKBYTE1 EQU     X'70'
CONSOLE1 EQU    X'F3E3'        CONSOLE READ/WRITE REG.#1.
CONSOLE2 EQU    X'F3EC'        CONSOLE READ REG.#2.
```

```
ZTAXISAD  DATA   ZTXAXIS      TABLE OF ADDRESSES FOR SCAN PARAM-
          DATA   ZTYAXIS      ATER TABLES IN SCAN ROUTINE.
          DATA   ZTZAXIS
          DATA   ZTLAXIS
ZNDVCNO   RES    1            RESERVED FOR DEVICE NUMBER.
ZNSOSUM   DATA   0            NO. OF SENSE LINES.
          DATA   0            NO. OF DIGIT LINES.
ZNREPWD   DATA   0            STEP REPEAT 00-DATA PATTERN
          DATA   0            STEP REPEAT 01-DATA PATTERN
          DATA   0            PAIR REPEAT 00-DATA PATTERN
          DATA   0            PAIR REPEAT 01-DATA PATTERN
ZNINTVAL  RES    1            S.G. INTERVAL RPT. SELECTION.
ZCSHIFT   RES    1
ZWSAVX    RES    1            WORK LOCATION.
ZWSHIFT   RES    1
ZWDISPL   RES    1
ZWSTORE   RES    1
ZWINDEX   RES    1
ZWWORK    RES    1
ZCACTN    DATA   0            ACTION TABLE ENTRY COUNT.
ZTXACTN   RES    6            LIST OF X ACTION ADDRESSES.
ZTYACTN   RES    6            LIST OF Y ACTION ADDRESSES.
ZTZACTN   RES    6            LIST OF Z ACTION ADDRESSES.
          PAGE
******** BEGIN SUBROUTINE WHICH CONVERTS UP TO 16 BINARY VALUES INTO
******** A 16 BIT, SINGLE WORD PATTERN.
*
ZIBITCNV  RCPY   C,T
          RCPY   X,A
          STA    ZWSAVX        SAVE X REGISTER SETTING.
          LDX    =-16
          LDA    ZFNUM,1       ZFNUM,1=BIRES TABLE ENTRIES.
          BAZ    ZIFIN         RESULT=0. EXIT.
          SUB    X'51'         SUBTRACT 1.
          RCPY   C,E
          DIV    =16           DIVIDE VALUE BY 16.
          STA    ZWINDEX       AC=INTEGER QUOTIENT.
ZIBITLUP  LDA    ZFNUM,1       ZFNUM,1=BIRES TABLE ENTRIES.
          BAZ    ZIFIN         ENTRY=0. EXIT.
          SUB    X'51'
          RCPY   C,E
          DIV    =16
          CP     ZWINDEX       AC=INTEGER QUOTIENT.
          BNC    ZIBITER       ERROR  ENTRY OUT OF SET.
          RCPY   E,A           E=INTEGER REMAINDER.
          ADD    =X'20'
          STA    ZWWORK
          RCPYI  C,A
          S      *ZWWORK       POSITION BIT.
          ROR    A,T           T=BIT PATTERN BEING FORMED.
          BIX    ZIBITLUP
ZIFIN     LDX    ZWSAVX        RESTORE X REGISTER BEFORE EXIT.
          RCPY   T,A           LEAVE BIT PATTERN IN AC. BEFORE EXI
```

```
          RCPY     L,P                    RETURN TO CALLING ROUTINE.
ZIBITER  B        ZIERR1C2
*
*
ZIERR2CC LDA      =ZMER20C                ADDRESS OF 200 MESSAGE.
         B        ZIEREXIT                ERROR EXIT IN TRANSLATOR.
ZIERR1CC LDA      =ZMER1CC                ADDRESS OF 1CC MESSAGE.
         B        ZIEREXIT                ERROR EXIT IN TRANSLATOR.
*
*
*
*
*
******** BEGIN ROUTINE WHICH TRANSMITS BINARY DATA VALUES TO MTT DRIVERS
******** COMPENSATION NETWORKS AND SEG. GEN. INTERVAL & FREQ. REGISTERS.

ZISRVCA  LDX      ZNDEVICE                THIS ROUTINE MAY BE ENTERED DIRECTL
         LDA      ZNDVCN0                 FROM TRANSLATOR OR SERVICE ROUTINE
         RCPY     A,B
         LDA      ZNBIRES1                BIRES1=PREDATA VALUE.
         SCLS     7                       CONTROL BIT FOR COMP. NETWORKS.
         ADD      ZNBIRES2                BIRES2=FIRST DATA VALUE.
ZIAEXIT  WD       0,1,1                   WRITE DATA TO MTT DEVICE/REGISTER.
         BNC      ZIERR20C                ERROR   MTT DID NOT RESPOND.
         B        ZIACK                   ACKNOWLEDGE WITH <>.
ZISRVC1  EQU      ZISRVCA
         LP00L
*
*
*
*
*
******** BEGIN ROUTINE WHICH SERVICES ALL CLASS 1 & 2 COMMANDS.

ZISRVCB  LDA      ZWCRIWRD
         CP       =X'4000'                IS CMND.=/DRIVER OR /DAMPING.
         BNO      $+5                     NO
         LDA      =X'FF88'                YES   SET AC= DRIVER BASE ADDRESS
         ADD      ZNBIRES1                BIRES1=PREDATA=DRIVER OR DAMP. NO.
         SALS     5                       FORMAT MTT ADDRESS.
         STA      ZNDVCN0                 STORE FOR LATER ADDITION OF REG.
*                                         NUMBER BY SERVICE ROUTINE A .
         B        ZIICNTRL                RETURN TO TOOL CONTROL.
         LP00L
*
*
*
*
*
******** BEGIN ROUTINE WHICH ESTABLISHES VALUE OF SEG. GEN. INTERVAL
******** REPEAT NOS. AND FREQUENCY.
2MC      EQU      2000
```

```
 SGN0     EQU     X'F380'              SEQUENCE GENERATOR MTT ADDRESS.
 ZISRVCC  LDA     =SGN0
          STA     ZNDVCN0
          LDA     ZNDEVICE
          CP      X'50'+1              IS THIS A FREQUENCY ENTRY
          BNC     ZICLR                NO
          LDA     =2MC                 YES  SET AC=2000.
          RCPY    C,E
          DIV     ZNBIRES2             BIRES2=VALUE ENTERED BY CMND.
          BAZ     ZIERR100             ERROR QUOTIENT=0; FREQ>2000 KC.
          STA     ZNBIRES2             BIRES2 NOW=2000/ENTRY VALUE.
          RCPY    C,A
          STA     ZNBIRES1             SET BIRES1=0.
          B       ZISRVCA              EXIT TO A FOR TRANSMITTAL TO MTT
 ZICLR    LDA     ZNBIRES1             ENTERED FOR RPT. COMMANDS.
          ADD     ZNDVCN0              FORMS EITHER RPT. A OR B REG. ADDR.
          STA     ZNDVCN0
          B       $-6                  EXIT.
          LP00L
 *
 *
 *
 *
 *
 ******** BEGIN ROUTINE WHICH SERVICES DATA ENTERED BY CLASS 3 COM-
 ******** MANDS FOR /SIZE DEFINITION OF X,Y AND PLANES.
 *
 ZISRVCD  LDX     ZNDEVICE             INDICATES X,Y OR Z.
          LDA     ZTAXISAD,1           APPROPRIATE SCAN TABLE ADDRESS.
          RCPY    A,B                  SET BASE REGISTER.
          LDA     ZNBIRES2             BIRES2=SIZE VALUE.
          STA     5,,1                 STORE IN SCAN TABLE; SIZE LOC.
          B       ZIACK                ACKNOWLEDGE WITH <>.
          LP00L
 *
 *
 *
 *
 *
 ******** BEGIN ROUTINE FOR SERVICING DATA RELATING TO ACTUAL SCAN LIM-
 ******** ITS AS ENTERED THE CLASS 2 /LIMITS COMMAND FOR X,Y,LD/CHK & Z.
 *
 ZISRVCE  LDX     ZNDEVICE             INDICATES X,Y,LD/CHK OR PLANES.
          LDA     ZTAXISAD,1           FETCH APPROPRIATE SCAN TABLE ADDRES
          RCPY    A,B                  SET BASE REGISTER.
          LDA     ZNBIRES2             BIRES2=MINIMUM LIMIT
          STA     6,,1                 STORE IN SCAN TABLE; MIN LOC.
          LDA     ZNBIRES3             BIRES3=MAXIMUM LIMIT.
          RADDI   C,A                  MAXIMUM LIMIT+1.
          STA     7,,1                 STORE IN SCAN TABLE; MAX LOC.
          B       ZIACK                ACKNOWLEDGE WITH <>.
          LP00L
 *
```

```
*
*
*
*
******** BEGIN ROUTINE WHICH SERVICES HIGH & LOW ACCEPTANCE VALUES FOR
******** AP,TP AND TS AS ENTERED UNDER THE CLASS 2 /ACCEPT COMMAND.
******** ROUTINE ALSO HANDLES STROBE DISCRIMINATOR LIMITS IF APPLICABLE.
ZISRVCF  LDA    =ZTVALUES      ZTVALUES=TABLE WHERE LIMITS ARE TO
         RCPY   A,B            BE STORED.  SET BASE REGISTER.
         LDA    ZNDEVICE       INDICATES AP,TP,TS OR STROBES.
         BAZ    ZISVD          ZERO INDICATES STROBED DISC. VALUE.
         RCPY   A,X
         LDA    ZNBIRES1       BIRES1=PREDATA: SIGNIFIES ONES/ZERO
         BAZ    ZIZERO         ZERO INDICATES ZEROS LIMIT.
ZIONE    LDA    ZNBIRES2       BIRES2=LOW LIMIT.
         STA    8,1,1          STORE LOW VALUE IN ZTVALUES TABLE.
         LDA    ZNBIRES3       BIRES3=HIGH LIMIT.
         STA    2,1,1          STOR HIGH LIMIT IN ZTVALUES TABLE.
         B      ZIACK          ACKNOWLEDGE WITH <>.
ZIZERO   LDA    X'50'-3
         RADD   A,B            ADJUST BASE REG. VALUE.
         B      ZIONE
ZISVD    RCPYI  P,L
         B      ZIBITCNV       EXIT TO SUBROUTINE. FORM MASK.
         LDX    ZNBIRES1       BIRES1=ONES OR ZEROS.
         STA    ZNSVDVAL,1     AC=MASK.  STORE IN LIMIT LOCATION.
         B      ZIACK          ACKNOWLEDGE WITH <>.
         LPOOL
*
*
*
*
*
******** BEGIN ROUTINE WHICH SERVICES SENSE AND DIGIT LINE NOS. AS EN-
******** TERED UNDER THE CLASS 2 /SIZE COMMAND
*
ZISRVCG  LDA    ZNDEVICE       INDICATES SENSE OR DIGIT.
         SUB    X'5C'+3        RESULT = 0 OR 1.
         RCPY   A,X            C=SENSE; 1=DIGIT.
         LDA    ZNBIRES2       BIRES2=LINE NO.
         STA    ZNSDSUM,1      STORE VALUE.
         B      ZIACK          ACKNOWLEDGE WITH <>.
         LPOOL
*
*
*
*
*
******** BEGIN ROUTINE WHICH SERVICES DATA FOR SEQUENCE GENERATOR DISCRI
******** MINATOR, DRIVER, SYNC AND STEP/PAIR REPEAT SELECT REGISTERS.
*
ZISRVCH  LDA    ZNDEVICE       INDICATES PARAMETER.
         CP     X'5C'+9        DISCRIMINATOR
```

```
           BNθ       $+2                      NO
           ADD       X'5C'+11                 CORRECT FOR DISCR. ADDRESS.
           ADD       ZNBIRES1                 BIRES1=PREDATA=DRIV/DISC NO. IF APP
           STA       ZNDVCNO
           LDA       =SGNO
           RCPY      A,B
           RCPYI     P,L
           B         ZIBITCNV                 EXIT TO SUBROUTINE;FORM PATTERN.
           LDA       ZNDEVICE
           LDX       ZNDVCNO
           CP        X'5C'+5                  STEP OR PAIR REPEAT COMMAND
           BNO       ZISRVCJ                  YES    EXIT TO SERVICE ROUTINE J.
           RCPY      T,A
           B         ZIAEXIT                  EXIT TO  A  FOR TRANSMITTAL TO MTT.
           LPOOL
*
*
*
*
*
******* BEGIN ROUTINE FOR SERVICING START/STOP DATA FOR SG. GEN.
ZISRVCI    LDA       ZNBIRES3                 BIRES3=STOP STEP.
           RADD      *0,A                     STOP STEP-1.
           SALS      4                        POSITION IN BITS 4-7.
           RCPY      A,T                      SAVE STOP STEP IN T REG.
           LDA       ZNBIRES2                 BIRES2=START STEP.
           RADD      *0,A                     START STEP-1.
           ROR       A,T                      COMBINE START AND STOP STEPS.
           LDA       ZNBIRES1                 BIRES1=PREDATA=PROGRAM NO.
           BAZ       ZIALL                    ZERO INDICATES ALL PRGMS. USE SAME.
           RADD      *0,A
           RCPY      A,X
           LDA       ZTSGSTBL,1               SGSTBL=TABLE OF CONTROL WORDS.
           AND       ZKBYTEC                  MASK LEAVES CONTROL BITS.
           ROR       T,A                      CON
           ROR       T,A                      COMBINES START/STOP WITH CONTROL.
           STA       ZTSGSTBL,1               RESTORES NEW WORD.
           B         ZIACK                    ACKNOWLEDGE WITH <>.
ZIALL      LDX       =-16
           LDA       ZNCURSGS,1
           AND       ZKBYTEC                  EXTRACT CONTROL BITS.
           ROR       T,A                      COMBINE START/STOP WITH CONTROL.
           STA       ZNCURSGS,1
           BIX       $-4
           B         ZIACK
           LPOOL
*
*
*
*
*
******* BEGIN ROUTINE WHICH COMPLETES PROCESSING OF STEP/PAIR REPEAT
******* DATA BEGUN BY SERVICE ROUTINE h.
```

```
ZISRVCJ  RCPY   T,A              T CONTAINS PATTERN FROM ZISRVCH
         STA    ZNREPWD-2,1
         LDA    ZNBIRES1          =0 FOR C0 INTVL, =1 FOR C1 INTVL
         BAZ    $+4               INTVL A (C0)
         RADD   *0,X
         LDA    ZNREPWD-2,1       A CONTAINS OPPOSITE INTVL WORD (01)
         B      $+2
         LDA    ZNREPWD-1,1       A CONTAINS OPPOSITE INTVL WORD (C0)
         ROR    T,A               FORM COMPOSITE STEP OR PAIR WORD
         WD     0,1,1             SEND DATA TO MTT SEQ. GEN.
         BNC    ZIERR20C          ERROR  MTT DID NOT RESPOND.
         LDA    ZNDEVICE          BEGIN COMPUTATION OF INTERVAL SELEC
         CP     X'50'+4
         BNC    $+4
         RCPY   T,A
         SALS   1
         ROR    A,T               MARK REPEATED PAIRS.
         LDA    ZNINTVAL          CURRENT INTERVAL SELECT WD.
         RCPY   A,E
         LDA    ZNBIRES1          DETERMINE IF INTERVAL A OR B.
         BAZ    ZIAINTER          ZERO INDICATES INTERVAL A.
         RCPY   *T,A
         RAND   E,A
         STA    ZNINTVAL
         WD     X'F383'           WRITE TO SEQ. GEN INTERVAL REG.
         BNC    ZIERR20C          ERROR  MTT DID NOT RESPOND.
         B      ZIACK             ACKNOWLEDGE WITH <>
ZIAINTER RCPY   T,A
         ROR    E,A
         B      $-6
         LPOOL
*
*
*
*
*
******** BEGIN ROUTINE FOR SERVICING DATA WHICH DEFINES BOTH THE WORST
******** CASE AND OPERATING PATTERNS TO BE USED DURING TEST.
ZISRVCK  LDA    ZNDEVICE
         CP     X'50'+1           WORST CASE COMMAND
         BNC    ZINWC             NO
         LDA    ZNBIRES1          BIRES1=PREDATA VALUE.
         STA    ZFPATMAP          IF ZERO, THEN NO MAP USED.
         BAZ    ZICALC-1
         LDA    ZFPATRN           MAP PERMISSABLE
         BAZ    ZIERR101          ERROR  PATTERN MAP NOT PERMITTED.
         LDX    =-16              YES
         RCPY   0,T
         LDA    =X'20'
         RCPY   A,B
         LDA    ZFNUM,T           BEGIN FORMATION OF BIT PATTERN.
         S      0,,1              SHIFT NO. OF PLACES SPECIFIED BY B.
         ROR    A,T               MERGE WITH CONTENTS OF T REG.
```

```
          RADDI    C,B                       BASE REG.+1.
          BIX      $-4
          LDX      ZNBIRES1                  BIRES1=1ST DATA VALUE.
          RADD     +0,X
          RCPY     T,A
          STA      ZTPATMAP,1                STORE BIT PATTERN IN MAP.
          B        ZIACK                     ACKNOWLEDGE WITH <>.
          LDX      X'50'-2
ZICALC    RCPY     C,A
          STA      ZCSHIFT
          LDA      ZNBIRES4,1                BIRES4=X AXIS SHIFT PARAMETER.
          SCRS     1                         SHIFT RIGHT 1 PLACE CIRCULAR.
          BAN      $+3                       BRANCH IF 'ONE' SHIFTED IN.
          IM       ZCSHIFT                   COUNT NO. OF SHIFTS REQD.
          B        $-3
          LDA      ZCSHIFT
          STA      ZNXCBSHF,1
          BIX      ZICALC
          LDA      ZNBIRES4
          STA      ZNXCBSHF
          LDA      ZNBIRES5
          STA      ZNYCBSHF
          B        ZIACK                     ACKNOWLEDGE WITH <>.
ZINWC     LDX      ZNBIRES1                  BIRES1 DENOTES CYCLE
          LDA      ZNBIRES2                  BIRES2 DENOTES 1,C,W OR C
          CP       X'50'+2
          BNO      $+5                       NOT W OR C.
          ADD      =X'BFF6'                  RESULT=C000 OR C001.
          SALS     1                         LEAVES 8000 OR 8002.
          STA      ZN3PPAT1,1
          B        ZIACK                     ACKNOWLEDGE WITH <>.
          SALS     2
          B        $-3                       AC= 004 OR 0000.
          LPOOL
*
*
*
*
*
******** BEGIN ROUTINE WHICH SERVICES DATA ENTERED TO DEFINE THE
******** LENGTHS OF SWITCHING SEGMENTS UNDER /WIRING CMND.
******** AND COINCIDENT/ANTI-COINCIDENT PATTERN.
*
ZISRVCL   LDA      ZNDEVICE                  INDICATES X,Y,OR ANTICOINCIDENCE.
          CP       X'50'+2
          BNC      ZISEGXY                   NOT ANTICOIN.
          LDA      ZNBIRES1                  PREDATA, TYPE OF ANTICOIN.
          STA      ZFANTCO                   =C FOR ALL COINCIDENCE.
          BAZ      $+15                      NO ANTI-CO. PATTERN REQUIRED
          LDA      =ZASCAD
          ADD      ZNBIRES1                  X=1, Y=2, Z=3.
          STA      ZASCAD                    LOCATION FOR CURRENT X,Y,OR Z ADDR.
```

```
          RCPY     C,A
          STA      ZCSHIFT
          LDA      ZNBIRES2       BIRES2=AXIS SIZE PARAMETER.
          SCRS     1              SHIFT RIGHT 1 PLACE CIRCULAR.
          BAN      $+3            BRANCH IF 'ONE' SHIFTED IN.
          IM       ZCSHIFT        COUNT NO. OF SHIFTS REQUIRED.
          B        $-3
          LDA      ZCSHIFT        NO. OF SHIFTS.
          STA      ZNCOSIZ        COINCIDENT PATTERN SIZE.
          LDA      ZNBIRES3
          STA      ZNCOSHF        COINCIDENT SHIFT PARAMETER.
          B        ZIACK          ACKNOWLEDGE WITH <>.
ZISEGXY   LDA      =19
          STA      ZWDISPL
          LDX      ZNDEVICE       INDICATES X OR Y AXIS.
          LDA      ZTAXISAD,1     FETCH SCAN TABLE ADDRESS.
          RCPY     A,B            SET BASE REGISTER.
          LDA      ZNBIRES1       BIRES1=PREDATA=NO. OF SEGMENTS.
          BAZ      ZIERR101       ERROR   PREDATA=0 IS ILLEGAL.
          RCPY     A,T
          AND      X'5C'+8        EXTRACT BIT 12.
          SARS     3              RIGHT JUSTIFY EXTRACTED BIT.
          STA      31,,1          STORE IN SCAN TABLE, CIM LOC.
          BAZ      $+2            BRANCH IF BIT 12 WAS ZERO.
          LDA      X'5C'+1C
          RADDI    *T,A           1C-(T)--> A.
          STA      32,,1          STORE IN SCAN TABLE, NSS LOC.
          RCPY     A,X
          RCPYI    *A,A           RE-COMPLEMENT.
          ADD      =ZNBIRES2      ADD ADDRESS OF ZNBIRES2.
          STA      ZWCC1
          LDA      ZWDISPL
          RADD     A,B            MODIFY B REG POINTER TO SCAN TBL..
          LDA      *ZWC01,1
          STA      0,1,1          STORE LENGTH IN SCAN TABLE.
          BIX      $-2
          B        ZIACK          ACKNOWLEDGE WITH <>.
          LPOOL
*
*
*
*
*
********  BEGIN ROUTINE WHICH SERVICES STARTING SWITCH VALUES AS ENTER-
********  ED UNDER /SWITCH COMMAND..  THIS ROUTINE SETS THE ACCUMULATOR
********  AND IMMEDIATELY EXITS TO SERVICE ROUTINE L WHICH PROCESSES DATA
*
ZISRVCM   LDA      X'5C'+15
          B        ZISEGXY+1      EXIT TO SERVICE ROUTINE L.
*
*
*
```

```
*
*
******** BEGIN SERVICE ROUTINE WHICH ESTABLISHES THE SENSE/DIGIT ASSIGN-
******** MENT MAP USING DATA ENTERED FOR SENSE/DIGIT UNDER /BLOCK CMND.
******** THIS ROUTINE ALSO PROCESSES BLOCK SIZE DATA.
*
        ZISRVCN  LDA     ZNDEVICE         INDICATES SENSE OR DIGIT.
                 BAZ     ZISIZE           ZERO INDICATES SIZE DEFINITION DATA
                 CP      X'50'+2          SENSE LINE ASSIGNMENTS
                 BNC     ZICC1            YES
                 LDA     SDMAPEND         LAST ADDRESS IN S/D MAP.
                 SUB     ZNSDSUM          (LAST ADDRESS)-(NO. OF SENSE LINES)
        ZIRET    SUB     ZN8IRES1         ZN8IRES1=S/D LINE NO.
                 STA     ZWCC1
                 RCPYI   P,L
                 B       ZIBITCNV         EXIT TO SUBROUTINE TO GET BIT PATRN
                 RCPY    A,T              RETURN.  AC=BIT PATRN.
                 LDA     ZWINDEX          INDICATES RANGE:1-16;17-32;33-48 ET
                 SALS    5                MULTIPLY BY 32.
                 RCPYI   *A,A             COMPLEMENT
                 ADD     ZWCC1
                 CP      =ZTSDMAP         TABLE OVERFLOW CONDITION
                 BNO     ZIERR102         ERROR  S/D MAP OVERFLOW.
                 STA     ZWCC1
                 RCPY    T,A
                 STA     *ZWCC1           STORE PATTERN IN S/D MAP.
                 B       ZIACK            ACKNOWLEDGE WITH <>.
        ZICC1    LDA     SDMAPEND
                 B       ZIRET
        ZISIZE   LDA     ZTAXISAD         FETCH ADDRESS OF X SCAN TABLE.
                 RCPY    A,B
                 LDA     ZN8IRES2
                 STA     10,,1            STORE IN X TABLE; BLD LOC.
                 LDA     ZN8IRES3
                 STA     51,,1            STORE IN Y TABLE; BLD LOC.
                 LDX     =-128            START CLEAR OF S/D MAP AREA.
                 LDA     SDMAPEND
                 STA     ZWCC1
                 RCPY    C,A
                 STA     *ZWCC1,1
                 BIX     $-1
                 B       ZIACK            ACKNOWLEDGE WITH <>.
                 LPOOL
        ZWCC1    RES     1                WORK LOCATION.
*
*
*
*
*
******** BEGIN SERVICE ROUTINE WHICH LOADS S/D SWITCH TABLE WITH S/D
******** SWITCH ENTRIES ENTERED UNDER /SWITCH STATEMENT.
*
        ZISRVCP  LDA     ZNSDSUM
```

```
        ADD     ZNSDSUM+1           ADD NO. OF SENSE LINES+NO. OF DIGIT
        CP      =33                 IS S/D TOTAL >32.
        BNO     $+2                 NO
        B       ZIERR102            ERROR...S/D TOTAL >32.
        STA     ZNSDTOTA
        LDA     ZNBIRES2            ZNBIRES2 INDICATES PLANE NO.
        MUL     ZNSDTOTA
        RCPYI   *A,A
        ADD     SDSWEND
        CP      =ZTSDSW             OVERFLOW.
        BNO     ZIERR102            ERROR   S/D SWITCH TABLE OVERFLOW.
        RCPY    A,T
        LDA     ZNDEVICE
        CP      X'50'+4             DIGIT SWITCH ASSIGNMENT
        BNC     $+3
        LDA     ZNSDSUM
        RADDI   *A,T
        RCPY    T,A
        SUB     ZNBIRES1            ZNBIRES1=S/D LINE NO.
        STA     ZWCO1
        LDA     ZNBIRES3            ZNBIRES3=SWITCH ASSSIGNMENT.
        STA     *ZWOO1
        B       ZIACK               ACKNOWLEDGE WITH <>.
        LPOOL
*
*
*
*
********  BEGIN SERVICE ROUTINE WHICH LOADS SKIP/SYNC ACTION TABLES.
********  IF AN ENTRY=C000 IS DETECTED, THIS IS INTERPRETED AS MEANING
********  THAT THE ENTIRE AXIS IS TO BE ACTED UPON.  A C000 ENTRY LEAVES
********  THE VALUE 2AF8 IN THE BIRES TABLE.
*
ZISRVCG LDA     ZCACTN
        CP      X'50'+6             SIX ENTRIES IN TABLE ALREADY
        BNO     $+2                 NO
        B       ZIERR103            ERROR   ACTION TABLE OVERFLOW.
        RCPY    A,X
        IM      ZCACTN              UPDATE ENTRY COUNTER.
        LDA     ZNDEVICE            INDICATES SKIP OR SYNC.
        SCRS    2                   SETS BIT 14 = SKIP/SYNC CODE.
        RCPY    A,T
        LDA     ZNBIRES2            ZNBIRES2=X AXIS VALUE.
        ROR     T,A                 COMBINE WITH SKIP/SYNC CODE.
        STA     ZTXACTN,1           AC=2AF8 OR 6AF8 =ENTIRE AXIS ACTION
        LDA     ZNBIRES3            ZNBIRES3=Y AXIS ENTRY.
        ROR     T,A                 COMBINE WITH SKIP/SYNC CODE.
        STA     ZTYACTN,1
        LDA     ZNBIRES4            ZNBIRES4=PLANE ENTRY.
        ROR     T,A                 COMBINE WITH SKIP/SYNC CODE.
        STA     ZTZACTN,1
        B       ZIACK               ACKNOWLEDGE WITH <>.
```

```
          LP00L
     *
     *
     *
     *
     *
     ******** BEGIN ROUTINE WHICH CAUSES PRINTOUT OF <> ACKNOWLEDGEMENT.
     ZIACK    LDA       ZNTMODE
              CP        =READ
              BNC       $+5              TOOL MODE =READ
                                         NO.
              RD        CONSOLE1         READ CONTROL PANEL REG.#1.
              AND       =X'100'          MASK NO-PRINT BIT #7.
              BAZ       $+2              BRANCH IF NO-PRINT SELECTED.
              B         ZITCNTRL         RETURN TO TOOL CONTROL.
              RCPYI     P,L
              B         KIIOCS           I/O SUBROUTINE.
              TEXT      '08'             OUTPUT DEVICE = PRINTER.
              DATA      X'C005'          WRITE EBCDIC ORDER.
              ADRL      ZMACK            ADDRESS OF <> MESSAGE.
              DATA      4                BYTE COUNT.
              B         $-7
          LP00L
     *
     *
     *
     ZIERR101 LDA       =ZMER101         ADDRESS OF 101 MESSAGE.
              B         ZIEREXIT
     ZIERR102 LDA       =ZMER102         ADDRESS OF 102 MESSAGE.
              B         ZIEREXIT
     ZIERR103 LDA       =ZMER103         ADDRESS OF 103 MESSAGE.
              B         ZIEREXIT
     *
     *
     ZMACK    TEXT      '<>'             ACKNOWLEDGEMENT SYMBOL.
              DATA      X'4015'
     ZMER100  TEXT      ' 100'
     ZMER101  TEXT      ' 101'
     ZMER102  TEXT      ' 102'
     ZMER103  TEXT      ' 103'
     ZMER200  TEXT      ' 200'
     *
     *
     AA       EQU       ZISRVCA
     BB       EQU       ZISRVCB
     CC       EQU       ZISRVCC
     DD       EQU       ZISRVCD
     EE       EQU       ZISRVCE
     FF       EQU       ZISRVCF
     GG       EQU       ZISRVCG
     HH       EQU       ZISRVCH
     II       EQU       ZISRVCI
     JJ       EQU       ZISRVCJ
```

```
         KK      EQU      ZISRVCK
         LL      EQU      ZISRVCL
         MM      EQU      ZISRVCM
         NN      EQU      ZISRVCN
         PP      EQU      ZISRVCP
         QQ      EQU      ZISRVCQ
         ZZ      EQU      ZIERR102
*
         PAGE
******** BEGIN TABLE OF CONVERSION AND FORMAT CRITERIA CONSTANTS FOR
******** ALL CLASS 3 TOOL COMMANDS.  THESE CONSTANTS CONSIST OF THREE
******** PARTS.  THE FIRST   X   VALUE DEFINES DATA CONTENT RESTRICTIONS
******** ACCORDING TO THE FOLLOWING LIST
*        X1--NO DATA REQUIRED IN STATEMENT.
*        X2--COMMAS ALLOWED IN STATEMENT DATA STRING.
*        X4--PREDATA REQUIRED IN STATEMENT.
*        X5--PREDATA BUT NO DATA REQUIRED.  E.G.  /DRIVER .
*        X6--PREDATA REQUIRED AND COMMAS ALLOWED INDATA STRING OF STATEM
******** THE SECOND ENTRY (TWO LETTERS) INDICATES THE TOO SERVICE ROUTIN
******** USED TO SERVICE THESE COMMANDS OR STATEMENTS..  THE THIRD ENTRY
******** WHICH =AA IS USED AS A REFERENCE POINT TO YIELD THE ADDRESS OF
******** THE SERVICE ROUTINE RELATIVE TO SERVICE ROUTINE A.
*
*
*
*                                           CLASS 1 AND /DRIVER STATEMENTS.
ZKCL1CRI DATA    X1+BB-AA
ZKDRICRI DATA    X5+BB-AA
*                                           /SEQUENCE GENERATOR STATEMENTS.
ZTICT3A  DATA    X6+HH-AA                   DISCRIMINATOR.
         DATA    X6+HH-AA                   DRIVER.
         DATA    X2+HH-AA                   SYNC.
         DATA    X8+BB-AA                   NOT APPLICABLE.
         DATA    X4+CC-AA                   INTERVAL.
         DATA    X6+HH-AA                   PAIR REPEAT.
         DATA    X8+ZZ-AA                   NOT APPLICABLE.
         DATA    X6+HH-AA                   STEP REPEAT.
         DATA    0+CC-AA                    FREQUENCY.
         DATA    X6+II-AA                   PULSE PROGRAM.
*                                           /SIZE STATEMENTS.
         DATA    0+GG-AA                    DIGIT.
         DATA    0+GG-AA                    SENSE.
         DATA    0+DD-AA                    PLANE.
         DATA    0+DD-AA                    YAXIS.
         DATA    0+DD-AA                    X AXIS.
*                                           /SWITCH STATEMENTS.
         DATA    X6+PP-AA                   DIGIT
         DATA    X6+PP-AA                   SENSE.
         DATA    X8+ZZ-AA                   NOT APPLICABLE.
         DATA    X6+MM-AA                   Y AXIS.
         DATA    X6+MM-AA                   X AXIS.
*                                           /DRIVER STATEMENTS.
         DATA    0                          DELAY.
```

```
              DATA    C              WIDTH.
              DATA    0              RISE/FALL TIME.
              DATA    0              AMPLITUDE.
*                                    /DAMPING NETWORK STATEMENTS.
              DATA    X8+ZZ-AA       NOT APPLICABLE.
              DATA    X4             CAPACITANCE.
              DATA    C              SHUNT RESISTANCE.
              DATA    X4             SERIES RESISTANCE.
*                                    /ACCEPT LIMIT STATEMENTS.
              DATA    X6+FF-AA       TSWITCHING.
              DATA    X6+FF-AA       TPEAK.
              DATA    X6+FF-AA       APEAK.
              DATA    X6+FF-AA       STROBES.
*                                    /LIMITS (SCAN) STATEMENTS.
              DATA    X2+EE-AA       SCANS.
              DATA    X2+EE-AA       PLANES.
              DATA    X2+EE-AA       Y AXIS.
              DATA    X2+EE-AA       X AXIS.
*                                    /PATTERN STATEMENTS.
              DATA    X6+KK-AA       WORST CASE.
              DATA    X4+KK-AA       CYCLE.
*                                    /WIRING STATEMENTS.
              DATA    X6+LL-AA       ANTICOINCIDENT.
              DATA    X6+LL-AA       Y AXIS.
              DATA    X6+LL-AA       X AXIS.
*                                    /BLOCK DATA STATEMENTS.
              DATA    X6+NN-AA       DIGIT.
              DATA    X6+NN-AA       SENSE.
              DATA    X2+NN-AA       XY DIMENSION.
*                                    /SPECIAL ACTION STATEMENTS.
              DATA    X2+GG-AA       SYNC.
              DATA    X2+GG-AA       SKIP.
*                                    RESERVED FOR FUTURE USE.
              DATA    X8+ZZ-AA       NOT APPLICABLE
              DATA    X8+ZZ-AA       NOT APPLICABLE
              DATA    X8+ZZ-AA       NOT APPLICABLE.
              DATA    X8+ZZ-AA       NOT APPLICABLE
              DATA    X8+ZZ-AA       NOT APPLICABLE.
              LPOOL
*
*
SHISRVC1      EQU     $-1            HIGH ADDRESS LIMIT.
SIZSRVC1      EQU     SHISRVC1-SLOSRVC1  SIZE OF PROGRAM.
              END                    END CARD.
```

```
                PAGE
*   BASEPLATE BLOCK SCAN AND PATTERN GENERATION ROUTINE
*
*          PROTOTYPE ASSEMBLY REVISION LEVEL D  *** RD-169
*
*          H.R.S.                                        MARCH 7, 1969
*
*REVISION--B--AMS 7/17/68
*   B     DELETED REFERENCES TO MOD1 AND MOD2.  SEE OLD LISTING FOR
*         FURTHER DESCRIPTION. . CHANGED SIZE OF S/D MAP TO 128 THEREBY
*         INCREASING ALLOWABLE NO. OF S/D LINES TO 32.  INSERTED PRO-
*         VISION FOR OBJECT CODE REVISION OF PATGEN ROUTINE TO ALLOW
*         VARIATIONS IN THE SELECTION OF SG START WORD.
*
*REVISION--C--HRS 11/12/68
*   C     1) CHANGED CALL-UP TO THIS ROUTINE FROM ZIXUP TO ZIADUP.
*         2) MODIFIED THE PARAMETER TABLES COMMENCING WITH ZTXAXIS,
*         ZTYAXIS, ZTLAXIS, AND ZTZAXIS.
*         3) MODIFIED SECTION STARTING WITH ZIXUP. THE SCAN UPDATING
*         PROGRAM SECTION NOW COMMENCES WITH ZIADUP.
*         4) ENLARGED THE NUMBER OF SEQUENCE GENERATOR CONTROL
*         WORDS FROM 8 TO 16.  THESE CONTROL WORDS COMMENCE WITH THE
*         LOCATION LABELED ZTSGSTBL.
*         5) MODIFIED THE ROUTINE STARTING WITH ZIPATGEN.  THIS ROUTINE
*         NOW CHECKS THE ANTI-COINCIDENT PATTERN WHEN APPLICABLE WHICH
*         THEN CONTROLS BIT 12 OF THE INDEX REGISTER FOR THE SELECTION
*         OF THE PROPER CONTROL WORD.
*         6) NINE NEW PARAMETERS HAVE BEEN ADDED TO THE ZTXAXIS AND
*         ZTYAXIS TABLES. THESE PARAMETERS LABLED: CIM, SP4321,
*         SP3210, SP2100, SP1000, PB4321, PB3210, PB2100, & PB1000,
*         ARE UTILIZED IN THE COMPUTATION OF THE X & Y AXIS SWITCH
*         SETTINGS.  THE ASSOCIATED COMPUTATION ROUTINES NOW CAN
*         ACCOMODATE 2 1/2 D MEMORY TYPES.
*
*
*
*************** GENERAL PROGRAM INFORMATION ********************
*
*THIS PROGRAM OPERATES UNDER THE CONTROL OF THE BASEPLATE EXECUTIVE
*CONTROLLER AND IN CONJUNCTION WITH THE BASEPLATE TOOL SERVICE ROUTINE
*THE PRIMARY FUNCTIONS OF THIS PROGRAM ARE:
*         A. COMPUTE AND CONTROL THE X,Y, LOAD/CHECK, AND PLANE SCAN
*            ADDRESSES.
*         B. WHEN CALLED UPON BY THE EXECUTIVE CONTROLLER, THIS PROGRAM
*            WILL CALCULATE THE APPROPRIATE X,Y, SENSE, AND DIGIT SWITCH
*            SETTINGS FOR THE CURRENT SCAN ADDRESS, AND TRANSFER THESE
*            SETTINGS TO THE MTT.  AT THE SAME TIME, THIS PROGRAM WILL
*            SELECT A PROPER SEQUENCE GENERATOR CONTROL WORD BASED ON
*            ADDRESS AND TOOL INPUTS, AND SUPPLY THIS WORD TO THE EXEC-
*            UTIVE CONTROLLER.
*         C. DETECT TEST COMPLETE AND SET A FLAG.
```

```
*SPECIFICATIONS FOR THIS PROGRAM INCLUDE:
    A. TO ACCOMODATE DIFFERENT TYPES OF WIRING ARRANGEMENTS FOR
       THE MEMORY UNDER TEST (MUT), THE X, Y AXES MAY BE SCANNED
       SEQUENTIALLY OR IN A MATRIX FASHION.  ALSO THE X AND Y
       WIRING MAY BE COMMON TO ALL OF THE MUT'S PLANES, OR EACH
       PLANE MAY HAVE INDEPENDENT X OR Y WIRING.  THE ONLY RESTRIC-
       TION IS THAT THE WIRING PATTERN OF ALL PLANES BE ALIKE.
       IF MATRIXED WIRING IS SPECIFIED, THAN UP TO FOUR MATRIX
       SEGMENTS MAY BE ACCOMODATED PER AXIS.  INITIAL SWITCH
       SETTINGS FOR EACH AXIS MUST BE SUPPLIED TO THIS PROGRAM.
       INITIAL SWITCH SETTINGS ARE DEFINED AS THOSE WHICH ARE TO
       BE USED FOR THE ADDRESS 0,0,0 (X,Y,Z).  IF MATRIXED WIRING
       IS USED, INITIAL SWITCH SETTINGS MUST BE SUPPLIED FOR EACH
       SEGMENT.
    B. SENSE/DIGIT BLOCKS PER PLANE MUST BE LESS THAN OR EQUAL
       TO 64.
    C. SUM TOTAL OF SENSE & DIGIT LINES PER PLANE MUST BE LESS
       THAN OR EQUAL TO 32.
    D. SUM TOTAL OF SENSE & DIGIT LINES PER MEMORY MUST BE LESS
       THAN OR EQUAL TO 128.
    E. SCAN SEQUENCE IS: X,Y, LOAD/CHECK, & PLANE.
    F. EACH PLANE MUST BE ELECTRICALLY IDENTICAL, EXCEPT FOR THE
       COINCIDENT/ANTI-COINCIDENT PATTERN FOR THE 2-1/2 D TYPES.
    G. THE COIN./ANTI-COIN. PATTERN MAY BE ON THE X OR Y AXIS
       BUT NOT BOTH.  THE REPETITIVE NATURE OF THE PATTERN MAY
       BE WITHIN EACH PLANE, IN WHICH CASE ALL SUCCESSIVE PLANES
       MUST BE IDENTICAL, OR THE PATTERN MAY BE FORMED AMONG
       PLANES.  AN EXAMPLE OF THE LATTER IS WHERE PLANE NO. 1 CONT-
       AINS ALL Y AXIS COINCIDENT WIRING, PLANE NO. 2 CONTAINS Y
       AXIS ANTI-COINCIDENT WIRING AND SO FORTH.  THE PATTERN SIZE
       MUST BE 2 TO THE N POWER, WHERE N=ANY POSITIVE INTERGER.
    H. THE SENSE DIGIT POLARITY PATTERN MAY BE CHECKERBOARD,
       IN WHICH CASE THE PATTERN SIZE MUST BE 2 TO THE N POWER
       WHERE N=ANY POSITIVE INTERGER.  OR THE PATTERN MAY BE
       OF ANY ARRANGEMENT AS LONG AS IT'S REPETIVE SIZE IS
       LESS THAN 16 X 16.
    I. UP TO 16 PULSE PROGRAMS MAY BE SPECIFIED BY TOOL TO
       ACCOMODATE THE COIN./ANTI-COIN. PATTERN, SENSE/DIGIT
       PATTERN AND LOAD CHECK CYCLE.
         PAGE
         DEF       SLOXYBSC
         DEF       SHIXYBSC
         DEF       SIZXYBSC
         DEF       ZTSDSW           SENSE DIGIT SWITCH TABLE
         DEF       ZNPATVAL         PATTERN VALUE
         DEF       ZIADUP           ADDRESS UPDATE ENTRANCE
         DEF       ZNXAD            CURRENT X ADDRESS.
         DEF       ZNYAD            CURRENT Y ADDRESS.
         DEF       ZNZAD            CURRENT Z ADDRESS.
         DEF       ZTSDMAP          SENSE DIGIT ASSIGNMENT MAP
         DEF       SDSWEND          SENSE DIGIT SWITCH TABLE END
```

```
       DEF     SDMAPEND              SENSE DIGIT ASSIGNMENT MAP END
       DEF     ZTXAXIS               X AXIS PARAMETER TABLE
       DEF     ZTYAXIS               Y AXIS ASSIGNMENT TABLE
       DEF     ZTLAXIS               LD/CHK PARAMETER TABLE
       DEF     ZTZAXIS               Z AXIS PARAMETER TABLE.
       DEF     ZTZAXIS               Z AXIS PARAMETER TABLE
       DEF     ZCZABC                Z AXIS ABSOLUTE COUNTER
       DEF     ZFTIP                 TEST IN PROGRESS FLAG
       DEF     ZFTC                  TEST COMPLETE FLAG
       DEF     ZNSDTOTA              SENSE DIGIT LINE SUM
       DEF     ZNOPPAT1              OPERATING PATTERN #1.
       DEF     ZNOPPAT2              OPERATING PATTERN #2
       DEF     ZISCSTRT              START SCAN INSTRUCTION
       DEF     ZIPATGEN              START OF PATTERN GENERATION
       DEF     ZNXCBSIZ              X AXIS CHECKERBOARD SIZE
       DEF     ZNYCBSIZ              Y AXIS CHECKERBOARD SIZE
       DEF     ZNXCBSHF              X AXIS CHECKERBOARD SHIFT
       DEF     ZNYCBSHF              YAXIS CHECKERBOARD SHIFT
       DEF     ZTSGSTBL              TABLE OF SEQ GEN START WORDS
       DEF     ZNCURSGS              SEG GEN START WORD FOR CURRENT ADDR
       DEF     ZFLCNO                LD/CHK FLAG.
       DEF     ZNCURPAT              CURRENT PATTERN VALUE
       DEF     ZFPATMAP              WORST CASE PATTERN MAP
       DEF     ZFPATRN               PATMAP ALLOW FLAG
       DEF     ZTPATMAP              16X16 PATMAP TABLE
       DEF     ZNCOSHF
       DEF     ZNCOSIZ
       DEF     ZASCAD
       DEF     ZFANTCO
       DEF     ZIRESTR
       DEF     ZFPARSTR
       REF     ZIEXECO1              ENTRANCE TO EXECUTIVE
       REF     ZISYSER               SYSTEM ERROR PRGM
       REF     ZFMTTRDY              MTT READY FLAG(BUSY)
       REF     ZNCMODE               CONTROL PANEL LAMP STATUS.
       REF     ZIERRCTL
       PAGE
*********ABSOLUTE SECTION*********
*
*
       ASECT
       ORG     X'41'
*
*
       DATA    -15                   BEGIN STANDARD CONSTANT DEF.
       DATA    -14
       DATA    -13
       DATA    -12
       DATA    -11
       DATA    -10
       DATA    -9
       DATA    -8
       DATA    -7
```

```
          DATA    -6
          DATA    -5
          DATA    -4
          DATA    -3
          DATA    -2
          DATA    -1
          DATA    0
          DATA    1
          DATA    2
          DATA    3
          DATA    4
          DATA    5
          DATA    6
          DATA    7
          DATA    8
          DATA    9
          DATA    10
          DATA    11
          DATA    12
          DATA    13
          DATA    14
          DATA    15
ZKBIT15   DATA    1
ZKBIT14   DATA    2
ZKBIT13   DATA    4
ZKBIT12   DATA    8              BIT MASKS
ZKBIT11   DATA    X'10'
ZKBIT10   DATA    X'20'
ZKBIT09   DATA    X'40'
ZKBIT08   DATA    X'80'
ZKBIT07   DATA    X'100'
ZKBIT06   DATA    X'200'
ZKBIT05   DATA    X'400'
ZKBIT04   DATA    X'800'
ZKBIT03   DATA    X'1000'
ZKBIT02   DATA    X'2000'
ZKBIT01   DATA    X'4000'
ZKBIT00   DATA    X'8000'
ZKBYTE1   DATA    X'FF'          BYTE MASK
ZKBYTE0   DATA    X'FF00'        BYTE MASK
          DATA    0              RESERVED
ZFPATRN   DATA    1              PATTERN MAP ALLOW.
ZKDIGIT3  DATA    X'F'           DIGIT MASK
ZKDIGIT2  DATA    X'F0'          DIGIT MASK
ZKDIGIT1  DATA    X'F00'         DIGIT MASK
ZKDIGIT0  DATA    X'F000'        DIGIT MASK
*
*
*
********END ABSOLUTE SECTION********
*
*
          CSECT
```

```
             ORG     X'AE6'
*
SLOXYBSC EQU     $              SCAN ROUTINE LOW LIMIT
P        EQU     1              P REGISTER
L        EQU     2              LINK REGISTER
T        EQU     3              TEMPORARY REGISTER
X        EQU     4              INDEX REGISTER
B        EQU     5              BASE REGISTER
E        EQU     6              EXTENDED ACCUMULATOR
A        EQU     7              ACCUMULATOR
CONSOLE1 EQU     X'F3E3'        CONTROL PANEL READ/WRITE REG.#1.
CONSOLE2 EQU     X'F3E0'        CONTROL PANEL READ REG.#I.
ZKX3C    EQU     X'3C'
ZKX18C   EQU     X'180'
ZKSCRSOP EQU     X'41'
*
*
ZTSDSW   RES     128            S/D SWITCH TABLE=128 MAX.
ZTSDMAP  RES     128            SENSE DIGIT LINE ASSIGNMENT MAP.
SDSWEND  DATA    ZTSDSW+128
SDMAPEND DATA    ZTSDMAP+128
ZWBSAVE  RES     1              TEMP STORE FOR B REG
ZWCC1    RES     1              WORK LOCATION
ZFTIP    RES     1              TEST IN PROGRESS
ZNSDTOTA RES     1              S/D LINE TOTAL(SUM)
ZFTC     RES     1              TEST COMPLETE
ZNOPPAT1 RES     1              PATTERN 1 VALUE SET BY TOOL
ZNOPPAT2 RES     1              PATTERN 2 VALUE SET BY TOOL
ZTPATMAP RES     16             PATTERN MAP TABLE. SET BY TOOL,.
         PAGE
*
* BEGIN TABLE OF PERTINANT DATA ADDRESSES. THE DATA IN THESE ADDRESSES
* IS ALTERED, DEPENDENT UPON THE STATUS OF THE CONTROL PANEL SWITCHES.
ZTPARSTR DATA    ZNOPPAT1       ADDRESS OF OPERATING PATTERN #1.
         DATA    ZNOPPAT2       ADDRESS OF OPERATING PATTERN #2.
         DATA    ZTXAXIS+MIN    ADDRESS OF X-MIN. DATA.
         DATA    ZTXAXIS+MAX    ADDRESS OF X-MAX. DATA.
         DATA    ZTYAXIS+MIN    ADDRESS OF Y-MIN. DATA.
         DATA    ZTYAXIS+MAX    ADDRESS OF Y-MAX. DATA.
         DATA    ZTLAXIS+MIN    ADDRESS OF MIN.SCAN DATA.
         DATA    ZTLAXIS+MAX    ADDRESS OF MAX.SCAN DATA.
ZTTEMSTR RES     8              THIS TABLE IS USED AS A TEMP. STORE
                                FOR DATA GIVEN BY THE ADDRESSES IN
                                ZTPARSTR.
*
*
* BEGIN TABLE OF CRITERIA WORDS USED IN CONJUNCTION WITH THE CONTROL
* PANEL 1,C,P,&*P SWITCHES. BITS 8 TO 15 OF EACH WORD ARE COMPARED
* AGAINST 1,C,P,&*P SELECTION MADE. BITS 0 TO 7 ARE USED TO SELECT THE
* PROPER OPERATING PATTERNS AND SCAN LIMITS.
*
ZTPATSEL DATA    X'34CC'        1 & 0 SELECTED.
         DATA    X'3814'        1 & P SELECTED.
         DATA    X'3C24'        1 & *P SELECTED.
```

```
              DATA     X'3918'             C & P SELECTED.
              DATA     X'3D28'             O & *P SELECTED.
              DATA     X'3E3C'             P & *P SELECTED.
              DATA     X'1004'             1 SELECTED.
              DATA     X'1508'             O SELECTED.
              DATA     X'1A10'             P SELECTED.
              DATA     X'1F20'             *P SELECTED.
*
ZFPARSTR      DATA     0                   PARAMETERS IN TEMP.STORE WHEN -1.
ZFLOCK        RES      1                   *1 WHEN LD & CK SWITCHES ARE SELECT
*
* BEGIN LIST OF PROGRAM SWITCH STATES FOR PROGRAM SWITCHES:
* ZXLSCN1, ZXLSCN2, & ZXLSCN3.
*
*
ZNX10FF       DATA     X'4801'             B   $+1
ZNX20FF       DATA     X'4802'             B   $+2
ZNX30FF       DATA     X'4C01'             B   *$+1
ZNX10N        DATA     X'4805'             B   $+5
ZNX20N        DATA     X'4C01'             B   *$+1
ZNX30NA       DATA     X'4803'             B   $+3
ZNX30NB       DATA     X'4C02'             B   *$+2
*
              PAGE
*
*THE FOLLOWING EQU DIRECTIVES ARE ABBREVIATIONS, REPRESENTATIVE OF
*ENTRIES COMMON TO THE X, Y, LC, AND Z PARAMETER TABLES. THESE FOUR
*TABLES COMMENCE WITH THE LABLES: ZTXAXIS, ZTYAXIS, ZTLAXIS, AND
*ZTZAXIS, RESPECTIVELY.
*
EXA           EQU      0                   EXIT LINK ADDRESS A.
EXB           EQU      1                   EXIT LINK ADDRESS B.
EXC           EQU      2                   EXIT LINK ADDRESS C.
EXER          EQU      3                   EXIT TO ERROR SUBROUTINE.
NXTAB         EQU      4                   NEXT TABLE LINK ADDRESS.
SIZ           EQU      5                   (T) ACTUAL SIZE OF AXIS.
MIN           EQU      6                   (T) MINIMUM SCAN ADDRESS.
MAX           EQU      7                   (T) MAXIMUM SCAN ADDRESS.
ABC           EQU      8                   ABSOLUTE COUNTER (2'S COMPL.).
AAW           EQU      9                   MTT AXIS ADDRESS FOR SWITCHES.
*NOTE - (T) IDENTIFIES ENTRIES MADE BY TOOL.
* THE FOLLOWING EQU DIRECTIVES ARE ABBREVIATION REPRESENTATIVES OF
*ENTRIES COMMON TO ONLY THE X AND Y TABLES.
*
BLD           EQU      10                  (T) S/D BLOCK DIMENSION.
SW1CCC        EQU      11                  (T) START SWITCH FOR MATRIX SEGMENT
SW21CC        EQU      12                  (T)
SW321C        EQU      13                  (T)
SW4321        EQU      14                  (T)
L1CCC         EQU      15                  (T) LENGTH OF MATRIX SEGMENT.
L21CC         EQU      16                  (T)
L321C         EQU      17                  (T)
L4321         EQU      18                  (T)
```

```
SP1CCC    EGU    19              START POSITION BIAS FOR SEGMENT.
SP21CC    EGU    20
SP321C    EGU    21
SP4321    EGU    22
PB1CCC    EGU    23              POSITION BIAS FOR SEGMENT.
PB21CC    EGU    24
PB321C    EGU    25
PB4321    EGU    26
BLP       EGU    27              POSITION WITHIN BLOCK.
BDI       EGU    28              BLOCK DIMENSION INCREMENT.
ABN       EGU    29              ABSOLUTE BLOCK NO.
AABN      EGU    30              ALTERNATE AXIS BLOCK NO. ADDRESS.
CIM       EGU    31              (T)COM/INDEP.MATRIX WIRING
NSS       EGU    32              (T)NO. OF SEGMENTS IN MATRIX.
P1CCC     EGU    33              POSITION WITHIN BLOCK.
P21CC     EGU    34
P321C     EGU    35
P4321     EGU    36
NOB       EGU    37              NO. OF BLOCKS ALONG AXIS.
EX1       EGU    38              EXIT LINK ADDRESS 1.
EX2       EGU    39              EXIT LINK ADDRESS 2.
EX3       EGU    40              EXIT LINK ADDRESS 3.
*
*NOTE 1  (T) IDENTIFIES ENTRIES MADE BY TOOL.
*     2  SOME OF THE NOTATIONS IN THE ABOVE EGUS' ARE FURTHER CLARIFIED:
*         1CCC - 1ST OF 4 SEGMENTS.
*         21CC - 2ND OF 4, 1ST OF 3.
*         321C - 3RD OF 4, 2ND OF 3, 1ST OF 2.
*         4321 - 4TH OF 4, 3RD OF 3, 2ND OF 2, 1ST OF 1.
          PAGE
*
*THE FOLLOWING REPRESENTS FOUR TABLES, EACH COMMENCING WITH ONE OF THE
*FOLLOWING LABLES: ZTXAXIS, ZTYAXIS, ZTLAXIS, AND ZTZAXIS.
*
ZTXAXIS   ADRL   ZIMAINT         EXA - START OF X TABLE.
          ADRL   ZISOINT         EXB
          ADRL   ZIYUP           EXC
          DATA   ZISYSER         EXER.
          ADRL   ZTYAXIS         NXTAB.
          RES    2
ZNXMAX    RES    1               X MAX SCAN LIMIT.
ZCXABC    RES    1               X ABSOLUTE COUNTER (2'S COMPL.).
ZKXAAW    DATA   X'F300!         X AXIS MTT ADDRESS.
          RES    18
          DATA   1
          RES    1
          DATA   ZTYAXIS+ABN
          RES    7
          ADRL   ZIYRET
          ADRL   ZIBLINT         EX2.
          ADRL   ZIXYLIN         EX3.
*
ZTYAXIS   ADRL   ZIMAINT         EXA - START OF Y TABLE.
```

```
                ADRL    ZISDINT                 EXB.
                ADRL    ZILTALUP                EXC.
                DATA    ZISYSER                 EXER.
                ADRL    ZTLAXIS                 NXTAB.
                RES     2
ZNYMAX          RES     1                       Y MAX SCAN LIMIT.
ZCYABC          RES     1                       Y AXIS ABSOLUTE COUNTER (2'S COMPL)
ZKYAAW          DATA    X'F320'                 Y AXIS MTT ADDRESS.
                RES     20
                DATA    ZTXAXIS+ABN
                RES     7
                ADRL    ZISETBDI                EX1
                ADRL    ZIBLINT                 EX2.
                ADRL    ZISDSWMC                EX3
*
ZTLAXIS         ADRL    ZIPOINTC                EXA - START OF L TABLE.
                ADRL    ZISDINT                 EXB.
                ADRL    ZILTALUP                EXC.
                DATA    ZISYSER                 EXER.
                ADRL    ZTZAXIS                 NXTAB.
                RES     3
ZCLCABC         RES     1                       LD/CK ABSOLUTE COUNTER.
*
*
ZTZAXIS         ADRL    ZIPOINTC                EXA - START OF Z TABLE.
                ADRL    ZISDINT                 EXB.
                ADRL    ZITC                    EXC.
                DATA    ZISYSER                 EXER.
                RES     3
ZNZMAX          RES     1                       Z MAX SCAN LIMIT.
ZCZABC          RES     1                       Z ABSOLUTE COUNTER.
ZKZAAW          DATA    X'F340'                 Z AXIS MTT ADDRESS.
*END OF PARAMETER TABLES.
*
* THE FOLLOWING SUBROUTINE IS ENTERED FROM THE TOOL TRANSLATOR MODULE.
* ITS PURPOSE IS TO RESTORE AXIS TABLE PARAMETERS TO THEIR RESPECTIVE
* POSITIONS IN THE TABLES.
*
ZIRESTR         RCPY    C,A
                STA     ZFPARSTR                CLEAR PARAMETER STORE FLAG.
                LDA     *ZTPARSTR-1
                RCPY    A,B
                LDX     X'50'-8
                RCPYI   B,B                     INCREMENT B REG.
                LDA     ZTTEMSTR+8,1            (A)=TEMP. STORE PARAMETER.
                STA     *0,,1                   RESTORE TO AXIS TABLE.
                BIX     $-3
                RCPY    L,P                     RETURN TO CALLING SUBR.
*
*
*
                PAGE
ZINJSCAN        LDA     ZNX1OFF
```

```
            STA     ZXLSCAN1                SET L SCAN SWITCH TO OFF.
            LDA     ZNX2OFF
            STA     ZXLSCAN2                SET L SCAN SWITCH TO OFF.
            LDA     ZNX3OFF
            STA     ZXLSCAN3                SET L SCAN SWITCH 3 TO OFF.
            B       ZISRTSCN
*
* BEGIN ROUTINE WHICH SAVES PERTINANT AXIS TABLE DATA.
*
ZISCSTRT    RCPY    *O,A
            STA     ZFPARSTR                SET PARAMETER STORE FLAG.
            LDA     =ZTPARSTR-1
            RCPY    A,B
            LDX     X'5C'-8
            RCPYI   B,B                     INCREMENT B REG.
            LDA     *O,,1                   (A)= AXIS TABLE PARAMETERS.
            STA     ZITEMSTR+8,1            SAVE PARAMETERS IN TEMP. STORE,
            BIX     $-3
* BEGIN ROUTINE WHICH ALTERS AXIS TABLE PARAMETERS IN ACCORDANCE TO
* THE CONTROL PANEL LD/CK SWITCHES.
*
*
            RC      CONSOLE2                READ CONTROL PANEL REG.#2.
            RCPY    A,T
            AND     X'5C'+3                 MASK LOAD & CHECK SWITCH BITS.
            BAZ     ZISCNCHK                NEITHER SELECTED, BRANCH.
            CP      X'5C'+3                 BOTH SELECTED
            BNC     $+4                     NO.
            LDX     X'5C'-11                YES.
            RCPYI   C,A
            B       $+3
            LDX     X'5C'-5
            RCPY    C,A
            STA     ZFLDCK                  ZFLDCK=1,IF LD & CK SELECTED.
            RCPY    *T,A                    COMPLEMENT CONTROL PANEL BITS.
            AND     X'5C'+1                 MASK LOAD SWITCH BIT.
            STA     ZTLAXIS+MIN             SET MIN=O FOR LD, =1 FOR CK.
            RCPY    T,A
            AND     =ZKX3C                  MASK 1,O,P,& *P SWITCH BITS.
            STA     ZWCC1                   TEMP. WORK LOCATION.
            BIX     $+2
            B       ZIERRCTL                BRANCH TO SWITCH ERROR SUBR.
            LDA     ZTPATSEL+1C,1           (A)= PATTERN CRITERIA WORD.
            RCPY    A,T
            AND     ZKBYTE1                 MASK SWITCH COMPARISON BITS.
            CP      ZWCC1                   COMPARE AGAINST SELECTED SWITCHES.
            BNC     $-6                     BRANCH IF NO COMPARISON.
            RCPY    T,A                     COMPARISON MADE, FETCH CRITERIA WRD
            SARS    8                       RIGHT JUSTIFY INDEX FOR PAT.#1
            AND     X'5C'+3                 MASK INDEX VALUE.
            RCPY    A,X                     PUT INDEX VALUE IN INDEX REG.
            LDA     ZTCURPAT,1
            STA     ZNOPPAT1                SET OPERATING PATTERN #1.
```

```
            RCPY      T,A
            SARS      10                    RIGHT JUSTIFY PAT.#2 INDEX VALUE.
            AND       X'5C'+3               MASK INDEX VALUE.
            RCPY      1,X                   PUT INDEX VALUE IN INDEX REG.
            LDA       ZTCURPAT,1
            STA       ZNOPPAT2              SET OPERATING PATTERN #2.
            RCPY      T,A
            SARS      12                    RIGHT JUSTIFY SCAN LIMIT INDEX VAL.
            ADD       ZFLDCK                +1 IF LD & CK SELECTED.
            ADD       ZTLAXIS+MIN
            STA       ZTLAXIS+MAX           SET MAX. SCAN LIMIT.
*
* BEGIN ROUTINE WHICH CHECKS THE CONTROL PANEL SCAN 1 & SCAN XY SWITCHES
*
   ZISCNCHK RD        CONSOLE2              (A)=CONTROL PANEL REG.#2 STATUS.
            AND       =ZKX180               MASK SCAN 1 & SCAN XY SWITCH BITS.
            BAZ       ZINOSCAN              NEITHER SELECTED, BRANCH.
            CP        =ZKX180               BOTH SELECTED
            BNC       $+2                   NO.
            B         ZIERRCTL              YES, ERROR, BRANCH.
            CP        ZKBIT08               SCAN 1 SELECTED
            BNC       $+8                   NO, BRANCH.
            LDA       ZTXAXIS+MIN           YES.
            RCPYI     A,A                   INCREMENT MIN. VALUE.
            STA       ZTXAXIS+MAX           ALTER MAX.VALUE TO MIN+1.
            LDA       ZTYAXIS+MIN           MIN Y ADDRESS.
            RCPYI     A,A
            STA       ZTYAXIS+MAX           Y MAX ADDRESS= Y MIN+1.
            B         ZISRTSCN
            LDA       ZNX10FF
            STA       ZXLSCAN1              SET L SCAN SWITCH #1 TO OFF.
            LDA       ZNX20N
            STA       ZXLSCAN2              SET L SCAN SWITCH #2 TO OFF.
            LDA       ZNX30NA
            STA       ZXLSCAN3              SET L SCAN SWITCH #3 TO ON(A).
******** BEGIN ROUTINE FOR INITIALIZING AXIS TALLIES.
   ZISRTSCN LDA       =ZTXAXIS              ADDRESS OF X AXIS TABLE.
   ZIYRET   RCPY      A,B
            LDA       SIZ,,1                AXIS SIZE.
            RCPY      C,E
            DIV       BLD,,1                BLOCK DIMENSION.
            STA       NOB,,1                NO. OF BLOCKS ALONG AXIS.
            RCPY      E,A
            BAZ       ZISETSL               NO TOOL ERROR.
            B         *EXER,,1              YES, ERROR.
   ZISETSL  LDA       CIM,,1                COM. OR INDEP. MATRIXING.
            LDX       NSS,,1                NO. OF SWITCHING SEGMENTS.
            BAZ       $+3                   COMMON.
            LDA       L4321+1,1,1           INDEP.,LOAD WITH SEGMENT LENGTH.
            MUL       ZTZAXIS+MIN           TIMES STARTING PLANE NO.
            STA       SP4321+1,1,1          STARTING POSITION BIAS.
            STA       PB4321+1,1,1          POSITION/PLANE BIAS.
            BIX       $-2                   INITIALIZE REMAINDER OF SEGMENTS.
```

```
            LDA     NXTA3,,1            NEXT TABLE ADDRESS.
            B       *EX1,,1
ZISETBDI    LDA     ZTXAXIS+NOB         X AXIS NO. OF BLOCKS.
            STA     ZTYAXIS+BDI         Y AXIS BLOCK DIMENSION INCREMENT.
            LDA     =ZTZAXIS
            RCPY    A,B
            LDA     MIN,,1              STARTING PLANE NO.
            MUL     ZNSDTOTA            SUM TOTAL SENSE/DIGIT SWITCHES/PLAN
            RCPYI   *A,A                FORM 2'S COMPLEMENT.
            ADD     SDSWEND             TO SWITCH TABLE END ADDRESS.
            STA     ZASDSW              BOUNDARY ADDRESS FOR SWITCH TABLE.
ZIADINT     RCPY    B,A                 CURRENT TABLE ADDRESS.
            STA     ZWBSAVE
            LDA     =ZTXAXIS
            RCPY    A,B
ZILOP1      LDA     MIN,,1              MIN. SCAN ADDRESS FOR X, Y, L, OR Z
*NOTE - ZILOP1 IS ALSO RE-ENTERED DURING TEST FOR AXIS INITIALIZATION.
            SUB     MAX,,1              MAX. SCAN ADDRESS.
            STA     ABC,,1              ABSOLUTE COUNTER = MIN-MAX.
            B       *EXA,,1
******** BEGIN ROUTINE FOR INITIALIZING POSITION TALLIES & SWITCHES.
ZIMAINT     LDA     MIN,,1              MIN. SCAN ADDRESS.
            STA     ZWCO1               WORK LOCATION.
            LDX     NSS,,1              NO. OF MATRIX SEGMENTS.
ZILOOP2     BAZ     ZISETP              WHEN MIN. SCAN =0.
            RCPY    C,E
            DIV     L4321+1,1,1         SEGMENT LENGTH.
            STA     ZWCO1               NO. OF WHOLE SEGMENTS.
            RCPY    E,A                 FRACTIONAL PORTION OF SEGMENT.
ZISETP      STA     P4321+1,1,1         POSITION WITHIN SEGMENT.
            ADD     PB4321+1,1,1        PLANE/POSITION BIAS.
            ADD     SW4321+1,1,1        INITIAL SWITCH VALUE.
            *D      *AAN,,1             SEND SWITCH SETTING TO MTI.
            LDA     ZWCO1               LAST QUOTIENT.
            BIX     ZILOOP2             LOOP IF THERE ARE MORE SEGMENTS.
            B       *EX2,,1
******** BEGIN ROUTINE WHICH INITIALIZES S/D BLOCK TALLIES.
ZIBLINT     LDA     MIN,,1              MINIMUM SCAN ADDRESS FOR X OR Y
            BAZ     ZISETB              STARTING ADDRESS=0.
            RCPY    C,E
            DIV     BLD,,1              BLOCK DIMENTION.
            RCPY    A,T                 NO. OF WHOLE BLOCKS.
            RCPY    E,A                 FRACTIONAL BLOCK PORTION.
            SUB     BLD,,1              BLOCK SIZE.
            STA     BLP,,1              STARTING BLOCK POSITION (NEG. NO).
            RCPY    T,A
            MUL     BDI,,1
            STA     ABN,,1              ABSOLUTE BLOCK NO FOR START OF SCAN
******** THE FOLLOWING ROUTINE CHECKS IF ALL AXES ARE INITIALIZED.
ZIPOINTC    RCPY    B,A
            CP      ZWBSAVE
            BNC     ZILOOPST            NOT COMPLETE.
            B       *EX3,,1
```

```
ZISETB    STA    ABN,,1              SET ABS. BLOCK NO=0, FOR SCAN START
          SUB    BLD,,1
          STA    BLP,,1              SET BLP=-BLD.
          B      ZIPOINTC
ZILOOPST  LDA    NXTAB,,1
          RCPY   A,B                 (B)=NEXT TABLE ADDRESS.
          B      ZILOP1
******** BEGIN ROUTINE FOR INITIALIZING SENSE/DIGIT SWITCHES.
ZISDINT   LDA    =ZTXAXIS
          RCPY   A,B
          RCPYI  P,L                 SET LINK REGISTER.
          B      ZIBLCALC            EXIT TO SUBROUTINE.
          RES    1                   RESERVED FOR SUB ROUTINE RESULT.
          LDA    *$-1,1              LOAD A FROM LOC. SPECIFIED BY SUBR.
          S      *ZNSDSHIF           SHIFT CIRC RT 1--LSB TO SIGN POS.
          BAN    $+3                 TEST IF S/D LINE USED FOR THIS BL.
          BIX    $-3                 NO.
          B      $+4                 ALL LINES TESTED.
          LDA    *ZASDSW,1           YIELDS Z AXIS MTT ADDRESS.
          WD     *ZTZAXIS+AA*        SEND DATA TO MTT SWITCHES(Z)
          BIX    $-7                 RETURN TO TEST OTHER S/D LINES.
          LDA    ZWBSAVE
          RCPY   A,B
          B      *EXC,,1             EXIT LINK ADDRESS.
*
*
******** BEGIN ROUTINE FOR CALCULATING PROPER SDMAP ENTRY TO BE USED
******** FOR BLOCK NOS. UP TO 64.
ZNTALLY   RES    1
ZIBLCALC  RCPY   L,A
          STA    ZNTALLY
          LDA    ABN,,1
          ADD    *AABN,,1
          RCPY   O,E
          DIV    ZKBIT11             ZKBIT11=16.
          SALS   5
          RCPYI  *A,A
          ADD    SDMAPEND
          STA    *ZNTALLY
          RCPY   E,A
          ADD    =ZKSCRSOF           FORMS SHIFT INSTRUCTION.
          STA    ZNSDSHIF
          LDX    ZNSDTOTA
          RCPYI  *X,X
          RCPYI  L,P
ZNSDSHIF  RES    1                   S/D MAP SHIFT
          LPOOL
*
*
******** BEGIN ROUTINE FOR UPDATING AXIS ADDRESSES DURING
******** TEST EXECUTION.
ZIADUP    LDA    =ZTXAXIS
          STA    ZWBSAVE
```

```
          RCPY      A,B
ZXLSCAN1  RES       1              L SCAN PROGRAM SWITCH #1.
          IM        ZCXABC         INCREMENT X ABSOLUTE COUNTER.
          BNC       ZIMAUP         BRANCH TO UPDATE X PARAMETERS.
ZXLSCAN2  RES       1              L SCAN PROGRAM SWITCH #2.
          ADRL      ZISETX1
          IM        ZCYABC         INCREMENT Y ABSOLUTE COUNTER.
          BNC       ZXLSCAN3       BRANCH TO PROGRAM SWITCH #3.
          LDA       ZNX10FF
          STA       ZXLSCAN1       SET L SCAN SWITCH #1 TO OFF.
          LDA       ZNX39NA
          STA       ZXLSCAN3       SET L SCAN SWITCH #3 TO ON(A).
          IM        ZCLCABC        ADD +1 TO LD/CK ABS. CTR.
          BNC       ZIXYIN         BRANCH TO PRE X/Y INITIAL. ROUTINE.
          IM        ZCZABC         ADD +1 TO Z ABS. CTR.
          BNC       ZIXYLIN+2      BRANCH TO PRE X/Y/L INITAL. ROUTINE
ZITC      LDA       ZFTIP          TEST COMPLETE CHECK.
          BAZ       $+3            NOT COMPLETE.
          STA       ZFTC           COMPLETE-SET FLAG=NOT 0.
          B         ZIEXEC01       BRANCH TO EXECUTIVE.
          RCPYI     C,A            +1 TO AC.
          STA       ZFTIP          SET TEST INPROGRESS FLAG.
          B         ZILTALUP
*
ZISETX1   LDA       ZNX10N
          STA       ZXLSCAN1       SET L SCAN SWITCH #1 TO ON.
          B         ZXLSCAN2+2
*
ZXLSCAN3  RES       1              L SCAN PROGRAM SWITCH #3.
          ADRL      ZILOP1
          ADRL      ZIYUP
          LDA       ZNX35NB
          STA       ZXLSCAN3       SET L SCAN SWITCH #3 TO ON(B).
          B         ZILOP1
*
ZIYUP     LDA       *ZTYAXIS
          RCPY      A,B
          B         ZIMAUP
ZIXYIN    LDA       *ZTYAXIS
          STA       ZWBSAVE
          B         ZILOP1         BRANCH TO INITIALIZE X & Y.
ZIXYLIN   LDA       *ZTYAXIS
          RCPY      A,B
          LDA       CIM,,1         COMMON/INDEP. MATRIXING PER PLANE.
          BAZ       $+6            COMMON.
          LCX       NSS,,1         NO. OF SWITCHING SEGMENTS.
          LDA       L4321+1,1,1    SEGMENT LENGTH.
          ADD       P84321+1,1,1   ADD PLANE POSITION BIAS.
          STA       P84321+1,1,1   NEW PLANE POSITION BIAS.
          BIX       $-3
          B         *EX3,,1
******** BEGIN ROUTINE FOR UPDATING SENSE/DIGIT SWITCHES DURING TEST.
******** THIS ROUTINE USED ONLY FOR SELECTING NEXT SET OF S/D VALUES
```

```
******** WHEN UPDATING TO SCAN NEXT PLANE OF A STACK.
ZISDSWMD LDA     ZASDSW              CURRENT SWITCH TABLE BOUNDARY ADRL.
         SUB     ZNSDTOTA            TOTAL S/D LINES PER PLANE.
         CP      *ZTSDSW             EQUAL TO SWITCH TABLE END ADDRESS
         BNO     $+7                 GREATER, GO TO ERROR ROUTINE.
         STA     ZASDSW              NOT GREATER, STORE NEW BOUNDARY.
         LDA     *ZTXAXIS
         RCPY    A,B
         LDA     *ZTLAXIS
         STA     ZWBSAVE
         B       ZILOP1              GO TO INITIAL. ROUTINE FOR X,Y,&L.
         B       *EXER,,1
ZASDSW   RES     1                   SWITCH TABLE BOUNDARY ADDRESS.
******** BEGIN ROUTINE FOR UPDATING MATRIX SEGMENT POSITIONS AND SET-
******** TING APPROPRIATE AXIS SWITCHES TO NEXT SETTINGS.
ZIMAUP   LDX     NSS,,1              SET INDEX=-NO. OF SEGMENTS.
         LDA     P4321+1,1,1         POSITION WITHIN THE SEGMENT.
         RADDI   C,A                 +1 TO POSITION COUNTER.
         CP      L4321+1,1,1         COMPARE TO SEGMENT LENGTH.
         BNC     ZINEQUL             NOT EQUAL
         RCPY    C,A
         STA     P4321+1,1,1
         ADD     PB4321+1,1,1        ADD PLANE POSITION BIAS.
         ADD     SW4321+1,1,1        ADD INITIAL SWITCH VALUE.
         WD      *AAW,,1             UPDATE MTT SWITCHES FOR AXIS.
         BIX     ZIMAUP+1            LOOP IF INDEX NOT 0.
         B       ZIBLUP
ZINEQUL  STA     P4321+1,1,1
         ADD     PB4321+1,1,1
         ADD     SW4321+1,1,1
         WD      *AAW,,1
         B       ZIBLUP
******** BEGIN ROUTINE FOR UPDATIN S/D BLOCK TALLIES.
ZIBLUP   IM      BLP,,1              BLOCK POSITION+1.
         BNC     ZICMPLT             IF NO CARRY THEN NOT END.
         LDA     BLD,,1
         RCPYI   *A,A
         STA     BLP,,1              INITIALIZE BLP=-BLOCK DIMENSION.
         LDA     ABN,,1
         ADD     BDI,,1              UPDATE ABS. BLOCK NO.
         STA     ABN,,1              STORE NEW VALUE.
ZIBLUPRE RCPYI   P,L                 SET LINK REGISTER
         B       ZIBLCALC            EXIT TO SUBROUTINE.
         RES     1                   RESERVED FOR SUBROUTINE RESULT.
         LDA     *$-1,1              LOAD AC WITH SUBR. RESULT.
         S       *ZNSDSHIF           SHIFT LEFT.
         BAN     $+5                 IF NEG., S/D LINE IS USED.
         BIX     $-3
         B       ZIPATGEN
         LDA     *ZTZAXIS
         RCPY    A,B
         LDA     *ZASDSW,1           SWITCH VALUE.
         WD      *AAW,,1             SEND DATA (S/D SWITCH) TO MTT.
```

```
            BIX       $-9
   ZICMPLT  B         ZIPATGEN
******** BEGIN UPDATE OF PATTERN INFORMATION.  ENTERED WHENEVER LD/CHK
******** TALLIES HAVE BEEN CHANGED.
   ZILTALUP LDA       =ZTLAXIS
            RCPY      A,B                    SET BE = LD/CHK AXIS.
            LDA       ABC,,1                 LD/CHK COUNTER,
            ADD       MAX,,1
            RCPY      A,T
            CP        X'5C'+2                COMPARE TO CONSTANT 2.
            BNO       ZICYC1                 CTR=LD1 OR CHK1.
            LDA       ZNOPPAT2
   ZISTOR   STA       ZNCURPAT               SET CURRENT PATTERN TALLY.
            RCPY      T,A                    RECALL LD/CHK VALUE.
            AND       ZKBIT15
            STA       ZFLCNO                 ZFLCNO=1 FOR CHK AND =0 FOR LOAD.
            B         ZIPATGEN               EXIT TO PATTERN GENERATION.
   ZICYC1   LDA       ZNOPPAT1
            B         ZISTOR
            LPOOL
   *
******** END OF SCAN ADDRESS CALCULATION ROUTINES
            PAGE
******** BEGIN PATTERN GENERATION ROUTINE.
   *THE FOLLOWING 16 LOCATIONS COMPRISE A TABLE OF SEQUENCE GENERATOR
   *CONTROL WORDS. THESE CONTROL WORDS INFORM THE SEQ. GEN. & OTHER MTT
   *DEVICES, WHICH STEPS, PULSE PROG., AND SENSE POLARITY TO USE.  THE
   *SELECTION OF THE CONTROL WORD IS BASED ON THE CONTENTS OF THE X INDEX
   *REGISTER.  THE SETTING OF THE INDEX REGISTER IS BASED UPON THE PHASE
   *OF THE LOAD/CHECK CYCLE, PATTERN INFORMATION, AND COINCIDENT/ANTI-
   *COINCIDENT WIRING INFORMATION.THE 8 LEAST SIGNIF. BITS OF THE CONTROL
   *WORDS REPRESENT THE SEQ. GEN. START/STOP STEPS, AND ARE SET BY TOOL.
   *
   ZTSGSTBL DATA      X'F100'                TABLE OF SEQ. GEN. CONTROL WORDS.
            DATA      X'F100'
            DATA      X'F900'
            DATA      X'F900'
            DATA      X'F100'
            DATA      X'F100'
            DATA      X'F900'
            DATA      X'F900'
            DATA      X'F100'
            DATA      X'F100'
            DATA      X'F900'
            DATA      X'F900'
            DATA      X'F100'
            DATA      X'F100'
            DATA      X'F900'
            DATA      X'F900'
   ZNCURSGS RES       1                      USED TO HOLD CURRENT CONTROL WD.
            PAGE
   *
   *THE INDEX REGISTER VALUE IS INTERPRETED AS FOLLOWS:
```

```
*         BIT 15 = STORAGE VALUE FOR ADDRESS (XY).
*         BIT 14 = SENSE AMP. POLARITY WHERE 0 = +, 1 = -.
*         BIT 13 = DENOTES LD. OR CHECK PHASE OF CYCLE, 0 = LD, 1 = CK.
*         BIT 12 = DENOTES COIN. OR ANTI-COIN. TYPE OF PULSE PROG.
*
*CYCLE  | CYCLE | PAT.  | PULSE |COIN/|    INDEX REG.       |   REMARKS
*TYPE   | PHASE | VALUE | PROG. |ANTI.| 12 | 13 | 14 | 15  |
*-------+-------+-------+-------+-----+----+----+----+-----+--------------
*    C  |  LD   |   1   |   1   |  C  |  0 |  0 |  0 |  0  |  LOAD  0
*wC / 1 |  LD   |   1   |   2   |  C  |  0 |  0 |  0 |  1  |  LOAD  1
*    C  |  LD   |   0   |   3   |  C  |  0 |  0 |  1 |  0  |  LOAD  0
*wCC/ 1 |  LD   |   0   |   4   |  C  |  0 |  0 |  1 |  1  |  LOAD  1
*    C  |  CK   |   1   |   5   |  C  |  0 |  1 |  0 |  0  |  CHECK 0
*wC / 1 |  CK   |   1   |   6   |  C  |  0 |  1 |  0 |  1  |  CHECK 1
*    C  |  CK   |   0   |   7   |  C  |  0 |  1 |  1 |  0  |  CHECK 0
*wCC/ 1 |  CK   |   0   |   8   |  C  |  0 |  1 |  1 |  1  |  CHECK 1
*    C  |  LD   |   1   |   9   | A/C |  1 |  0 |  0 |  0  |  LOAD  0
*wC / 1 |  LD   |   1   |  10   | A/C |  1 |  0 |  0 |  1  |  LOAD  1
*    C  |  LD   |   0   |  11   | A/C |  1 |  0 |  1 |  0  |  LOAD  0
*wCC/ 1 |  LD   |   0   |  12   | A/C |  1 |  0 |  1 |  1  |  LOAD  1
*    C  |  CK   |   1   |  13   | A/C |  1 |  1 |  0 |  0  |  CHECK 0
*wC / 1 |  CK   |   1   |  14   | A/C |  1 |  1 |  0 |  1  |  CHECK 1
*    C  |  CK   |   0   |  15   | A/C |  1 |  1 |  1 |  0  |  CHECK 0
*wCC/ 1 |  CK   |   0   |  16   | A/C |  1 |  1 |  1 |  1  |  CHECK 1
ZFLCNO   RES     1                       INDICATES LOAD OR CHECK CYCLE.
ZNCURPAT RES     1                       INDICATES PATTERN 1 OR 2.
ZNXCBSIZ RES     1                       X CHKBD SIZE SET BY TOOL.
ZNYCBSIZ RES     1                       Y CHKBD SIZE SET BY TOOL.
ZNXCBSHF RES     1                       X CHKBD SHIFT SET BY TOOL.
ZNYCBSHF RES     1                       Y CHKBD. SHIFT SET BY TOOL.
ZNPATVAL RES     1                       USED FOR PATVAL AT CURRENT ADDRESS.
ZFPATMAP RES     1                       PATTERN MAP FLAG.
ZFANTCO  RES     1                       CO/ANTI-CO FLAG
ZNCOSIZ  RES     1                       COINCIDENT PATTERN SIZE.
ZNCOSHF  RES     1                       COINCIDENT SHIFT PARAMETER.
ZASCAD   RES     1                       ADDRESS OF PROPER SCAN ADDRESS WORD
ZNXAD    RES     1                       CURRENT X ADDRESS.
ZNYAD    RES     1                       CURRENT Y ADDRESS.
ZNZAD    RES     1                       CURRENT Z ADDRESS
ZTCURPAT DATA    X'4'                    CODE FOR ONES.
         DATA    X'C'                    CODE FOR ZEROES.
         DATA    X'8000'                 CODE FOR W/C.
         DATA    X'8002'                 CODE FOR W/CC.
ZTLMPPAT DATA    X'100'                  LAMP BIT #7.
         DATA    X'200'                  LAMP BIT #6.
         DATA    X'400'                  LAMP BIT #5.
         DATA    X'800'                  LAMP BIT #4.
*
*
*
ZIPATGEN RCPY    *0,A
         STA     ZFMTTRDY                INDICATES SWITCH TIMER RUNNING.
```

```
            RCPY      C,X
            LDA       ZCXABC        X ABSOLUTE COUNTER.
            ADD       ZNXMAX        X MAX SCAN ADDRESS.
            STA       ZNXAD         PRESENT X ADDRESS.
            LDA       ZCYABC        Y ABSOLUTE COUNTER.
            ADD       ZNYMAX        Y MAX SCAN ADDRESS.
            STA       ZNYAD         PRESENT Y ADDRESS.
  ZISET12   LDA       ZCZABC        Z ABSOLUTE COUNTER.
            ADD       ZNZMAX        Z MAX SCAN ADDRESS.
            STA       ZNZAD         PRESENT Z ADDRESS.
            LDA       ZFANTCO       COIN/ANTI-COIN FLAG, C=COIN.
            BAZ       ZISET13       COINCIDENT.
            LDA       *ZASCAD       LOAD WITH APPROPRIATE SCAN ADDRESS.
            ADD       ZNCOSHF       COINCIDENT SHIFT CONSTANT.
            S         *ZNCOSIZ      DIV. BY COINCIDENT PATTERN SIZE.
            AND       ZKBIT15
            SALS      3
            ROR       A,X           SET X REG BIT 12
  ZISET13   LDA       ZFLCNO        LD/CK. FLAG. 1=CK, 0=LD
            SALS      2
            ROR       A,X           SET X REG. BIT 12.
            RCPY      X,T           TEMP. STORE.
            BAZ       $+6           LOAD CYCLE, BRANCH.
            LDA       ZNCMODE       CHECK CYCLE, CHECK LAMP STATUS.
            AND       =X'FFFB'      CLEAR LOAD BIT #13.
            LDX       ZKBIT12
            ROR       X,A           SET CHECK BIT #12.
            B         $+5
            LDA       ZNCMODE       CURRENT CONTROL PANEL LAMP STATUS.
            AND       =X'FFF7'      CLEAR CHECK BIT #12.
            LDX       ZKBIT13
            ROR       X,A           SET LOAD BIT #13.
            STA       ZNCMODE       UPDATE LAMP STATUS.
            WD        CONSOLE1      UPDATE LAMPS.
            RCPY      T,X           RESTORE X REG.
            LDA       ZFPATMAP      CHECK IF PATTERN MAP IN EFFECT.
            BAZ       $+2           MAP NOT USED IF ZERO.
            B         ZIPATMAP      BRANCH TO MAP EVALUATION.
            LDA       ZNCURPAT      PATTERN 1 OR PATTERN 2 VALUE.
            RCPY      A,E
  ZINOMAP   LDA       ZNXAD
            ADD       ZNXCBSHF      X CHKBD SHIFT CONSTANT.
            S         *ZNXCBSIZ     DIVIDE BY X CHKBD. SIZE.
            RCPY      A,T
            LDA       ZNYAD
            ADD       ZNYCBSHF      ADDS Y CHKBD SHIFT CONSTANT.
            S         *ZNYCBSIZ     DIVIDE BY Y CHKBD, SIZE.
            REOR      T,A           EXCLUSIVE OR X AND Y RESULTS.
  ZIMAPRE   AND       ZKBIT15       LEAVES AC= W/C PATTERN VALUE.
            RCPY      A,T
*           LDA       ZNCURPAT      ZNCURPAT = 0000 FOR ZEROES.
*                                              0004 FOR ONES.
                                               8000 FOR W/C.
```

```
*                                                       8002 FOR W/C COMPL.
          BAN      ZIWC              BRANCH IF PATTERN=W/C OR W/CC.
          RCPY     T,A
          BAZ      $+18              BRANCH IF W/C VALUE =C.
          LDA      ZNCURPAT          WILL = COO OR OOO4.
          SARS     2                 RIGHT JUSTIFY.
ZIOUT     ROR      A,X               SETS X REG BIT 15 = PATTERN VALUE.
          STA      ZNPATVAL          STORE PATTERN VALUE FOR THIS ADDRES
          LDA      ZTSGSTBL,1        SELECT PROPER SG CONTROL WORD.
          STA      ZNCURSGS          STORE IN CURRENT WD LOCATION.
          LDX      X'5C'-4           (X)=-4.
          LDA      ZNCURPAT
          CP       ZTCURPAT+4,1      COMPARE TO PATTERN CODE TABLE.
          BXNC     $-1
          LDX      ZTLMPPAT+4,1      EXTRACT CORRESPONDING LAMP BIT
          LDA      ZNCMODE           CURRENT LAMP STATUS.
          AND      =X'F0FF'          CLEAR LAMP BITS 4,5,6,& 7.
          ROR      X,A
          STA      ZNCMODE           UPDATE LAMP STATUS.
          WD       CONSOLE1          UPDATE LAMPS.
          B        ZIEXECO1
          LDA      ZKBIT14
          ROR      A,X               SET XREG BIT 14 = 1 (- POLARITY)
          B        ZIOUT-2
ZIWC      AND      ZKBIT14           MASK.
          ROR      A,X               SET XREG BIT 14 FOR POLARITY.
          SARS     1
          REOR     T,A               WILL COMPLEMENT W/C VALUE IF REQD.
          B        ZIOUT
******** PATTERN MAP EVALUATION ROUTINE.
*
*
ZIPATMAP  RCPY     X,T
          LDA      ZNCURPAT
          RCPY     A,E
          LDA      ZNXAD
          AND      ZKDIGIT3
          RCPY     A,B               LO ORDER 4 BITS OF X ADDR. TO B
          LDA      ZNYAD
          AND      ZKDIGIT3
          RCPY     A,X               LO ORDER 4 BITS OF YADDR. TO X
          LDA      ZTPATMAP,1        SELECT WORD IN MAP
          S        O,,1              SHIFT PROPER BIT TO POSITION 15
          RCPY     T,X
          B        ZIMAPRE           RETURN TO PATGEN ROUTINE. WC PAT-
*                                    TERN BIT VALUE IS IN A REG BIT 15.
          LPOOL
*
******** END OF SCAN AND PATTERN GENERATION PROGRAM.
*
SHIXYBSC  EQU      $-1               HIGH ADDRESS LIMIT.
SIZXYBSC  EQU      SHIXYBSC-SLOXYBSC SIZE OF PROGRAM.
          END                        END OF PN NO.
```

```
*       BASEPLATE DIGITAL-DISPLAY SUBROUTINE.
*
*       PROTOTYPE REVISION B ASSEMBLY   (RD-169)
*
*       H.R.S.                                  MARCH 7, 1969
*
*THIS PROGRAM IS A SPECIAL PURPOSE SUBROUTINE DESIGNED SPECIFICALLY FOR
*WITH BASEPLATE EXECUTIVE (PN CC-0300) AND BASEPLATE SCAN ROUTINES (PN C
*PNCC-C202) EXCLUSIVELY.  ITS FUNCTION IS TO CONTROL THE RASTER DISPLAY
*TIONS AND COMMANDS ASSOCIATED WITH THE OPTIONAL MODEL 5572 DIGITAL DISP
*GENERATOR.
            PAGE
            DEF     ZIDDRDP
            DEF     SLODDRDP
            DEF     SHIDDRDP
            DEF     SIZDDRDP
*
            REF     ZNXAD               CURRENT X ADDRESS.
            REF     ZNYAD               CURRENT Y ADDRESS.
            REF     ZNZAD               CURRENT Z ADDRESS.
            REF     ZCACTN
            REF     ZTXACTN
            REF     ZTYACTN
            REF     ZTZACTN
            REF     ZISCOPIN
            REF     ZISCPRET
            REF     ZFRSLTER
            PAGE
            CSECT
            ORG     X'E7B'
SLODDRDP    EQU     $                   LOW PROGRAM LIMIT.
*
P           EQU     1                   PROGRAM REGISTER.
L           EQU     2                   LINK REGISTER.
T           EQU     3                   TEMPORARY REGISTER.
X           EQU     4                   INDEX REGISTER.
B           EQU     5                   BASE REGISTER.
E           EQU     6                   EXTENDED ACCUMULATOR.
A           EQU     7                   ACCUMULATOR.
*
KIIOCS      EQU     X'E46'              I/O SUBROUTINE ADDRESS.
ZKBIT01     EQU     X'6E'
ZKBIT02     EQU     X'6D'
ZKBIT03     EQU     X'6C'
ZKBIT04     EQU     X'6B'
ZKBIT05     EQU     X'6A'
ZKBIT06     EQU     X'69'
ZKBIT07     EQU     X'68'
ZKBIT08     EQU     X'67'
ZKBIT09     EQU     X'66'
ZKBIT10     EQU     X'65'
ZKBIT11     EQU     X'64'
ZKBIT12     EQU     X'63'
```

```
ZKBIT13   EQU     X'62'
ZKBIT14   EQU     X'61'
ZKBIT15   EQU     X'60'
ZKBITCC   EQU     X'6F'
ZWXREG    EQU     X'F2E1'
ZWYREG    EQU     X'F2E2'
ZWCREG    EQU     X'F2E0'
ZMSKSYN   TEXT    '****SKIP/SYNC ACTION ILLEGAL.'
ZMOPNLIN  TEXT    '     OPEN LINE.'
ZWCHOLD   RES     1
ZWSKSYN   RES     1
ZWXSAV    RES     1
ZWYSAV    RES     1
*
*
*
ZICORDF   LDA     ZKBIT13
          WD      X'1200'       ARM/ENAB. INTEGRAL 2 INTERRUPT.
          LDA     ZNXAD         CURRENT X ADDRESS.
          STA     ZWXSAV        SAVE ADDRESS.
          WD      ZWXREG        TRANSFER X ERROR COORDINATE TO SCOP
          LDA     ZNYAD         CURRENT Y ADDRESS.
          STA     ZWYSAV        SAVE ADDRESS.
          WD      ZWYREG        TRANSFER Y ERROR COORDINATE TO SCOP
          LDA     =X'4040'      WASTE TIME BY CLEARING OPEN LINE ME
          STA     ZMOPNLIN      SAGE BUFFER AT THIS POINT.
          STA     ZMOPNLIN+1
          STA     ZMOPNLIN+2    CLEARING AND TIME OUT COMPLETE.
          LDA     ZFRSLTER      ERROR ON LAST ADDRESS
          BAN     $+4           YES, INTENSIFY SCOPE.
          RCPY    C,A           NO, DO NOT INTENSIFY SCOPE.
          WD      ZWCREG        ISSUE SCOPE INTENSIFY COMMAND.
          B       $+4
          RCPYI   C,A
          WD      ZWCREG        WRITE TO SCOPE CONTROL REG.
          WD      X'DC'         WAIT FOR CLASS 2 INTERRUPT (READY)
          RD      ZWCREG        READ SCOPE CONTROL REGISTER.
          BAN     ZIACTION      IF NEGATIVE, ACTION REQUESTED.
ZIEX1     B       ZISCPRET      RETURN TO EXECUTIVE.
ZIACTION  STA     ZWCHOLD       SAVE CONTROL REGISTER CONTENTS.
          AND     ZKBIT08       MASK BIT 8
          CP      ZKBIT08       IS BIT 8 SET.
          BNC     ZISYNC        NO.
          RCPY    C,A           YES, SKIP ACTION REQUESTED.
          STA     ZWSKSYN
ZIMORE    LDA     ZCACTN
          CP      X'56'         ROOM IN ACTION TABLES LEFT.
          BNO     ZIACCEPT      YES, REQUEST IS ACCEPTED.
          RCPYI   P,L           NO, REQUEST REJECTED. PRINT MSG.
          B       KIIOCS        I/O
          TEXT    '08'
          DATA    X'C005'
          ADRL    ZMSKSYN
```

```
         DATA    X'1E'
         B       ZIEX1
ZIACCEPT IM      ZCACTN         INCREMENT COUNT OF ACTION ENTRIES.
         RCPY    A,X
         LDA     ZWCHOLD        RECALL SCOPE CONTROL WORD.
         AND     ZKBITC4        MASK BIT 4
         CP      ZKBITC4        IS BIT 4 SET.
         BNC     $+5            NO, ENTIRE X AXIS AFFECTED.
         LDA     ZWXSAV         YES, SPECIFIC X ADDRESS SPECIFIED.
         ADD     ZWSKSYN
         STA     ZTXACTN,1      PLACE X ADDRESS VALUE IN ACTION TBL
         B       $+4
         LDA     =X'AF8'        AF8=ENTIRE AXIS CODE.
         ADD     ZWSKSYN
         STA     ZTXACTN,1      PLACE ENTRY IN ACTION TBL.
         LDA     ZWCHOLD        RECALL SCOPE CONTROL WORD.
         AND     ZKBITC3        MASK BIT 3
         CP      ZKBITC3        IS BIT 3 SET.
         BNC     $+5            NO, ENTIRE Y AXIS AFFECTED.
         LDA     ZWYSAV         YES, SPECIFIC Y ADDRESS SPECIFIED.
         ADD     ZWSKSYN
         STA     ZTYACTN,1      PLACE Y ADDRESS VALUE IN ACTION TBL
         B       $+4
         LDA     =X'AF8'        AF8=ENTIRE AXIS CODE.
         ADD     ZWSKSYN
         STA     ZTYACTN,1      PLACE ENTRY IN ACTION TBL,.
         LDA     ZWCHOLD        RECALL SCOPE CONTROL WORD.
         AND     ZKBITC2        MASK BIT 2
         CP      ZKBITC2        IS BIT 2 SET.
         BNC     $+6            NO , ENTIRE Z AXIS IS AFFECTED.
         LDA     ZNZAD          CURRENT Z ADDRESS.
         ADD     ZWSKSYN
         STA     ZTZACTN,1      PLACE Z ADDRESS VALUE IN ACTION TBL
         B       $+4
         LDA     =X'AF8'        AF8=ENTIRE AXIS CODE.
         ADD     ZWSKSYN
         STA     ZTZACTN,1      PLACE ENTRY IN ACTION TBL.
ZIPRINT  LDA     ZWCHOLD        RECALL SCOPE CONTROL WORD.
         AND     ZKBITC6        MASK PRINT BIT #6.
         BAZ     ZIEX1          IF ZERO, NO PRINTING REQUIRED.
         AND     =X'18'         MASK BITSBITS 11 & 12.
         BAZ     ZIEX1          IF ZERO, NO PRINTING REQUIRED.
         CP      =X'18'         OPEN LINE PRINTING SELECTED
         BNC     ZIEX2          NO.
         LDA     ZWCHOLD        RECALL SCOPE CONTROL WORD.
         AND     ZKBITC4        MASK BIT 4
         CP      ZKBITC4        IS BIT 4 SET.
         BNC     $+3            NO., NOT X OPEN LINE PRINT.
         LDA     =X'E740'       SET UP X IN OPEN LINE MSG.
         STA     ZMOPNLIN
         LDA     ZWCHOLD
         AND     ZKBITC3        MASK BIT 3.
         CP      ZKBITC3        IS BIT 3 SET.
```

```
              BNC       $+3                     NO, NOT Y OPEN LINE PRINT.
              LDA       =X'E84C'                SET UP Y IN OPEN LINE MSG.
              STA       ZMOPNLIN+1
              LDA       ZWCHOLD
              AND       ZKBITC2                 MASK BIT 2
              CP        ZKBITC2                 IS BIT 2 SET.
              BNC       $+3                     NO, NOT Z OPEN LINE PRINT.
              LDA       =X'E94C'                SET UP Z IN OPEN LINE PRINT MSG.
              STA       ZMOPNLIN+2
              RCPYI     P,L
              B         KIIOCS                  PRINT OPEN LINE MESSAGE.
              TEXT      'D8'
              DATA      X'C005'
              ADRL      ZMOPNLIN
              DATA      X'10'
ZIEX2         B         ZISCOPIN                RETURN TO EXECUTIVE.
ZISYNC        LDA       ZWCHOLD
              AND       ZKBITC7
              CP        ZKBITC7                 SYNC ACTION REQUESTED IF BIT 7 SET.
              BNC       ZIPRINT                 NOT SYNC, CHECK PRINT.
              LDA       ZKBIT01
              STA       ZWSKSYN
              B         ZIMORE
              LPOOL
*
*
SHIDDRDP      EQU       $-1                     HIGH ADDRESS LIMIT.
SIZDDRDP      EQU       SHIDDRDP-SLODDRDP       PROGRAM SIZE.
              END                               END CARD.
```

```
*       BASEPLATE UTILITY I/O ROUTINE.
*       PROTOTYPE ASSEMBLY REVISION LEVEL 8
*
*       H.R.S.                              MARCH 7, 1969
*
*REVISION--CC--AMS  3/14/69
*REVISION--A--HRS  11/20/68
*   A    ADDED DEF CARD (KIIOCS).
*
          PAGE
          DEF     IOCSTART
          DEF     IOCSEND
          DEF     IOCSIZE
          DEF     KIIOCS
          REF     ZFPUNCH            PUNCH FLAG.
          REF     ZITCNTRL           TOOL CONTROL.
          REF     ZNTMODE            TOOL MODE.
          REF     ZNCMODE            CONTROL PANEL LAMP STATUS.
          REF     ZIERRCTL           BEGIN. OF ERROR ROUTINE.
*
*
          CSECT
*
          ORG     X'F27'
IOCSTART  EQU     $                  PROGRAM LOW LIMIT
P         EQU     1
L         EQU     2
T         EQU     3
X         EQU     4
B         EQU     5
E         EQU     6
A         EQU     7
*
U:CALLOL  EQU     0
U:CALLOC  EQU     1
U:CALLLO  EQU     2
U:CALLNO  EQU     3
*
U:TCNTRL  DATA    ZITCNTRL           TOOL CONTROL.
U:NCMODE  DATA    ZNCMODE            CONTROL PANEL LAMP STATUS.
U:ERRCTL  DATA    ZIERRCTL           CONTROL PANEL ERROR SUBR.
U:FPUNCH  DATA    ZFPUNCH            PUNCH FLAG.
U:NTMODE  DATA    ZNTMODE            TOOL MODE.
*
U:IOCS    AD      X'EC'              RESET PSD E & I INDICATORS.
KIIOCS    EQU     U:IOCS
          LCA     K:X8
          AD      *K:X120C           ARM/ENABLE INTEGRAL 1 INTERRUPT.
          RCPY    X,A
          STA     U:IOCSXR           SAVE X REGISTER.
          RCPY    B,A
          STA     U:IOCSBR           SAVE B REGISTER.
```

```
        RCPY    E,A
        STA     U:IOCSER            SAVE E REGISTER.
        RCPY    *O,A
        STA     U:IOCSCC            SET COMPLETION CODE=-1.
        RCPY    L,B
        LDA     U:CALLOL,,1         GET OPERATION LABEL.
        LDX     U:TABLSZ
        CP      U:TABLOL,1          SEARCH LABEL TABLE.
        BXNC    $-1
        BNC     U:IOCSXT            BRANCH IF NOT FOUND.
        LDA     U:TABLDV,1
        STA     U:IOCSDN            STORE DEVICE NUMBER.
        AND     K:XFF
        CP      K:X80
        BNO     $+3
        SARS    4                   COMPUTE CHANNEL NO.
        AND     K:7
        AND     K:1F
        RADD    A,A                 DOUBLE CHANNEL NO.
        STA     U:IOCSCN
        LDA     U:CALLOC,,1         LOAD OPERATION CODE.
        AND     K:7
        STA     U:PACKOC
        AND     K:3
        BAZ     U:IOCSXT            BRANCH IF INVALID.
        RCPY    A,X
        RCPYI   C,A
        SCRS    O,1                 CHECK COMPATIBILITY.
        AND     U:IOCSDN
        BAZ     U:IOCSXT
        LDA     U:CALLLO,,1
        STA     U:PACKLO            STORE DATA LOCATION.
        LDA     U:CALLNO,,1
        STA     U:PACKNO            STORE TRANSFER COUNT.
        RCPYI   O,A
        STA     U:CHANWO
        RCPY    *C,E                SET CARD PUNCH FLAG.
        LDA     U:IOCSDN
        SCLS    2
        AND     K:F                 ISOLATE DEVICE TYPE.
        CP      K:6
        BNO     $+3                 BRANCH IF NOT DISC.
        RCPY    A,E
        LDA     K:6
        RADD    A,P                 MODIFIES PROGRAM COUNTER.
        B       U:IOCSX1            CR DEVICE TYPE.
        B       U:IOCSTY            TY DEVICE TYPE.
        B       U:IOCSCP            CP DEVICE TYPE.
        B       U:IOCSLP            LP DEVICE TYPE.
        B       U:IOCSMT            MT DEVICE TYPE.
        B       U:IOCSPT            PT DEVICE TYPE.
        B       U:IOCSD2
C       DATA    O
```

```
U:IOCSO2 LDA      0
         BAZ      U:IOCSXT
         RCPY     A,X
         LDA      U:IOCSDN
         B        0,1
         PAGE
U:PACKOC DATA     0           DEVICE ORDER
U:PACKLO DATA     0           DATA LOCATION
U:PACKNO DATA     0           TRANSFER COUNT
U:IOCSXR DATA     0           SAVE X REGISTER
U:IOCSBR DATA     0           SAVE B REGISTER
U:IOCSER DATA     0           SAVE E REGISTER
U:IOCSCC DATA     0           COMPLETION CODE
U:IOCSDN DATA     0           DEVICE NUMBER
U:IOCSCN DATA     0           CHANNEL NUMBER
U:CHANWB DATA     0           CHANNEL WORD B
U:IOCSBC DATA     0           BYTE COUNT
U:IOCSEF DATA     0           ERROR FLAG
U:IOSTAT DATA     0           I/O STATUS
U:IOSB   DATA     0
U:SVPKCC DATA     0
U:PACKAD ADRL     U:PACKOC
         TEXT     'X1'        INTERMEDIATE STORE
         TEXT     'BO'        BINARY OUTPUT
         TEXT     'BI'        BINARY INPUT
         TEXT     'LO'        LISTING OUTPUT
         TEXT     'SI'        SYMBOLIC INPUT
         TEXT     'CC'        CONTROL COMMANDS.
         TEXT     'OC'        OUTPUT COMMUNICATIONS
         TEXT     'DI'        DEBUG INPUT
         TEXT     'DO'        DEBUG OUTPUT
         TEXT     'PO'        PUNCH OUTPUT
U:TABLOL RES      0
X1       DATA     X'0000'     NO
BO       DATA     X'8540'     PAPER TAPE PUNCH
BI       DATA     X'4540'     PAPER TAPE READER.
LO       DATA     X'A302'     LINE PRINTER
SI       DATA     X'4003'     CARD READER
CC       DATA     X'C140'     TYPEWRITER
OC       DATA     X'C140'     TYPEWRITER
DI       DATA     X'C14C'     TYPEWRITER.
DO       DATA     X'C14C'     TYPEWRITER.
PO       DATA     X'8204'     CARD PUNCH.
U:TABLDV RES      0
U:TABLSZ DATA     U:TABLOL-U:TABLDV  TABLE SIZE.
U:IOCSTP DATA     0
K:0      DATA     0
K:1      DATA     1
K:2      DATA     2
K:3      DATA     3
K:4      DATA     4
K:6      DATA     6
K:7      DATA     7
```

```
K:X8      DATA    8
K:F       DATA    X'F'
K:X15     DATA    X'15'
K:X5C     DATA    X'5C'
K:X78     DATA    X'78'
K:X8C     DATA    X'8C'
K:X86     DATA    X'86'
K:1F      DATA    X'1F'
K:XFF     DATA    X'FF'
K:X2CC    DATA    X'200'
K:X6CC    DATA    X'600'
K:X2CCC   DATA    X'2000'
K:X4CCC   DATA    X'4000'
K:X4C4C   DATA    X'4040'
K:X88CC   DATA    X'8800'
K:XACCC   DATA    X'A000'
K:XFFCC   DATA    X'FF00'
K:XCC     DATA    X'C0'
K:X12CC   DATA    X'1200'
K:XF3E3   DATA    X'F3E3'
U:CODE15  DATA    X'515'
U:CODEF1  DATA    X'3F1'
U:CODE33  DATA    X'33'
U:CODE11  DATA    X'11'
          PAGE
U:IOCSX2  IM      U:CHANWB
U:IOCSX1  LDA     U:CALLOC,,1
          AND     K:X4CCO
U:IOCSLB  ADD     U:CHANWR
          LDX     U:IOCSCN
          WD      9,1             FILL CHANNEL REG. B.
          LDA     U:PACKAD
          WD      8,1             FILL CHANNEL REG. A.
U:IOCSIO  LDA     U:IOCSDN        DEVICE NO.
          SIO
          TIO
          BNC     U:IOCSRT        BRANCH TO START I/O.
          LDA     *U:NCMODE       CONTROL LAMP STATUS.
          AND     K:X15           CURRENTLY IN STOP MODE
          BAZ     $+2             YES, BRANCH.
          B       U:IOCSIO        NO.
          RD      K:XF3E3         READ CONTROL PANEL REG.
          AND     K:XCO           MASK TAPE & PUNCH SWITCH BITS.
          BAZ     U:IOCSIO        NEITHER SELECTED, BRANCH.
          CP      K:XCO           BOTH SWITCHES SELECTED
          BNC     $+4             NO, BRANCH.
          LDA     U:IOCSDN        YES, FETCH DEVICE NO.
          HIO                     HALT I/O.
          B       *U:ERRCTL       BRANCH TO ERROR SUBR.
          CP      K:X8            TOOL TAPE SELECTED
          BNC     $+7             NO.
          LDA     U:IOCSDN        YES, FETCH DEVICE NO.
          HIO                     HALT I/O.
```

```
            LDA      K:3
            STA      *U:NTMODE      SET TOOL MODE =READ.
            STA      *U:FPUNCH      SET PUNCH FLAG NOT NEGATIVE.
            B        *U:TCNTRL      RETURN TO TOOL CONTROL.
            LDA      U:IOCSDN       DEVICE NO.
            HIO                     HALT I/O.
            RCPY     *C,A
            STA      *U:FPUNCH      SET PUNCH FLAG.
            B        *U:TCNTRL      RETURN TO TOOL CONTROL.
            LPOOL
*
*
U:IOCSHT    STA      U:IOSTAT
            RD       8,1
            AND      K:X8800
            BAZ      $+4
            LDA      U:IOSTAT
            WD       X'DO'          I/O HALT.
            B        $-1
            BEN      U:IOCNCP       BRANCH IF NOT CP.
            RD       8,1
            AND      K:X2000
            BAZ      U:IOCSX1       GO OUTPUT NEXT ROW.
U:IOCNCP    IM       U:IOCSCC       SETS COMPLETION CODE = C.
            BNC      U:IOCSNC       NOT COMPLETE. BRANCH TO 1 CHAR.
U:IOCSXT    LDA      U:CALLOC,,1    BEGIN EXIT SEQUENCE.
            SCLS     2
            AND      K:2
            ADD      K:2
            RADD     A,L
            LDA      U:IOCSER       RESTORE E REG.
            RCPY     A,E
            LDA      U:IOCSBR       RESTORE B REG.
            RCPY     A,B
            LDX      U:IOCSXR       RESTORE X REG.
            LDA      U:IOCSCC       SET AC=COMPLETION CODE.
            RCPY     L,P            RETURN TO CALLER.
            PAGE
U:IOCSLN    RCPYI    O,A
            STA      U:PACKOC
            B        U:IOCSX1
U:IOCSLP    LDA      U:CALLOC,,1
            AND      K:3
            CP       K:3
            BNC      U:IOCSLN
            LDA      U:CODEF1
            STA      U:PACKOC
            B        U:IOCSX2
*
*
U:IOCSCP    FCPY     O,E
            LDA      U:CALLOC,,1    LOOK FOR BCD.
            SCRD     3
```

```
            LDA      K:X50
            BEN      $+2                      BRANCH IF BCD REQUESTED.
            LDA      K:X78
            STA      U:PACKN0                 MODIFY BYTE COUNT.
            RCPY     0,E
            B        U:IOCSX1
*
*
U:IOCSMT    LDA      U:CALL0C,,1              FETCH OPERATION CODE.
            AND      K:3
            STA      U:PACK0C
            LDA      U:CALL0C,,1
            AND      K:7
            CP       K:7
            BNC      U:MTCCHK                 BRANCH TO CHECK CONTROL.
            STA      U:PACK0C
            LDA      U:CODE33                 SET REWIND ORDER.
            B        U:IOCSX1
U:MTCCHK    CP       K:3
            BNC      U:IOCSTT
            B        U:IOCSXT                 BRANCH IF NOT VALID FUNCTION.
*
*
U:IOCSTY    LDX      K:X600
            B        $+2
U:IOCSPT    LDX      K:X200
            LDA      U:CALL0C,,1
            AND      K:1                      WRITE.
            BAZ      $+2                      BRANCH IF NOT WRITE.
            B        U:IOCSTT
            RADD     X,A
            STA      U:SVPKCC
U:IOCSTT    LDA      U:CALL0C,,1
            AND      K:4                      EXTRACT MODE FLAG.
            BAZ      U:IOCSX1                 BRANCH IF BINARY.
            LDA      U:CALL0C,,1              LOAD OPERATION CODE.
            AND      K:2                      EXTRACT READ FUNCTION BIT.
            BAZ      $+2
            B        U:IOCSDT
            LDA      U:IOCSDN                 FETCH DEVICE NUMBER.
            SCRS     8
            AND      K:7                      EXTRACT DEVICE TYPE.
            CP       K:1
            BNC      U:IOCSX1                 BRANCH IF NOT TYPEWRITER.
            RCPY     0,E
            IM       U:CHANWB
            LDA      U:CALLN0,,1              FETCH BYTE COUNT.
            BAZ      U:IOCSXT                 EXIT IF ZERO.
            CP       K:X50                    TEST MAX. BYTE COUNT.
            BNO      $+2                      TRUNCATE.
            LDA      K:X50                    ADD CORRECTOR FOR WORD BOUNDARY.
            ADD      K:1                      MODIFY FOR WORD COUNTER.
            SCRD     1
```

```
              RCPYI    *A,X
              LDA      K:X4040
              RCPY     *X,X
              CP       *U:PACKL0,1
              RCPY     *X,X
              BNC      $+2
              BIX      $-4
              RCPYI    *X,A
              SCLD     1
              SUB      K:1
              STA      U:PACKN0           STORE NO. OF BYTES.
              RCPY     *0,E
              CP       K:C
              LDA      U:CODE15           ORDER AND NL.
              STA      U:PACK0C
              BNC      $+3
              RCPY     0,A
              B        U:IOCSLB
              B        U:IOCSX1
*
*                                         NOT BINARY, INPUT.
*
    U:IOCSOT  LDA      U:IOCSDN           FETCH DEVICE NUMBER.
              SCLS     8
              AND      K:7
              CP       K:4                CHECK DEVICE TYPE.
              BNC      $+2
              B        U:IOCSX1           BRANCH IF MAG. TAPE.
              IM       U:CHANWB
*
*                                         NOT BINARY, NOT MAG. TAPE INPUT.
*
    U:IOCSSC  LDA      U:CALLL0,,1
              STA      U:PACKL9           STORE DATA LOCATION.
              LDA      U:CALLN0,,1
              RCPY     *A,A
              STA      U:IOCSBC
              STA      U:IOCSCC
              RCPYI    A,A
              STA      U:PACKN9
              LDA      U:SVPKCC
              STA      U:PACK0C
              RCPY     0,A
              RCPY     *0,E
              B        U:IOCSLB
*
*                                         SINGLE CHARACTER PROCESSOR.
*
    U:IOCSNC  RCPY     0,E
              LDA      U:PACKN0           FETCH BYTE COUNT.
              SCRD     1                  SET SWITCH.
              LDA      U:PACK0C           FETCH I/O WORD.
              AND      K:XFF              EXTRACT BYTE.
              CP       K:X8               TEST FOR EOM.
              BNC      $+2
              B        U:IOCSI3
```

```
           BEN     U:IOCS8B
           SALS    8
           STA     U:IOCSTP              POSITION NEW BYTE.
           LDA     *U:PACKL0             SAVE NEW BYTE.
           AND     K:XFF
           ADD     U:IOCSTP
           B       U:IOCSST              MERGE BYTES.
U:IOCS6B   STA     U:IOCSTP              BRANCH TO STORE.
           LDA     *U:PACKL0             SAVE NEW BYTE.
           AND     K:XFF00               FETCH LAST BYTE
           ADD     U:IOCSTP
U:IOCSST   STA     *U:PACKL0             MERGE BYTES.
           LDA     U:PACK0C              STORE IN DATA AREA.
           AND     K:XFF                 FETCH I/O WORD.
           CP      K:X15                 EXTRACT BYTE.
           BNC     $+4                   TEST FOR NL.
           RCPY    0,A                   BRANCH IF NOT NL.
U:IOCSCL   STA     U:IOCSCC
           B       U:IOCSXT              COMPLETEION CODE =0.
           BEN     $+2
           B       $+2
           IM      U:PACKL0
           RCPY    *0,E                  ODD, INCREMENT DATA LOCATION.
           RCPY    C,A                   SET SWITCH.
           IM      U:PACKN0
           BNC     $+2                   DECREMENT BYTE COUNT.
           B       U:IOCSCL
           B       U:IOCSLB              BRANCH IF ZERO BYTE COUNT.
*                                        RETURN FOR NEXT BYTE.
*
U:IOCS1B   LDA     U:CALLN0,,1
           ADD     U:PACKN0              FETCH BYTE COUNT.
           BAZ     U:IOCSSC              MODIFY VALUE.
           ADD     K:1
           SARS    1
           RCPYI   *A,X
           ADD     U:CALLL0,,1           SAVE INDEX.
           STA     U:IOCSTP
           LDA     K:X4040
           STA     *U:IOCSTP,1
           BIX     $-1                   BLANK OUT CALLER'S I/O AREA.
           B       U:IOCSSC              BRANCH AND RESTORE I/O.
*
           LP00L
*
IOCSEND    EQU     $-1
IOCSIZE    EQU     IOCSEND-IOCSTART      PROGRAM SIZE.
           END                           END
```

```
*          BASEPLATE MULTIPLY/DIVDE SIMULATION ROUTINE (INTERRUPT)
*
*          ASSEMBLY REVISION LEVEL B
*
*          AMS      7/16/68
*
*REVISION
*   B     DELINEATION.  ADDED EXECUTION TIMES..
*
*
*THIS PROGRAM IS A FREE STANDING MATH SUBROUTINE.  IT IS DESIGNED TO PER
*FORM FIXED POINT, SINGLE PRECISION MULTIPLICATION AND DIVISION.  THIS P
*OPERATES IN CONJUNCTION WITH THE MUL/DIV INTERRUPT FEATURE OF A SIGMA 2
*PUTER WHICH IS NOT EQUIPPED WITH HARDWARE MUL/DIV.  IT IS AUTOMATICALLY
*TERED WHENEVER AN INSTRUCTION OF MUL OR DIV IS EXECUTED.  RESULT FORMAT
*SIGN NOTATION AND OVERFLOW/CARRY CONDITIONS ARE SET IN ACCORDANCE WITH
*MUL/DIV INSTRUCTION DESCRIPTION PRESENTED IN THE SIGMA 2 REFERENCE MANU
*
*THE FOLLOWING EXECUTION TIME ESTIMATES APPLY,
*
*            **********VALID**********    **********ABORT**********
*
*            BEST     WORST    AVERAGE    BEST      WORST    AVERAGE
*
*MUL         103      292      230        --        --       --
*
*DIV         297      359      325        109       191      150
            PAGE
            DEF      SLOMLDV
            DEF      SIZMLDV
            DEF      SHIMLDV
*
*
            ASECT
            ORG      26C
            ADRL     I:MUL
            ADRL     I:DIV
*
            CSECT
            ORG      X'DC5'
SLOMLDV     EQU      $
P           EQU      1
L           EQU      2
T           EQU      3
X           EQU      4
B           EQU      5
E           EQU      6
A           EQU      7
*
*
I:SAV       SUB      K:4              POINT TO STATUS WORD.
            STA      I:TR             STORE RETURN
            RCPY     X,A
```

```
            STA         I:TX              SAVE X REG.
            RCPY        T,A
            STA         I:TT              SAVE T REG.
      *
            LDX         I:TR              FETCH RETURN
            LDA         1,1               FETCH (P)
            IM          1,1               INCREMENT (P) FOR EXIT.
            STA         I:TI              STORE OLD (P).
            LDA         *I:TI             FETCH TRAPPED INSTRUCTION.
            ADD         5,1               CONVERT TO AN 'LDA'
            STA         I:SAV3            STORE IN LINE.
            AND         K:X80C            ISOLATE RELATIVE BIT.
            BAZ         I:SAV2            BRANCH IF NOT RELATIVE TO P.
            RCPY        B,A
            STA         I:RS              STORE B TEMPORARILY.
            LDA         I:SAV3            FETCH TRAPPED INSTRUCTION.
            SALS        7                 SHIFT DIRECTION BIT INTO SIGN POS.
            SARS        7                 EXTEND SIGN.
            ADD         I:TI              ADD LOCATION OF INSTRUCTION.
            RCPY        A,B               SET B=EFFECTIVE ADDRESS.
            LDA         I:SAV3            FETCH TRAPPED INSTRUCTION.
            AND         =X'F6CO'          MASK OP,INDEX AND INDIRECT BITS.
            ADD         K:X100            ADD B RELATIVE BIT.
            STA         I:SAV1            STORE IN LINE.
            LDX         I:TX              FETCH USER'S X.
   I:SAV1   LDA         C                 MODIFIED--FETCH OPERAND.
            LDX         I:RS              FETCH USER'S B.
            RCPY        X,B
            LDX         I:TR              FETCH RETURN.
            B           6,1               RETURN.
      *
      *
   I:SAV2   LDX         I:TX              FETCH USER'S X.
      *
   I:SAV3   LDA         C                 MODIFIED--FETCH OPERAND.
            LDX         I:TR              FETCH RETURN.
            B           6,1               RETURN.
      *
      *
   I:RET    STA         I:TA              STORE (A).
            LDA         *I:TR             FETCH STATUS.
            AND         K:M2              CLEAR CARRY.
            BEN         I:RET1            BRANCH IF E NEG.
            B           I:RET2            BRANCH.
      *
      *
   I:RET1   RCPYI       A,A               SET CARRY TO SIGN OF E.
      *
   I:RET2   STA         *I:TR             STORE STATUS.
      *
   I:RET3   LDA         I:TA              FETCH (A)
   I:RET4   LDX         I:TT              FETCH T
            RCPY        X,T
```

```
              LDX      I:TX                  FETCH (X)
              WD       X'D8'
              LDX      *I:TR                 EXIT BACK TO PROGRAM.
              PAGE
    I:MUL     RES      1                     TEMP PSW
              RES      1                     TEMP P
*
              RCPY     A,E
              RCPY     P,A
              B        I:SAV                 BRANCH TO SAVE REGISTERS.
              DATA     X'5000'               CONSTANT TO BIAS MUL TO LDA.
              BAN      I:MUL8                BRANCH IF MULTIPLICAND NEG.
*
    I:MUL1    ADD      K:SIGN                ADD SIGN-REMOVER BIT.
              RCPY     A,T                   MULTIPLICAND TO T.
              RCPY     E,A                   MULTIPLIER TO A.
*
    I:MUL2    RCPY     O,E
              LDX      K:M15                 FETCH LOOP COUNT.
*
    I:MUL3    SCRD     1                     SHIFT MULTIPLIER LSB TO E SIGN POS.
              BEN      I:MUL4                BRANCH TO ADD MULTIPLICAND.
              BIX      I:MUL3                BRANCH TO TRY NEXT BIT.
              B        I:MUL5                BRANCH TO CORRECT PRODUCT.
*
    I:MUL4    RADD     T,E                   ADD MULTIPLICAND TO PARTIAL PRODUCT
              BIX      I:MUL3                BRANCH TO TRY NEXT BIT.
*
    I:MUL5    SCRD     1                     SHIFT MULTIPLIER SIGN INTO E.
              BEN      I:MUL6                BRANCH TO SUBTRACT CORRECTION.
              B        I:MUL7                BRANCH TO FINAL ALIGNMENT
*
    I:MUL6    RADDI    *T,E                  SUBTRACT MULTIPLICAND.
*
    I:MUL7    SARD     1                     ALIGN PRODUCT
              B        I:RET                 RETURN
*
*
*         HERE IF MULTIPLICAND NEGATIVE.
*
*
    I:MUL8    BEN      I:MUL9                BRANCH IF MULTIPLIER NEGATIVE ALSO.
              LDX      K:SIGN                IF NOT, SWAP ROLES. FETCH SIGN.
              ROR      X,E                   ADD SIGN-REMOVER BIT.
              RCPY     E,T                   PLACE NEW MULTIPLICAND IN T.
              B        I:MUL2                BRANCH TO CONTINUE.
*
*
*         HERE IF BOTH FACTORS ARE NEGATIVE.
*
*
    I:MUL9    RCPYI    *A,A                  COMPLEMENT MULTIPLICAND.
              RCPYI    *E,E                  COMPLEMENT MULTIPLIER.
```

```
                BAN     I:MUL10             BRANCH IF SPECIAL CASE (X'8C00')
                BEN     I:MUL11             BRANCH IF SPECIAL CASE (X'8C00')
                B       I:MUL1              BRANCH TO CONTINUE.
        I:MUL11 RCPY    A,E                 PLACE PRODUCT IN E.
        I:MUL10 RCPY    Q,A
                SCRD    1                   ALIGN PRODUCT.
                B       I:RET               RETURN.
                PAGE
        I:DIV   RES     1                   TEMP
                RES     1
        *
                STA     I:TA
                RCPY    P,A
                B       I:SAV               BRANCH TO SAVE REGISTERS.
                DATA    X'3C00'             CONSTANT TO BIAS DIV TO LDA.
                STA     T1
                LDA     I:DIV               CLEAR OVF BIT IN PSW.
                AND     K:M4
                BEN     $+2                 SET CARRY BIT TO SIGN OF DIVIDEND.
                B       $+2
                RCPYI   A,A
                STA     I:DIV
                LDA     T1
                SALD    1                   SHIFT LEFT TO CHECK OVERFLOW.
                BNO     I:DIV2              BRANCH IF NO OVF SO FAR.
                LDX     K:SIGN              FETCH SIGN BIT.
                SARD    1                   SHIFT RIGHT 1, EXTEND WRONG SIGN.
                REOR    X,E                 INVERT SIGN.
        *
        I:DIV1  IM      I:DIV               SET OVF
                IM      I:DIV
                B       I:RET3              RESTORE REGISTERS AND EXIT.
        *
        *
        I:DIV2  SARD    1                   RESTORE (E) AND DIVISOR.
                RCPY    C,X                 PLACE + QUOTIENT SIGN FLAG IN X.
                BAN     I:DIV11             BRANCH IF DIVISOR NEG.
                RCPY    A,T                 PLACE DIVISOR IN T
                BEN     I:DIV12             BRANCH IF DIVIDEND NEG.
        *
        I:DIV3  RCPY    Q,A
                STA     I:RS                STORE + REMAINDER SIGN FLAG.
                LDA     I:TA
        *
        I:DIV4  SALD    1                   SHIFT LEFT 1.
                RADDI   *T,E                SUBTRACT DIVISOR.
                BEN     I:DIV5              BRANCH IF NO OVF PROBLEM.
                RADD    T,E                 ADD BACK DIVISOR.
                SARD    1                   RESTORE ORIGINAL ALIGNMENT.
                IM      I:RS                INCREMENT REMAINDER FLAG.
                BNC     I:DIV1              BRANCH IF SIGN CORRECT.
                RCPY    *A,A
                RADDI   C,A
```

```
              RCPYC     *E,E                    COMPLEMENT E
              B         I:DIV1
*
*
   I:DIV5    RADD      T,E                     ADD BACK DIVISOR.
              SALD      1                       SHIFT LEFT 1 BIT AGAIN.
              RADD      X,A                     ADD QUOTIENT SIGN.
              LDX       K:M15                   FETCH LOOP COUNT.
   I:DIV6    RADDI     *T,E                    SUBTRACT DIVISOR.
              BEN       I:DIV7                  BRANCH IF TOO BIG.
              RADDI     A,A                     SHIFT A LEFT ONE, ADD QUOTIENT BIT
              RADDC     E,E                     SHIFT E LEFT ONE.
              BIX       I:DIV6                  BRANCH TO TRY NEXT BIT POSITION.
              AND       K:M2                    RESET LEAST-SIGNIF. BIT OF A.
              SCRD      1                       CORRECT REMAINDER SCALING.
              RADDI     A,A                     RESTORE QUOTIENT VALUE.
              B         I:DIV8                  BRANCH WHEN DONE.
*
   I:DIV7    RADD      T,E                     ADD BACK DIVISOR.
              SALD      1                       SHIFT LEFT ONE.
              BIX       I:DIV6                  BRANCH TO TRY NEXT BIT POSITION.
              SCRD      1                       CORRECT REMAINDER SCALING.
              RADD      A,A                     RESTORE QUOTIENT VALUE.
   I:DIV8    BAN       I:DIV9                  BRANCH TO CORRECT IF NEGATIVE.
              B         I:DIV10                 BRANCH TO CHECK REMAINDER.
*
   I:DIV9    LDX       K:NSIGN                 FETCH MAGNITUDE MASK.
              REORI     X,A                     MAKE CORRECTION.
*
*
   I:DIV10   IM        I:RS                    INCREMENT REMAINDER FLAG.
              BNC       I:RET4                  BRANCH IF SIGN CORRECT.
              RCPYI     *E,E                    COMPLEMENT REMAINDER.
              B         I:RET4                  BRANCH TO SET CARRY AND EXIT.
*
*
*          HERE IF DIVISOR NEGATIVE.
*
*
   I:DIV11   RCPYI     *A,T                    PLACE + DIVISOR IN T.
              BEN       I:DIV13                 BRANCH IF DIVIDEND NEGATIVE
              RCPYI     C,X                     PLACE - QUOTIENT SIGN FLAG IN X
              B         I:DIV3                  BRANCH TO SET + REMAINDER FLAG.
*
*
*          HERE IF DIVIDEND NEGATIVE
*
*
   I:DIV12   RCPYI     C,X                     PLACE - QUOTIENT SIGN FLAG IN X.
*
   I:DIV13   RCPY      *C,A                    -1 TO A
              STA       I:RS                    STORE - REMAINDER SIGN FLAG.
              RCPY      C,A
```

```
          SUB     I:TA              FETCH COMPLEMENT OF (A)
          RCPYC   *E,E              COMPLEMENT E
          B       I:DIV4            BRANCH TO CONTINUE.
          PAGE
I:TA      RES     1                 TEMP (A)
I:TX      RES     1                 TEMP (X)
I:TT      RES     1                 TEMP (T)
I:TR      RES     1                 RETURN
I:TI      RES     1                 SCRATCH
I:RS      RES     1                 REMAINDER SIGN.
*
*
T1        DATA    0
K:4       DATA    4
K:M4      DATA    -4
K:2       DATA    2
K:M2      DATA    -2
K:X8CC    DATA    X'8CC'
K:X1CC    DATA    X'1CC'
K:SIGN    DATA    X'8000'
K:M15     DATA    -15
K:NSIGN   DATA    X'7FFF'
          ADRL    X'F600'
          LP00L
*
SHIMLDV   EQU     $-1
SIZMLDV   EQU     SHIMLDV-SL0MLDV
          END                       END CARD.
```

We claim:

1. A method for providing in accordance with input data signals test measurement of a device which produces an analog nonrepetitive waveform in the form of a response voltage characteristic upon application of an analog stimulating signal to the device comprising the steps of
   - selecting one of a predetermined plurality of signal sequences in accordance with said input data,
   - forming a plurality of analog stimulating signals having predetermined waveforms at said selected signal sequence in accordance with said input data,
   - applying said plurality of analog stimulating signals in said selected sequence to said device,
   - receiving a response voltage characteristic of said device and providing analog explicit measurement of (1) the response voltage at a time determined by the shape of said response voltage characteristic and (2) selected time characteristics of said response voltage characteristic,
   - generating output reports of said explicit measurements, and
   - selecting in response to said analog explicit measurements and said input data a different one of said signal sequences and forming a new analog stimulating signal having a different analog waveform.

2. A test method of analog nonrepetitive waveforms which is directed in operation by a programmed digital computer to provide in accordance with stored input data signal measurement of a device having at least one magnetic memory element which produces a response voltage characteristic upon application to said device of analog stimulating drive current pulses which comprises the steps of
   - selecting one of a plurality of pulse sequences in response to said data signals,
   - forming a plurality of analog stimulating drive current pulses each having a predetermined waveform in response to said data signals,
   - applying said stimulating drive current pulses at said selected pulse sequence to said device,
   - receiving said response voltage characteristic from said device and explicitly measuring with respect to the time of the occurrence of a stimulating drive current pulse (1) the response voltage at a time determined by the shape of said response voltage and (2) predetermined time characteristics of said response voltage characteristic,
   - means for generating output reports of said explicit measurements, and
   - selecting a different one of said pulse sequences and forming a different analog stimulating drive current pulse waveform in response to the explicit measurements and said input data.

3. The test method of claim 2 in which there is provided in said receiving and measuring step the measurement of the peak voltage $A_p$ and the time duration $t_p$.

4. The test method of claim 2 in which there is provided the further step of comparing said explicit measurements with high and low acceptance levels.

5. The test method of claim 4 in which there is provided the further steps of recording the instances of error which occur when the explicit measurements do not meet the acceptance levels and maintaining said error recording for the duration of a test and reading out said error recording in said output reports.

6. The test method of claim 2 in which there is provided the further step of repeating the identical test of a device after explicitly measuring said response voltage characteristics.

7. The test method of claim 2 in which there is provided the further step of storing new test data signals relating to said pulse sequences and predetermined waveform and reading said new test data signals prior to beginning said selecting step.

8. The test method of claim 2 in which there is provided in said receiving and measuring step, the measurement of the time duration of $t_s$.

9. A test method directed in operation by a programmed digital computer for testing analog nonrepetitive waveforms to provide in accordance with stored data signals measurement of a device which produces an analog response voltage characteristic upon application to said device of an analog stimulating signal comprising the steps of
   - selecting one of a plurality of signal sequences in accordance with said data signals,
   - forming a plurality of analog stimulating drive signals each having a predetermined waveform in accordance with said data signals,
   - applying said plurality of analog stimulating signals to said device at said selected signal sequence,
   - receiving a response voltage characteristic of said device and providing analog explicit measurements of (1) the response voltage at a time determined by the shape of said response voltage characteristic and (2) selected time characteristics of said response voltage characteristic, and
   - generating output reports of said analog explicit measurements.